United States Patent
Jung et al.

(10) Patent No.: US 12,457,495 B2
(45) Date of Patent: Oct. 28, 2025

(54) ELECTRONIC DEVICE SUPPORTING PROFILE TRANSFER BETWEEN ELECTRONIC DEVICES AND OPERATING METHOD THEREOF

(71) Applicant: Samsung Electronics Co., Ltd., Suwon-si (KR)

(72) Inventors: Jieun Jung, Suwon-si (KR); Hyongjin Ban, Suwon-si (KR); Jaehyeon Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 18/165,701

(22) Filed: Feb. 7, 2023

(65) Prior Publication Data

US 2023/0328517 A1    Oct. 12, 2023

Related U.S. Application Data

(63) Continuation of application No. PCT/KR2023/001648, filed on Feb. 6, 2023.

(30) Foreign Application Priority Data

Apr. 12, 2022   (KR) .................. 10-2022-0045335
Jul. 20, 2022   (KR) .................. 10-2022-0089865

(51) Int. Cl.
  *H04W 12/06*    (2021.01)
  *H04W 12/086*   (2021.01)

(52) U.S. Cl.
  CPC .......... *H04W 12/06* (2013.01); *H04W 12/086* (2021.01)

(58) Field of Classification Search
  CPC .................................................. H04W 12/35
  See application file for complete search history.

(56) References Cited

U.S. PATENT DOCUMENTS 11,146,948 B1 * 10/2021 Uehling ................ H04W 12/30
12,101,630 B2 *  9/2024 Yang .................... H04W 12/03
(Continued)

FOREIGN PATENT DOCUMENTS

CN    112261642 A    1/2021
JP    2020-061661 A  4/2020
(Continued)

OTHER PUBLICATIONS

Zhao, Jinghao, et al. "SecureSIM: rethinking authentication and access control for SIM/eSIM." Proceedings of the 27th Annual International Conference on Mobile Computing and Networking. 2021, pp. 451-464. (Year: 2021).*

(Continued)

*Primary Examiner* — Kari L Schmidt
(74) *Attorney, Agent, or Firm* — Jefferson IP Law, LLP

(57) ABSTRACT

An electronic device includes a communication circuit, and a processor electrically connected to the communication circuit. The processor is configured to, provide first information which triggers profile transfer from an external electronic device to the electronic device, based on the profile transfer which is based on an EAP-AKA authenticating operation being possible, obtain first authentication information which is obtained via the EAP-AKA authenticating operation between the external electronic device and a server associated with the profile transfer, based on the profile transfer which is based on the EAP-AKA authenticating operation being impossible, perform, via the communication circuit, an authenticating operation different from the EAP-AKA authenticating operation with the server to obtain second authentication information, and based on one of the first authentication information or the second authentication information, perform an operation for the profile transfer.

20 Claims, 19 Drawing Sheets

(56) References Cited

U.S. PATENT DOCUMENTS

| | | |
|---|---|---|
| 2005/0289195 A1 | 12/2005 | Lehtola et al. |
| 2015/0304506 A1 | 10/2015 | Zhu et al. |
| 2015/0349825 A1 | 12/2015 | Lee et al. |
| 2016/0050557 A1 | 2/2016 | Park et al. |
| 2016/0087961 A1 | 3/2016 | Levy et al. |
| 2016/0301529 A1 | 10/2016 | Park et al. |
| 2018/0198783 A1* | 7/2018 | Liu ............... H04W 76/10 |
| 2019/0058989 A1 | 2/2019 | Park et al. |
| 2020/0059778 A1* | 2/2020 | Li ............... H04W 8/205 |
| 2020/0137566 A1* | 4/2020 | Jin ............... H04W 12/43 |
| 2021/0006964 A1 | 1/2021 | Lee et al. |
| 2021/0076195 A1* | 3/2021 | Chaugule ............ H04W 12/40 |
| 2021/0076204 A1* | 3/2021 | Goyal ............... H04L 67/306 |
| 2021/0105609 A1* | 4/2021 | Park ............... H04W 8/205 |
| 2021/0168598 A1* | 6/2021 | Park ............... H04W 8/205 |
| 2021/0400466 A1* | 12/2021 | Chaugule ............ H04W 60/04 |
| 2022/0007174 A1 | 1/2022 | Li et al. |
| 2022/0014913 A1 | 1/2022 | Huber et al. |
| 2022/0174495 A1* | 6/2022 | Lee ............... H04W 12/37 |
| 2023/0071492 A1* | 3/2023 | Chang ............... G06K 15/1868 |
| 2023/0081421 A1* | 3/2023 | Jin ............... H04W 60/04 |
| | | 455/418 |
| 2023/0136288 A1* | 5/2023 | Lim ............... H04L 63/0823 |
| | | 726/4 |
| 2023/0319573 A1* | 10/2023 | Li ............... H04W 12/041 |
| | | 726/9 |

FOREIGN PATENT DOCUMENTS

| | | |
|---|---|---|
| KR | 10-2014-0075603 A | 6/2014 |
| KR | 10-2016-0122061 A | 10/2016 |
| KR | 10-2017-0035242 A | 3/2017 |
| KR | 10-2021-0123269 A | 10/2021 |
| KR | 10-2021-0147822 A | 12/2021 |
| KR | 10-2368828 B1 | 2/2022 |
| WO | 2019-054753 A1 | 3/2019 |
| WO | 2021-002696 A1 | 1/2021 |

OTHER PUBLICATIONS

R. Ramneek, P. Hosein and S. Pack, "Secure and Scalable eSIM Service Provisioning Framework for Mobile Virtual Network Operators," 2023 24st Asia-Pacific Network Operations and Management Symposium (APNOMS), Sejong, Korea, Republic of, 2023, pp. 381-384. (Year: 2023).*

International Search Report dated May 4, 2023, issued in International Patent Application No. PCT /KR2023/001648.

* cited by examiner

ELECTRONIC DEVICE SUPPORTING PROFILE TRANSFER BETWEEN ELECTRONIC DEVICES AND OPERATING METHOD THEREOF

CROSS-REFERENCE TO RELATED APPLICATION(S)

This application is a continuation application, claiming priority under § 365(c), of an International application No. PCT/KR2023/001648, filed on Feb. 6, 2023, which is based on and claims the benefit of a Korean patent application number 10-2022-0045335, filed on Apr. 12, 2022, in the Korean Intellectual Property Office, and of a Korean patent application number 10-2022-0089865, filed on Jul. 20, 2022, in the Korean Intellectual Property Office, the disclosure of each of which is incorporated by reference herein in its entirety.

TECHNICAL FIELD

The disclosure relates to an electronic device supporting profile transfer between electronic devices and an operating method thereof.

BACKGROUND ART

In a wireless communication system, an electronic device (e.g., a user equipment (UE)) may access a wireless communication network and use a communication service, such as a voice communication service or a data communication service at a fixed location or while moving.

To provide the electronic device with the communication service, a suitable authenticating process is required. Generally, a universal integrated circuit card (UICC) is inserted into the electronic device, and the authenticating process may be performed between the electronic device and a server of a mobile network operator (MNO) which is a communication carrier via a universal subscriber identity module (USIM) installed in the UICC. The UICC may be called a subscriber identity module (SIM) card in a global system for mobile communications (GSM) scheme and may be called a universal subscriber identity module (USIM) card in a wideband code division multiple access (WCDMA), long term evolution (LTE), and/or new radio (NR) schemes.

If a user of the electronic device subscribes to a communication service provided by the communication carrier, the communication carrier may provide the user with a UICC (e.g., a SIM card or a USIM card), and the user may insert the UICC provided from the communication carrier into the electronic device. If the UICC is inserted into the electronic device, a USIM application installed in the UICC may be executed, and the suitable authenticating process may be performed, based on an encryption key value for authentication and an international mobile subscriber identity (IMSI) value stored in the UICC, with the server of the communication carrier at which the same IMSI value and encryption key value are stored. If authentication for the electronic device via the authenticating process is successful, the electronic device may use the communication service.

When being manufactured, the UICC is manufactured as a dedicated card for a specific communication carrier according to a request of the corresponding communication carrier, and authentication information (e.g., a USIM application and a subscriber ID (e.g., an IMSI) for network access of the corresponding communication carrier, and an encryption key value (e.g., a known K value or Ki value) may be loaded in advance. The UICC may be provided to a subscriber of a communication service through the corresponding communication carrier, and the communication carrier may perform various management operations, such as installation, modification, and deletion of an application within the UICC using various technologies, such as over the air (OTA) if necessary.

A user may insert the UICC into the electronic device to use a network and an application service of the corresponding communication carrier, and may use various information as it is in a new electronic device, such as authentication-related information, a phone number, and a personal phone book, which have been stored at the corresponding UICC, by inserting, into the new electronic device, the removable UICC inserted into the existing electronic device when replacing the electronic device.

Unlike the UICC which is manufactured and distributed exclusively for the communication carrier, a scheme has been proposed in which a user may purchase a UICC or subscribe (or purchase) to a communication service at a time point after obtaining the UICC, and as the user performs subscription and termination, and opening to the communication carrier, and/or subscription transfer (e.g., profile transfer or line transfer) to another communication carrier, a USIM application, a subscriber ID, and an encryption key value of the communication carrier may be remotely installed in the UICC, and authentication information of various communication carriers may be safely and flexibly installed and managed.

For example, a so-called embedded UICC (eUICC) capable of remotely installing a profile for providing a communication service via a network without replacing the UICC even if the user changes the communication carrier has been proposed. For example, the eUICC may be fixed in a form of a chip within the electronic device during a manufacturing process of the electronic device and manufactured as a preloaded UICC. So, the eUICC may be used in various electronic devices which may have a structure in which it is not easy to attach and detach the UICC physically, such as a machine to machine (M2M) device or a device to device (D2D) device as well as a general electronic device, such as a smartphone. An eUICC may also be referred to as an embedded SIM (eSIM).

For a case based on a physical SIM card, a user may detach the physical SIM from an electronic device (e.g., an existing electronic device) and then insert the physical SIM into an external electronic device (e.g., a new electronic device). Accordingly, a subscription (or a line) of the corresponding SIM may be transferred from the electronic device to the external electronic device.

However, for a case based on an eSIM or a soft SIM rather than the physical SIM card, there is no proposal for a scheme for transferring a profile to transfer the subscription (or the line) from the electronic device to another electronic device.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Solution

Aspects of the disclosure are to address at least the above-mentioned problems and/or disadvantages and to provide at least the advantages described below. Accordingly, an aspect of the disclosure is to provide an electronic device supporting profile transfer between electronic devices and an operating method thereof.

Additional aspects will be set forth in part in the description which follows and, in part, will be apparent from the description, or may be learned by practice of an embodiment.

In accordance with an aspect of the disclosure, an electronic device is provided. The electronic device includes at least one communication circuit, and at least one processor electrically connected to the at least one communication circuit. The at least one processor is configured to provide first information which triggers profile transfer from an external electronic device to the electronic device. The at least one processor is configured to, based on the profile transfer which is based on an extensible authentication protocol authentication and key agreement (EAP-AKA) authenticating operation being possible, obtain first authentication information which is obtained via the EAP-AKA authenticating operation between the external electronic device and a server associated with the profile transfer. The at least one processor is configured to, based on the profile transfer which is based on the EAP-AKA authenticating operation being impossible, perform, via the at least one communication circuit, an authenticating operation different from the EAP-AKA authenticating operation with the server to obtain second authentication information. The at least one processor is configured to, based on one of the first authentication information or the second authentication information, perform at least one operation for the profile transfer.

In accordance with another aspect of the disclosure, an electronic device including at least one communication circuit, and at least one processor electrically connected to the at least one communication circuit is provided. The at least one processor is configured to obtain first information which triggers profile transfer from the electronic device to an external electronic device. The at least one processor is configured to, based on the profile transfer which is based on an EAP-AKA authenticating operation being possible, perform, via the at least one communication circuit, the EAP-AKA authenticating operation with a server associated with the profile transfer to obtain and provide first authentication information. The at least one processor is configured to, based on the profile transfer which is based on the EAP-AKA authenticating operation being impossible, provide second information which triggers performance of an authenticating operation different from the EAP-AKA authenticating operation between the external electronic device and the server.

In accordance with another aspect of the disclosure, an electronic device including at least one communication circuit and at least one processor electrically connected to the at least one communication circuit is provided. The at least one processor is configured to obtain first information which triggers profile transfer from the electronic device to an external electronic device. The at least one processor is configured to, based on the profile transfer which is based on an extensible authentication protocol authentication and key agreement (EAP-AKA) authenticating operation being possible, perform, via the at least one communication circuit, the EAP-AKA authenticating operation with a server associated with the profile transfer to obtain and provide first authentication information. The at least one processor is configured to, based on the profile transfer which is based on the EAP-AKA authenticating operation being impossible, provide second information which triggers performance of an authenticating operation different from the EAP-AKA authenticating operation between the external electronic device and the server.

In accordance with another aspect of the disclosure, a method of operating an electronic device is provided. The method includes providing first information which triggers profile transfer from an external electronic device to the electronic device. The method includes, based on the profile transfer which is based on an EAP-AKA authenticating operation being possible, obtaining first authentication information which is obtained via the EAP-AKA authenticating operation between the external electronic device and a server associated with the profile transfer. The method includes, based on the profile transfer which is based on the EAP-AKA authenticating operation being impossible, performing an authenticating operation different from the EAP-AKA authenticating operation with the server to obtain second authentication information. The method includes, based on one of the first authentication information or the second authentication information, performing at least one operation for the profile transfer.

In accordance with another aspect of the disclosure, a method of operating an electronic device is provided. The method includes obtaining first information which triggers profile transfer from the electronic device to an external electronic device. The method includes, based on the profile transfer which is based on an EAP-AKA authenticating operation being possible, performing the EAP-AKA authenticating operation with a server associated with the profile transfer to obtain and provide first authentication information. The method includes, based on the profile transfer which is based on the EAP-AKA authenticating operation being impossible, providing second information which triggers performance of an authenticating operation different from the EAP-AKA authenticating operation between the external electronic device and the server.

In accordance with another aspect of the disclosure, a non-transitory computer readable storage medium is provided. The non-transitory computer readable storage medium includes one or more programs, the one or more programs comprising instructions configured to, when executed by at least one processor of an electronic device, cause the electronic device to provide first information which triggers profile transfer from an external electronic device to the electronic device. The instructions are configured to cause the electronic device to, based on the profile transfer which is based on an EAP-AKA authenticating operation being possible, obtain first authentication information which is obtained via the EAP-AKA authenticating operation between the external electronic device and a server associated with the profile transfer. The instructions are configured to cause the electronic device to, based on the profile transfer which is based on the EAP-AKA authenticating operation being impossible, perform an authenticating operation different from the EAP-AKA authenticating operation with the server to obtain second authentication information. The instructions are configured to cause the electronic device to, based on one of the first authentication information or the second authentication information, perform at least one operation for the profile transfer.

According to an embodiment, a non-transitory computer readable storage medium includes one or more programs, the one or more programs comprising instructions configured to, when executed by at least one processor of an electronic device, cause the electronic device to obtain first information which triggers profile transfer from the electronic device to an external electronic device. The instructions are configured to cause the electronic device to, based on the profile transfer which is based on an EAP-AKA authenticating operation being possible, perform the EAP-AKA authenticating operation with a server associated with the profile transfer to obtain and provide first authentication information. The instructions are configured to cause the electronic device to, based on the profile transfer which is based on the EAP-AKA authenticating operation being impossible, provide second information which triggers performance of an authenticating operation different from the EAP-AKA authenticating operation between the external electronic device and the server.

Other aspects, advantages, and salient features of the disclosure will become apparent to those skilled in the art from the following detailed description, which, taken in conjunction with the annexed drawings, discloses an embodiment of the disclosure.

DESCRIPTION OF THE DRAWINGS

The above and other aspects, features, and advantages of an embodiment of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of an embodiment of the disclosure as defined by the claims and their equivalents. It includes various specific details to assist in that understanding but these are to be regarded as merely exemplary. Accordingly, those of ordinary skill in the art will recognize that various changes and modifications of an embodiment described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of an embodiment of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
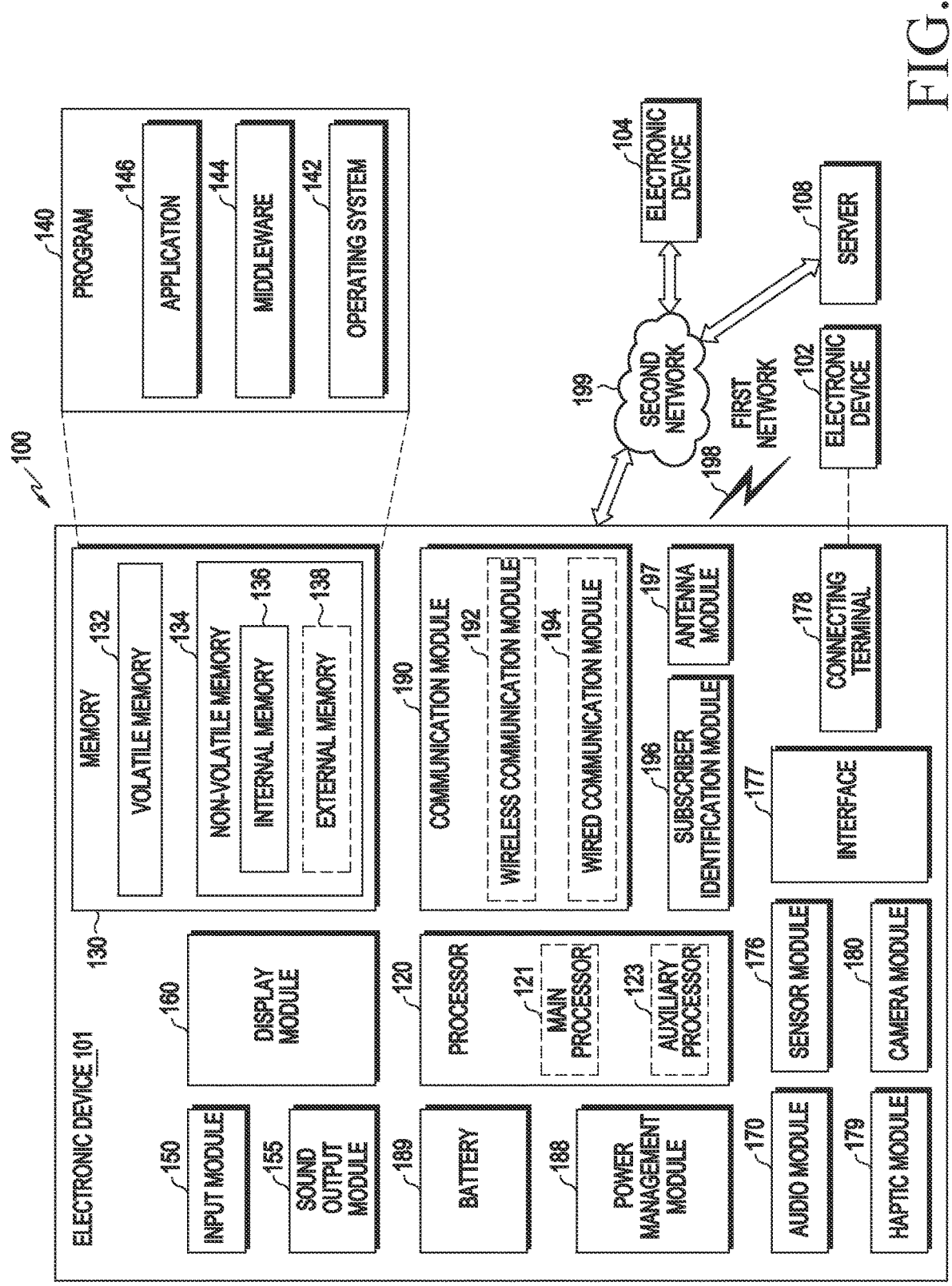
FIG. 1A is a block diagram illustrating an electronic device within a network environment according to an embodiment of the disclosure.

FIG. 1A is a block diagram illustrating an electronic device in a network environment according to an embodiment of the disclosure.

Referring to FIG. 1A, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one of the components (e.g., the connecting terminal 178) may be omitted from the electronic device 101, or one or more other components may be added in the electronic device 101. In an embodiment, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep beliefnetwork (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., the electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to a particular embodiment and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," "or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or two or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 1B:
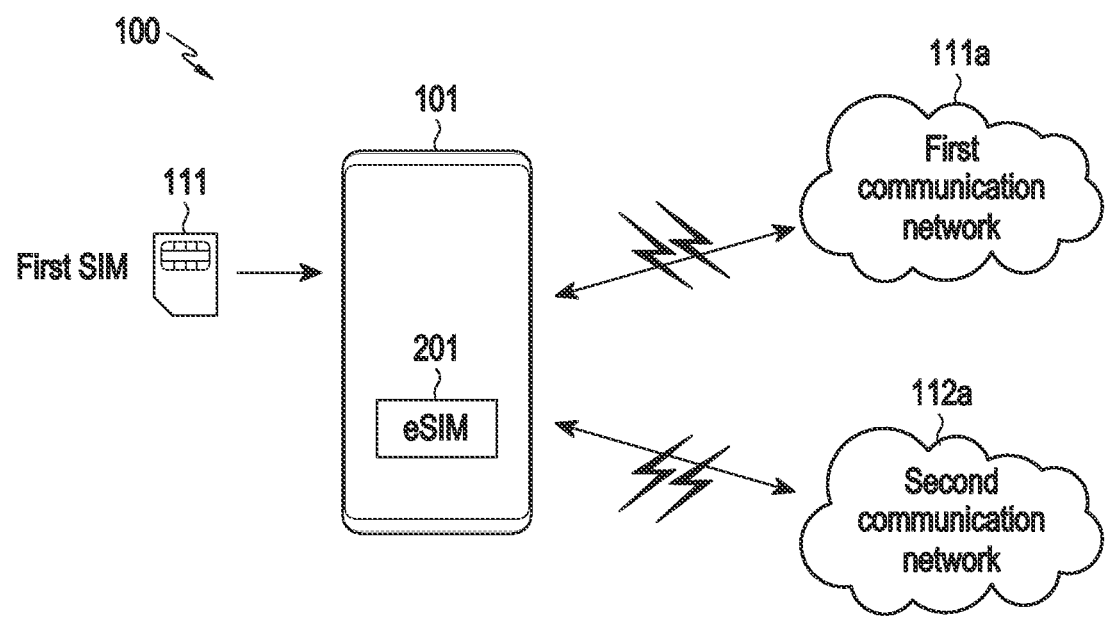
FIG. 1B is a diagram illustrating a network environment including an electronic device according to an embodiment of the disclosure.

FIG. 1B is a diagram illustrating a network environment including an electronic device according to an embodiment of the disclosure.

Referring to FIG. 1B, a network according to an embodiment of the disclosure may include an electronic device 101, a first communication network 111a, and/or a second communication network 112a.

According to an embodiment, the electronic device 101 may operate as a dual SIM dual standby (DSDS) electronic device or a dual SIM dual active (dual SIM dual active: DSDA) electronic device which supports two subscriber identity modules (SIMs) in one device. For example, the electronic device 101 may include a first SIM 111 and an embedded SIM (eSIM) 201. The first SIM 111 may be a removable SIM (rSIM). For example, a SIM card may be equipped in the electronic device 101. Hereinafter, for convenience of a description, the SIM card will be referred to as a SIM. The electronic device 101 may include a slot (not shown) to accommodate the first SIM 111. According to an embodiment, although not separately shown in FIG. 1A, the electronic device 101 may accommodate two or more SIMs. In this case, the electronic device 101 may include a plurality of slots for accommodating a plurality of SIMs.

For example, the first SIM 111 may be a SIM subscribed to a communication carrier of the first communication network 111a. The electronic device 101 may receive a wireless communication service by accessing the first communication network 111a using the first SIM 111. According to an embodiment, the electronic device 101 may include an eSIM 201. An eSIM may also be referred to as an embedded UICC (eUICC). The electronic device 101 may receive a wireless communication service by accessing the second communication network 112a using the eSIM 201. The first communication network 111a and the second communication network 112a may be provided by the same communication carrier or by different communication carriers.

Figure 2:
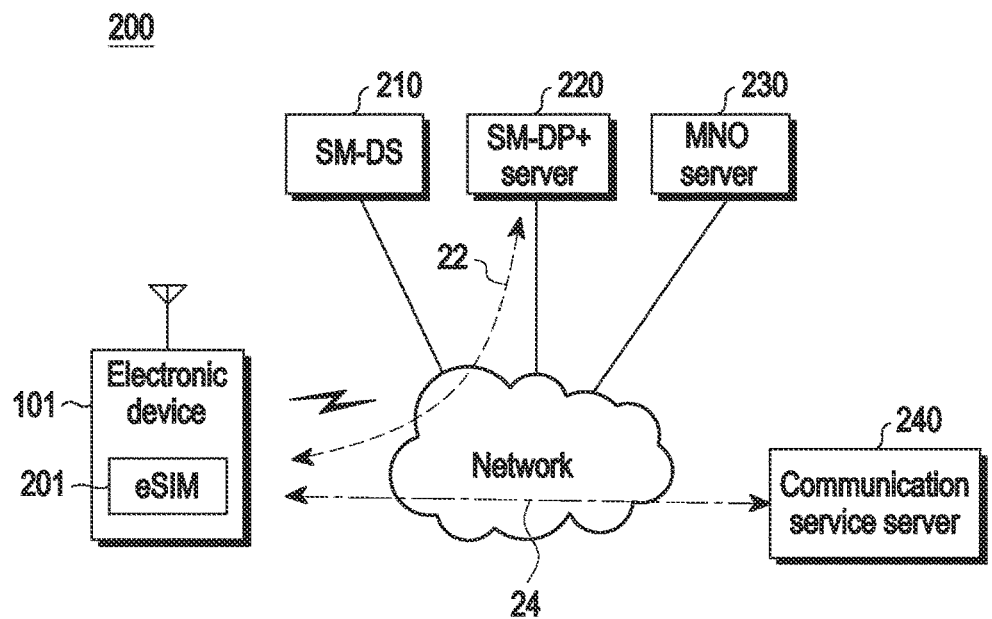
FIG. 2 is a diagram illustrating a system for providing an electronic device with a profile-based communication connection according to an embodiment of the disclosure.

FIG. 2 is a diagram illustrating a system for providing an electronic device with a profile-based communication connection according to an embodiment of the disclosure.

Referring to FIG. 2, according to an embodiment, a system 200 may include an electronic device 101, a subscription manager discovery server (SM-DS) 210, a subscription manager data preparation plus (SM-DP+) server 220, a mobile network operator (MNO) server 230, and a communication service server 240.

According to an embodiment, the electronic device 101 (e.g., an electronic device 101 in FIG. 1A or 1B) may include an eSIM 201. For convenience of a description, although not separately illustrated in FIG. 2, the electronic device 101 may include at least one slot capable of accommodating at least one rSIM. According to an embodiment, the electronic device 101 may include or accommodate N (here, N is a natural number) SIMs (e.g., eSIMs or rSIMs) and may perform a switching operation to use some of the N SIMs. In an embodiment, there may be no limitation to combining the N SIMs, and there may be also no limitation to a value of N.

According to an embodiment, the eSIM 201 may be inserted into the electronic device 101, provided integrally with the electronic device 101, or implemented to be accessible by the electronic device 101. According to an embodiment, the eSIM 201 may allow the electronic device 101 to perform an authenticating operation with the MNO server 230 using information (e.g., a profile including universal subscriber identity module (USIM) information) stored at the eSIM 201. According to an embodiment, the eSIM 201 may be called a SIM card in a global system for mobile communications (GSM) scheme or may be called a universal subscriber identity module (USIM) card in a wideband code division multiple access (WCDMA) scheme, a long-term evolution (LTE) scheme, and a new radio (NR) scheme. In addition to this, the eSIM 201 may be called various names according to communication schemes. For example, if a user of the electronic device 101 subscribes to a wireless communication service provided by the communication carrier, the electronic device 101 may use information (e.g., an international mobile subscriber identity (IMSI) value and a K value which is an encryption key for authentication) within the eSIM 201 to perform a suitable authenticating process with the MNO server 230 at which the same IMSI value and encryption key are stored.

If authentication via the authenticating process is successful, the electronic device 101 may use the wireless communication service. In an embodiment, the authenticating process may be based on an authentication scheme. The authentication scheme may be an extensible authentication protocol authentication and key agreement (EAP-AKA) scheme, an open identification (OPEN ID) scheme, or a short message service one time password (SMS-OTP) scheme. The EAP-AKA scheme may be an authentication scheme using a physical SIM (e.g., a USIM) or an eSIM profile, and may follow RFC 4187, but may not be limited thereto. The OPEN ID scheme may be an authentication scheme using an ID/password on a web page of the communication carrier. The SMS-OTP scheme may be an OTP scheme using an SMS.

According to an embodiment, the eSIM 201 may be manufactured in a form of a dedicated card for a specific communication carrier according to a request of the corresponding communication carrier, and may be preloaded with authentication information (e.g., a USIM application and a subscriber ID (e.g., an IMSI)), and an encryption key (e.g., a known K value or Ki value) for a network access of the corresponding communication carrier. An application (or information) within the eSIM 201 may be installed, modified, deleted, or updated using various technologies, such as an over the air (OTA) if necessary.

According to an embodiment, the eSIM 201 may download and/or store information for providing a communication service, in the form of a profile. According to an embodiment, the profile may be installed or stored in a manufacturing process of the eSIM 201 or may be downloaded by the electronic device 101 with the OTA scheme and installed or stored in the eSIM 201.

For example, the profile may include a provisioning profile and an operational profile. Even though the provisioning profile is not installed, the electronic device 101 may download the operational profile through a short-range connection which is based on a wireless fidelity (Wi-Fi) scheme or an Internet connection, and those skilled in the art will understand that the provisioning profile does not necessarily need to be installed on the electronic device 101. For example, the operational profile may be a profile including subscriber identification information of the user of the electronic device 101, and the provisioning profile may include information (hereinafter, it will be also referred to as "first information") for downloading subscriber identity information or a profile (hereinafter, it will be also referred to as a "first operational profile") including subscriber identity information (hereinafter, it will be also referred to as "first subscriber identity information") in the electronic device 101.

The electronic device 101 may download the first operational profile based on the first information in the provisioning profile within the eSIM 201.

According to an embodiment, the electronic device 101 may receive a communication service using subscriber identity information (hereinafter, it will be also referred to as "second subscriber identity information") in an operational profile (hereinafter, it will be also referred to as a "second operational profile") installed or stored in the eSIM 201. For example, the profile including subscriber identification information may be a SIM profile.

According to an embodiment, the operational profile may further include, in addition to the subscriber identification information, at least one of network access authentication information of the subscriber, a phone book of the subscriber, personal information (e.g., a short message service (SMS)) of the subscriber, a subscribed communication carrier name, a usable service, usable data amount, fee or a service provision speed, or information related to subscriber authentication and traffic security key generation required upon accessing a wireless communication network (e.g., a GSM communication network, a WCDMA communication network, an LTE communication network, and an NR communication network).

According to an embodiment, the first information used for downloading data (e.g., the first operational profile) including the first subscriber identity information may include communication session information for a first communication connection designated for downloading the first operational profile. For example, the communication session information may include access information for the SM-DS 210 for downloading the first operational profile and/or communication carrier network information usable for an access to the SM-DS 210.

According to an embodiment, the SM-DS 210 may provide the electronic device 101 with an address of the SM-DP+ server 220 for downloading the first operational profile based on the provisioning profile.

According to an embodiment, the SM-DP+ server 220 may be a profile providing server, an off-card entity of profile domain, a profile encrypting server, a profile generating server, a profile provisioner, or a profile provider. The SM-DP+ server 220 may establish a first communication connection 22 with the electronic device 101 through a wireless communication network based on a first communication connection request based on the provisioning profile from the electronic device 101, and may provide the electronic device 101 with the first operational profile through the first communication connection 22.

According to an embodiment, the wireless communication network may be a specific node of the wireless communication network. For example, the wireless communication network may be a base station, a subscriber information management node, and/or a mobility management node of the wireless communication network. According to an embodiment, the wireless communication network may include a home position register (HLR) and/or authentication center (AuC) server which is accessed by the electronic device 101 to perform a subscriber authenticating function. Upon succeeding in subscriber authentication, the electronic device 101 may access the communication service server 240 to receive various communication services, such as a voice communication or data communication.

According to an embodiment, the MNO server 230 may be a server associated with a mobile communication network operator. According to an embodiment, the MNO server 230 may request the SM-DS+ server 220 to prepare for at least one profile (or profile package) (e.g., the first operational profile) associated with at least one subscriber identity information (e.g., the first subscriber identity information), and may transmit information associated with the first operational profile to the SM-DS+ server 220. According to an embodiment, the MNO server 230 may transmit a signal for updating and managing the first operational profile to the SM-DS+ server 220. The MNO server 230 may allow a second communication connection 24 between the electronic device 101 and the communication service server 240 through the second operational profile installed in the eSIM 201 of the electronic device 101.

According to an embodiment, the communication service server 240 may be a server providing communication services. According to an embodiment, the communication service may be a service associated with transmission and/or reception of data through a wireless communication network. According to an embodiment, the communication service may include a service associated with transmission and/or reception of another profile (or data) not including subscriber identity information other than downloading the operational profile (e.g., the first operational profile including the first subscriber identity information). For example, the communication service server 240 may include various service servers associated with data transmission and reception, such as a server associated with each of various applications, a push server, a search server, and/or a market server. A communication service by the communication service server 240 may include various services, such as data transmission/reception by an application, notification reception, push message reception, link reception and access, and/or service request.

According to an embodiment, upon requesting a service associated with transmission and/or reception of a profile (or data) not including subscriber identification information, the electronic device 101 may establish the second communication connection 24 with the communication service server 240 based on the second operational profile.

According to an embodiment, the SM-DS 210, the SM-DP+ server 220, the MNO server 230, and/or the communication service server 240 are just an example in which an entity for performing a corresponding function is implemented in a form of a server, and may be referred to as other names, and each of the SM-DS 210, the SM-DP+ server 220, the MNO server 230, and/or the communication service server 240 may be implemented with one or a plurality of servers. Some or all of the SM-DS 210, the SM-DP+ server 220, the MNO server 230, and/or the communication service server 240 may be implemented as a single integrated server.

Figure 3:
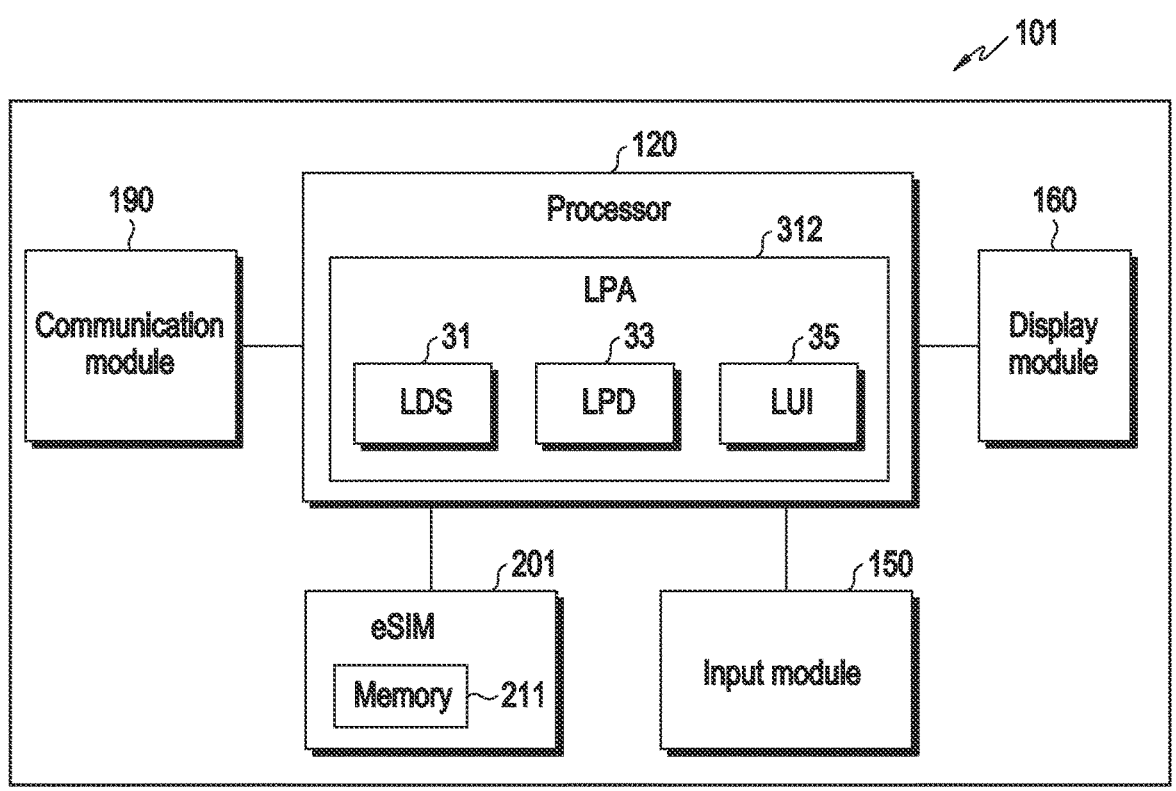
FIG. 3 is a block diagram illustrating a structure of an electronic device according to an embodiment of the disclosure.

FIG. 3 is a block diagram illustrating a structure of an electronic device according to an embodiment of the disclosure.

Referring to FIG. 3, an electronic device 101 in FIG. 1A or 1B or an electronic device 101 in FIG. 2 according to an embodiment may include a processor 120, an eSIM 201, a communication module 190, a display module 160, and an input module 150. For convenience of a description, although not separately illustrated, the electronic device 101 may include two or more slots capable of accommodating two or more rSIMs.

According to an embodiment, the processor 120 (e.g., a processor 120 in FIG. 1A) may include one or more processors (e.g., a main processor 121 and an auxiliary processor 123 in FIG. 1A, or an application processor and a communication processor), and include a local profile assistant (LPA) 312 (e.g., an LPA device (LPAd)) according to an embodiment. According to an embodiment, if the processor 120 includes a plurality of processors, a portion of the LPA 312 may be included in some of the plurality of processors, and another portion of the LPA 312 may be included in others of the plurality of processors. According to an embodiment, the LPA 312 may be included in the eSIM 201 and, in this case, the LPA 312 may be referred to as an LPAe (or eUICC).

According to an embodiment, the LPA 312 may perform a communication with a server to support an operation of downloading, installing, and managing a profile of the eSIM 201, or may perform an operation of providing a user interface (UI) required for the operation of downloading, installing, and managing the profile. The LPA 312 may include local discovery services (LDS) 31, local profile download (LPD) 33, and local user interface (LUI) 35 operations within the electronic device 101.

According to an embodiment, the LDS 31 may perform an operation of performing a communication with an SM-DS 210, and an operation of receiving an address of an SM-DS+ server 220 capable of downloading an operational profile based on a provisioning profile from an SM-DS server 210 and communication with the SM-DS server 210.

According to an embodiment, the LPD 33 may perform an operation of establishing a first communication connection 22 with the SM-DS+ server 220 through a wireless communication network based on the address of the SM-DS+ server 220 and receiving a first operational profile from the SM-DS+ server 220 through the first communication connection 22. According to an embodiment, the LPD 33 may support an operation of downloading, enabling, disabling, and deleting a profile, or a profile policy rule (PPR) download operation, started by a network, and may support an operation of enabling, disabling, and deleting a profile, or an eUICC reset operation by the electronic device 101.

According to an embodiment, the LUI 35 may perform an operation of providing various U is upon downloading the operational profile. According to an embodiment, the LUI 35 may support data exchange between the user and the LDS 31 and the LPD 33 and may include a UI for transferring a user's input to the LDS 31 or the LPD 33.

According to an embodiment, the processor 120 may perform a communication service based on information stored in the eSIM 201 using (or by executing) the LPA 312. For example, the processor 120 may establish a first communication connection to download a profile (e.g., the first operational profile) including first subscriber identity information, with the SM-DS+ server 220 through the communication module 190 based on the provisioning profile stored in the eSIM 201, using the LPA 312. Upon request of transmission and/or reception of data and/or a profile not including subscriber identity information while establishing the first communication connection using the LPA 312, the processor 120 may release the first communication connection and establish a second communication connection based on second subscriber identity information to perform an operation of transmitting and/or receiving the data and/or profile not including the subscriber identity information.

According to an embodiment, the eSIM 201 (e.g., a subscriber identification module 196 in FIG. 1A or an eSIM 201 in FIG. 2) may include one or a plurality of profiles, as information for receiving a communication service. A profile may mean a packaging, in a form of software, of at least one of an application, a file system, or an authentication key value stored in the eSIM 201. For example, the profile may include a provisioning profile and an operational profile. The operational profile may include subscriber identification information, and may further include, in addition to the subscriber identification information, at least one of network access authentication information of the subscriber, a phone book of the subscriber, personal information (e.g., an SMS) of the subscriber, a subscribed communication carrier name, a usable service, usable data amount, fee or a service provision speed, or information related to subscriber authentication and traffic security key generation required upon accessing a wireless communication network (e.g., a GSM communication network, a WCDMA communication network, an LTE communication network, and an NR communication network). According to an embodiment, the operational profile may include a SIM profile. For example, the SIM profile may include an SIM file system (a master file (MF), a dedicated file (DF), and an elementary file (EF)), and subscriber identification information (e.g., an IMSI value) may be stored in the elementary file.

According to an embodiment, the provisioning profile may be a profile including first information for downloading the first operational profile in the electronic device 101. For example, the first information may include communication session information for the first communication connection designated for downloading the first operational profile. For example, the communication session information may include access information for an SM-DS (e.g., an SM-DS 210 in FIG. 2) for downloading the first operational profile, and may include communication carrier network information usable for an access to the SM-DS.

According to an embodiment, the communication module 190 (e.g., a communication module 190 in FIG. 1A) may perform a first communication based on the provisioning profile or a second communication based on the second operational profile. At least one screen associated with the first communication based on the provisioning profile or the second communication based on the second operational profile may be displayed on the display device 160.

Referring to FIG. 3, although a case that the LPA 312 is included in the processor 120 has been described as an example, at least some functions of the LPA 312 may be performed by the processor 120, or a separate LPA 312 may be operated in conjunction with the processor 120. For example, the LPA 312 may be included in a program (e.g., a program 140 in FIG. 1A) and may be loaded onto the processor 120 and executed, and if the LPA 312 is loaded on the processor 120 and executed, it may be understood as an operation of the processor 120. According to an embodiment, function modules (e.g., the LDS 31, the LPD 33, and/or the LUI 35) included in the LPA 312 are illustratively separated, may be expressed in other functional modules, and may not be limited to the corresponding form. According to an embodiment, the LPA 312 may be included within the eSIM 201.

Figure 4:
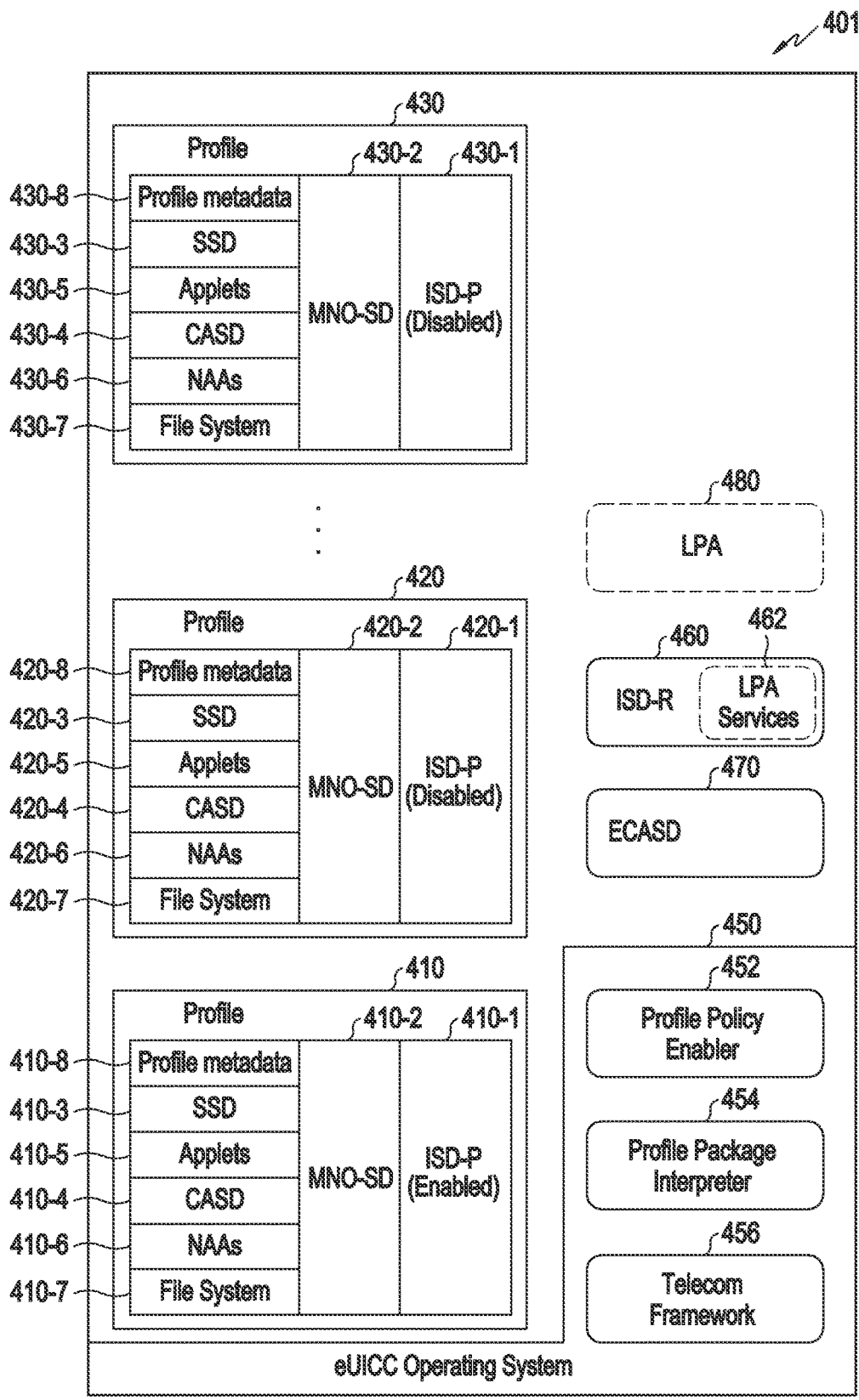
FIG. 4 is a diagram illustrating an internal structure of an embedded universal integrated circuit card (eUICC) according to an embodiment of the disclosure.

FIG. 4 is a diagram illustrating an internal structure of an eUICC according to an embodiment of the disclosure.

Referring to FIG. 4, an eUICC 401 (e.g., an eSIM 201 in FIG. 2 or 3) may have a form, such as a card or chip, and at least one profile (e.g., a profile 410, a profile 420, or a profile 430) with a software form may be installed in the eUICC 401.

According to an embodiment, each of the profiles 410, 420, and 430 may be a provisioning profile or an operational profile. The profiles 410, 420, and 430 may operate on an eUICC operating system (OS) 450. Each of the profiles 410, 420, and 430 may be enabled or disabled by a processor or an LPA (e.g., an LPA 312 in FIG. 3 or an LPA 480 in FIG. 4). Referring to FIG. 4, it will be assumed that one profile 410 may be in an enabled state, and the remaining profiles 420 and 430 may be in a disabled state. According to an embodiment, two or more profiles may be enabled within the eUICC 401.

According to an embodiment, the eUICC OS 450 of the eUICC 401 may include a profile policy enabler 452, a profile package interpreter 454, and a telecom framework 456. According to an embodiment, the profile policy enabler 452 may manage a policy rule (e.g., a profile policy rule (PPR)) for each of the profiles 410, 420, and 430. According to an embodiment, the profile package interpreter 454 may unpackage a profile package received from an SM-DP+ server (e.g., an SM-DP+ server 220 in FIG. 2), in a form which may be installed in the eUICC 401.

According to an embodiment, the telecom framework 456 may perform a function associated with a communication of applications within the eUICC 401. According to an embodiment, the eUICC 401 may include an issuer security domain root (ISD-R) 460, and an eUICC controlling authority security domain (ECASD) 470.

According to an embodiment, the ISD-R 460 may manage the profiles 410, 420, and 430 installed in the eUICC 401.

For example, the ISD-R 460 may include LPA services 462, and the LPA services 462 may manage the profiles 410, 420, and 430 installed in the eUICC 401 through an interface with the processor or the LPA (e.g., the LPA 312 in FIG. 3 or the LPA 480 in FIG. 4). According to an embodiment, the ECASD 470 may perform security processing on the profiles 410, 420, and 430 installed in the eUICC 401.

According to an embodiment, each of the profiles 410, 420, and 430 may include an ISD-P 410-1, 420-1 or 430-1, an MNO-SD 410-2, 420-2, or 430-2, a supplementary security domain (SSD) 410-3, 420-3, or 430-3, a controlling authority security domain (CASD) 410-4, 420-4, or 430-4, Applets 410-5, 420-5, or 430-5, network access applications (NAAs) 410-6, 420-6 or 430-6, a file system 410-7, 420-7, or 430-7, or profile metadata 410-8, 420-8, or 430-8.

According to an embodiment, the ISD-P 410-1, 420-1, or 430-1 may include information for decoding and interpretation of the profile package, and may be used to unpackage and install the profile package received from the SM-DP+ in cooperation with the profile package interpreter 454.

According to an embodiment, the MNO-SD 410-2, 420-2, or 430-2 may include an OTA key of an MNO, and may include information for providing a secure OTA channel capable of communicating with the MNO.

According to an embodiment, the SSD 410-3, 420-3, or 430-3 and the CASD 410-4, 420-4, or 430-4 may include information for performing security processing on a profile.

According to an embodiment, the Applets 410-5, 420-5, or 430-5 may include various application information associated with a user of the profile.

According to an embodiment, the NAAs 410-6, 420-6, or 430-6 may include application information which allows the profile to access a network.

According to an embodiment, the file system 410-7, 420-7, or 430-7 may include a file system associated with each information of the profile.

According to an embodiment, the profile metadata 410-8, 420-8, or 430-8 may also be referred to as a profile record, and may include metadata information about the profile in a text form. The metadata information may include at least one of an integrated circuit card ID (ICCID) of the profile, a profile name, a name of an MNO providing the profile, a user's profile nickname, an icon, a profile class, notification configuration information, profile owner information, or a PPR.

According to an embodiment, the ICCID of the profile, as a profile identifier, may indicate a unique identifier of each profile. The name of the profile may include a name of each profile. The name of the MNO providing the profile may include a name of a communication carrier which provides the profile. The user's profile nickname may include a profile nickname specified by the user. The icon may include an icon corresponding to the profile. The profile class may include information indicating whether a type of the profile is a provisioning profile or an operational profile. The notification configuration information may include an address of a server (e.g., an SM-DP+ server 220 in FIG. 2) to receive notifications. The profile owner information may include at least one of a mobile country code (MCC), a mobile network code (MNC), or group identifier (GID) 1 or 2 information associated with a profile owner. For example, the MCC may be a code for identifying a country, and the MNC may be a code for identifying a mobile communication carrier. The GID 1 or 2 may be code area information for identifying a group or an area to which the profile belongs. Area information may include information about a group including a plurality of countries. The PPR may include policy rule information for managing the profile.

According to an embodiment, the electronic device (e.g., an electronic device 101 in FIG. 1A or 1B an electronic device 101 in FIG. 2, or an electronic device 101 in FIG. 3) may identify whether each of the profiles 410, 420, and 430 is a provisioning profile or an operational profile based on the profile class information of the profile metadata 410-8, 420-8, or 430-8 included in each of the profiles 410, 420, and 430 included in the eUICC 401 and enable or disable each of the provisioning profile or the operational profile via the LPA 480 (e.g., an LPA 312 in FIG. 3).

Figure 5:
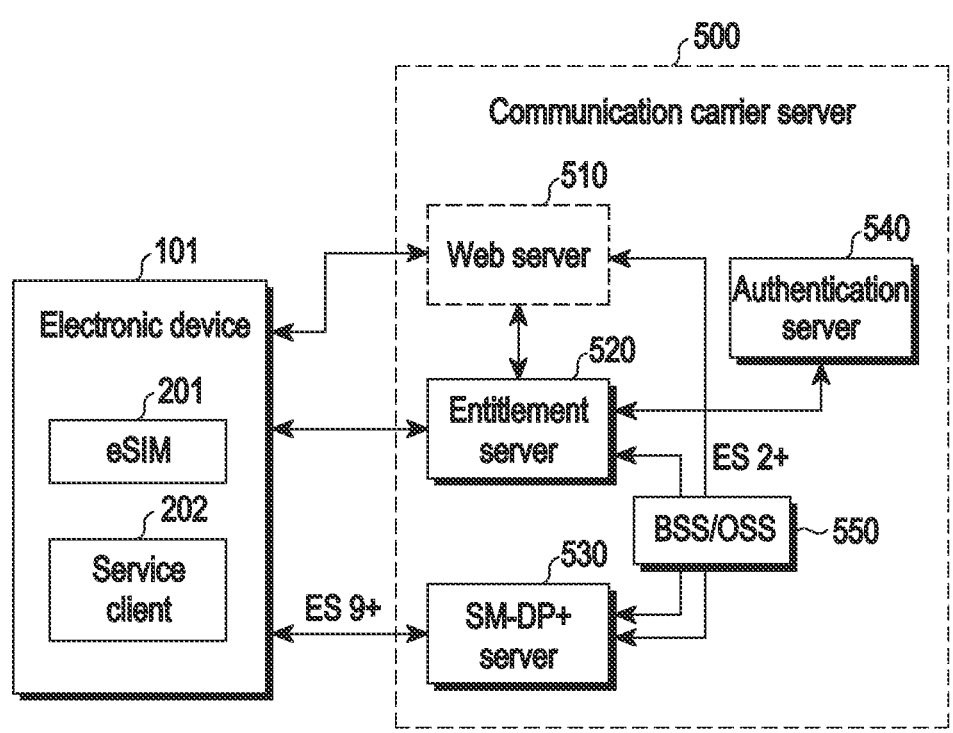
FIG. 5 is a block diagram illustrating a network system for line transfer according to an embodiment of the disclosure.

FIG. 5 is a block diagram illustrating a network system for line transfer according to an embodiment of the disclosure.

Referring to FIG. 5, a network system according to an embodiment may include an electronic device 101 (e.g., an electronic device 101 in FIG. 1A or 1B, an electronic device 101 in FIG. 2, or an electronic device 101 in FIG. 3), and a communication carrier server 500.

The communication carrier server 500 may include at least one of an entitlement server (or an entitlement configuration server) 520, an SM-DP+ server 530, an authentication server 540, or business support systems (BSS)/operation support systems (OSS) 550. According to an embodiment, the communication carrier server 500 may include a web server 510 or may not include the web server 510. For example, at least one of the web server 510, the entitlement server 520, the SM-DP+ server 530, the authentication server 540, or the BSS/OSS 550 may be included in the communication carrier server 500 managed by a communication carrier. According to an embodiment, the web server 510 and the entitlement server 520 may be servers managed by the same communication carrier or different communication carriers. According to an embodiment, the entitlement server 520 and the SM-DP+ server 530 may be servers managed by the same communication carrier or different communication carriers.

An eSIM 201 may be inserted into the electronic device 101 or the eSIM 201 may be embedded in the electronic device 101. A profile may be downloaded and installed in the eSIM 201. A service client 202 may be installed in the electronic device 101 for a communication with the communication carrier server 500 according to an embodiment to be described later. In an embodiment, the electronic device 101 may include a physical SIM without including the eSIM 201, and a profile may be downloaded and installed in the physical SIM.

According to an embodiment, the electronic device 101 may access the entitlement server 520 via the service client 202 and access the web server 510 via the accessed entitlement server 520. For example, if the electronic device 101 accesses the entitlement server 520, the entitlement server 520 may perform an authentication operation and an eligibility check operation for the electronic device 101 or a user of the electronic device 101 via the BSS/OSS 550 or the authentication server 540. If the authentication operation and the eligibility check operation for the electronic device 101 or the user of the electronic device 101 are successful (for example, if authentication for the electronic device 101 or the user of the electronic device 101 is successful, and the electronic device 101 or the user of the electronic device 101 is eligible), the entitlement server 520 may transmit, to the electronic device 101, information required for an access to the web server 510.

The electronic device 101 may access the web server 510 using the information required for the access to the web server 510 received via the entitlement server 520. According to an embodiment, the electronic device 101 may request subscription, opening, or line transfer (or subscription transfer or profile transfer) via a web page provided by the web server 510. According to an embodiment, the electronic device 101 may request the subscription, the opening, or the line transfer via the entitlement server 520 without the web server 510. For example, if the communication carrier server 500 does not include the web server 510, or if the communication carrier server 500 includes the web server 510, and does not provide information related to the web server 510 (for example, an address of the web server 510)(for example, if a web service or a web page is not provided via the web server 510), the electronic device 101 may request the subscription, the opening, or the line transfer via the entitlement server 520. According to an embodiment, the web server 510 may provide a UI or a web page for the entitlement server 520. For example, the electronic device 101 may request the subscription, the opening, or the line transfer via the web page provided from the web server 510. According to an embodiment, the entitlement server 520 may provide line management and creation, service control, and status information. For example, the entitlement server 520 may include an entitlement server or an entitlement configuration server specified in GSM association (GSMA) standard document TS. 43. In the standard document TS. 43, the term "entitlement" may include meaning of applicability, availability, or status of a service required before providing a service (e.g., a communication service) to the user of the electronic device 101. For example, the entitlement server 520 may perform a function of delivering information (e.g., profile download information or profile download-related information) related to a profile provided to the electronic device 101. In the description to be described later, profile information may include information related to a profile, and may also be referred to as profile download information or profile download-related information for convenience of a description. The entitlement server 520 may include a discovery and push function (DPF), an SM-DS, subscription manager secure routing (SM-SR), subscription manager secure routing plus (SM-SR+), an off-card entity of eUICC Profile Manager or a profile management credentials holder (PMC holder), or an eUICC manager (EM), but may not be limited thereto.

According to an embodiment, the SM-DP+ server 530 may perform a function of managing and downloading a profile. For example, the SM-DP+ server 530 may include, in addition to SM-DP+, at least one of subscription manager data preparation (SM-DP), an off-card entity of Profile Domain, a profile encrypting server, a profile generating server, a profile provisioner (PP), a profile provider, or a profile provisioning credentials holder (PPC holder), but may not be limited thereto.

According to an embodiment, an electronic device (e.g., an electronic device 102 or 104 in FIG. 1A) may comprise at least one communication circuit (e.g., a communication module 190 in FIG. 1A or 3), and at least one processor (e.g., a processor 120 in FIG. 1A or 3) electrically connected to the at least one communication circuit (e.g., the communication module 190 in FIG. 1A or 3).

According to an embodiment, the at least one processor (e.g., the processor 120 in FIG. 1A or 3) may be configured to provide first information which triggers profile transfer from an external electronic device (e.g., an electronic device 101 in FIG. 1A, 1B, 2, 3, or 5) to the electronic device (e.g., the electronic device 102 or 104 in FIG. 1A).

According to an embodiment, the at least one processor (e.g., the processor 120 in FIG. 1A or 3) may be further configured to, based on the profile transfer which is based on an extensible authentication protocol authentication and key agreement (EAP-AKA) authenticating operation being possible, obtain first authentication information which is obtained via the EAP-AKA authenticating operation between the external electronic device (e.g., the electronic device 101 in FIG. 1A, 1B, 2, 3, or 5) and a server (e.g., an entitlement server 520 in FIG. 5) associated with the profile transfer.

According to an embodiment, the at least one processor (e.g., the processor 120 in FIG. 1A or 3) may be further configured to, based on the profile transfer which is based on the EAP-AKA authenticating operation being impossible, perform, via the at least one communication circuit (e.g., the communication module 190 in FIG. 1A or 3), an authenticating operation different from the EAP-AKA authenticating operation with the server (e.g., the entitlement server 520 in FIG. 5) to obtain second authentication information.

According to an embodiment, the at least one processor (e.g., the processor 120 in FIG. 1A or 3) may be further configured to, based on one of the first authentication information or the second authentication information, perform at least one operation for the profile transfer.

According to an embodiment, the first information may include a web link, and the web link may be connected to an application supporting the profile transfer which is based on the EAP-AKA authenticating operation.

According to an embodiment, if the application is run via the web link in the external electronic device (e.g., the electronic device 101 in FIG. 1A, 1B, 2, 3, or 5), the profile transfer which is based on the EAP-AKA authenticating operation may be possible.

According to an embodiment, the first information may further include at least one of device information of the electronic device (e.g., the external electronic device 102 or 104 in FIG. 1A), or encryption information to be used for the external electronic device (e.g., the electronic device 101 in FIG. 1A, 1B, 2, 3, or 5) to encrypt one of the first authentication information or the second authentication information.

According to an embodiment, the at least one processor (e.g., the processor 120 in FIG. 1A or 3) may be configured to, obtain second information which triggers performance of the different authenticating operation between the electronic device (e.g., the electronic device 102 or 104 in FIG. 1A) and the server (e.g., the entitlement server 520 in FIG. 5), and based on the second information being obtained, perform, via the at least one communication circuit (e.g., the communication module 190 in FIG. 1A or 3), the different authenticating operation with the server (e.g., the entitlement server 520 in FIG. 5) to obtain second authentication information.

According to an embodiment, the first information may be outputted in a form of a quick response (QR) code, or transmitted based on a short-range wireless communication scheme.

According to an embodiment, the different authenticating operation may include a short message service one time password (SMS-OTP) authenticating operation.

According to an embodiment, the at least one operation may comprise, an operation of requesting the profile transfer from the server (e.g., the entitlement server 520 in FIG. 5), an operation of receiving address information used for the electronic device (e.g., the electronic device 102 or 104 in FIG. 1A) to access the server (e.g., the entitlement server 520 in FIG. 5) from the server (e.g., the entitlement server 520 in FIG. 5) in response to the request, an operation of accessing the server (e.g., the entitlement server 520 in FIG. 5) based on the address information to identify a user input indicating the profile transfer, an operation of receiving download information to be used for downloading a profile from the server (e.g., the entitlement server 520 in FIG. 5), based on the user input being identified, and an operation of downloading the profile from another server (e.g., an SM-DP+ server 530) associated with the profile based on the download information.

According to an embodiment, the at least one operation may further comprise, an operation of performing an eligibility check operation with the server (e.g., the entitlement server 520 in FIG. 5) before requesting the profile transfer from the server (e.g., the entitlement server 520 in FIG. 5), and the profile transfer may be requested based on a result of eligibility check operation indicating success.

According to an embodiment, an electronic device (e.g., an electronic device 101 in FIG. 1A, 1B, 2, 3, or 5) may comprise at least one communication circuit (e.g., a communication module 190 in FIG. 1A or 3), and at least one processor (e.g., a processor 120 in FIG. 1A or 3) electrically connected to the at least one communication circuit (e.g., the communication module 190 in FIG. 1A or 3).

According to an embodiment, the at least one processor (e.g., the processor 120 in FIG. 1A or 3) may be configured to obtain first information which triggers profile transfer from the electronic device (e.g., the electronic device 101 in FIG. 1A, 1B, 2, 3, or 5) to an external electronic device (e.g., an electronic device 102 or 104 in FIG. 1A).

According to an embodiment, the at least one processor (e.g., the processor 120 in FIG. 1A or 3) may be configured to, based on the profile transfer which is based on an extensible authentication protocol authentication and key agreement (EAP-AKA) authenticating operation being possible, perform, via the at least one communication circuit (e.g., the communication module 190 in FIG. 1A or 3), the EAP-AKA authenticating operation with a server (e.g., an entitlement server 520 in FIG. 5) associated with the profile transfer to obtain and provide first authentication information.

According to an embodiment, the at least one processor (e.g., the processor 120 in FIG. 1A or 3) may be configured to, based on the profile transfer which is based on the EAP-AKA authenticating operation being impossible, provide second information which triggers performance of an authenticating operation different from the EAP-AKA authenticating operation between the external electronic device (e.g., the electronic device 102 or 104 in FIG. 1A) and the server (e.g., the entitlement server 520 in FIG. 5).

According to an embodiment, the first information may include a web link, and the web link may be connected to an application supporting the profile transfer which is based on the EAP-AKA authenticating operation.

According to an embodiment, the at least one processor (e.g., the processor 120 in FIG. 1A or 3) may be further configured to, identify that the profile transfer which is based on the EAP-AKA authenticating operation is possible when the application is run via the web link.

Figure 6:
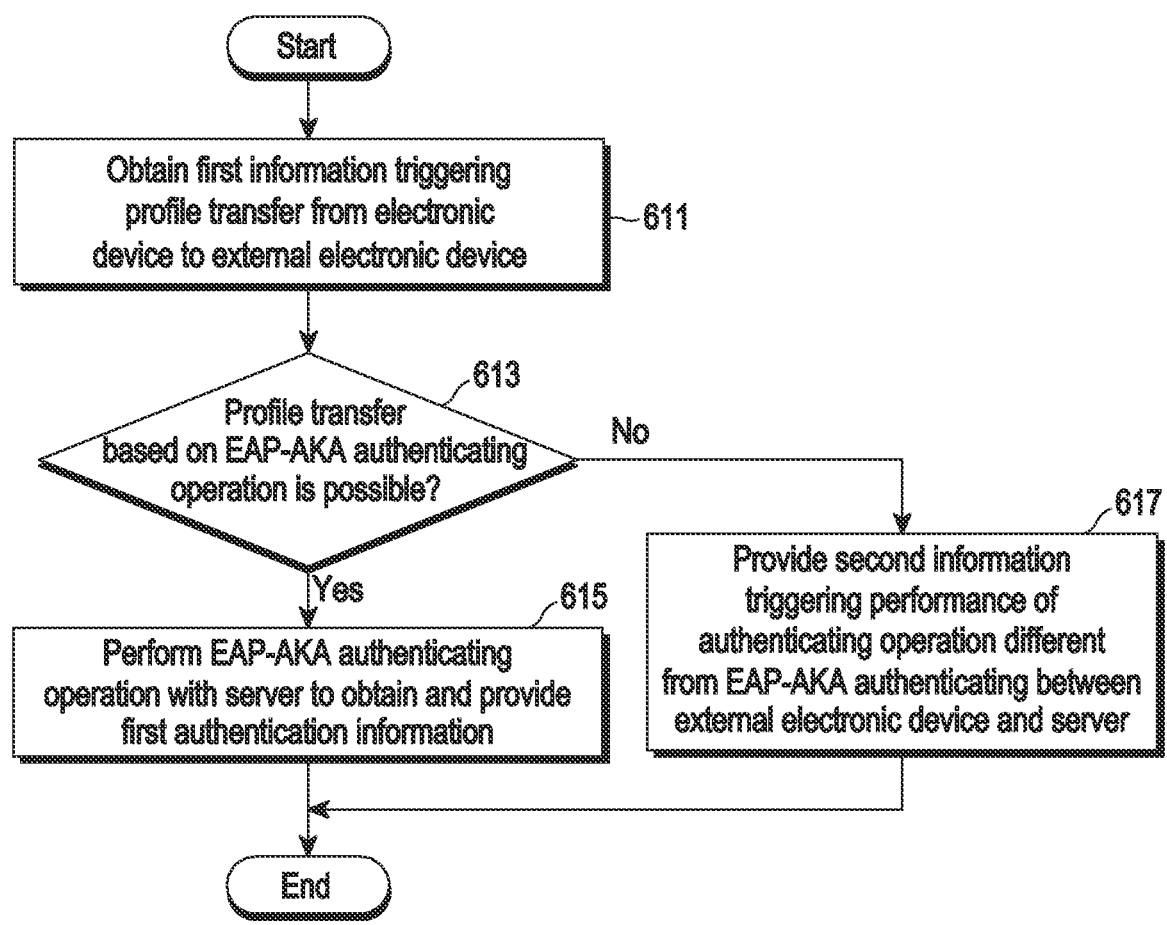
FIG. 6 is a flowchart illustrating an operating process of an electronic device according to an embodiment of the disclosure.

FIG. 6 is a flowchart illustrating an operating process of an electronic device according to an embodiment of the disclosure.

Referring to FIG. 6, in operation 611, an electronic device (e.g., at least one of an electronic device 101 in FIG. 1A, 1B, 2, 3, or 5)(e.g., a processor (e.g., at least one of a processor 120 in FIG. 1A or 3)) may obtain first information triggering profile transfer from the electronic device to an external electronic device (e.g., an electronic device 102 and/or an electronic device 104 in FIG. 1A). For example, the electronic device may be an existing electronic device which has stored a profile associated with subscription, and the external electronic device may be a new electronic device requesting download of the profile associated with subscription. Hereinafter, for convenience of a description, a case that a profile (subscription or line) is transferred from an electronic device to an external electronic device may also be referred to as "profile transfer from an electronic device to an external electronic device". In the following description, "profile transfer from an electronic device to an external electronic device" may be used interchangeably with "subscription transfer from an electronic device to an external electronic device", "line transfer from an electronic device to an external electronic device", or "transfer of an SIM of an electronic device to an external electronic device".

In operation 613, the electronic device may identify whether profile transfer based on an EAP-AKA authenticating operation is possible. For example, the electronic device may identify whether the profile transfer based on the EAP-AKA authenticating operation is possible based on first information.

If the profile transfer based on the EAP-AKA authenticating operation is possible (operation 613—Yes), in operation 615, the electronic device may perform the EAP-AKA authenticating operation with a server (e.g., an entitlement server 520 in FIG. 5) associated with the profile transfer via a communication circuit (e.g., a communication module 190 in FIG. 1A or 3) to obtain and provide first authentication information.

If the profile transfer based on the EAP-AKA authenticating operation is impossible (operation 613-No), in operation 617, the electronic device may provide second information triggering performance of an authenticating operation different from the EAP-AKA authenticating operation between the external electronic device and the server. For example, the different authenticating operation may be an SMS-OTP authenticating operation, but is not limited thereto. As the electronic device provides the second information, the external electronic device may perform the SMS-OTP authenticating operation with the server to obtain the second authentication information.

Figure 7:
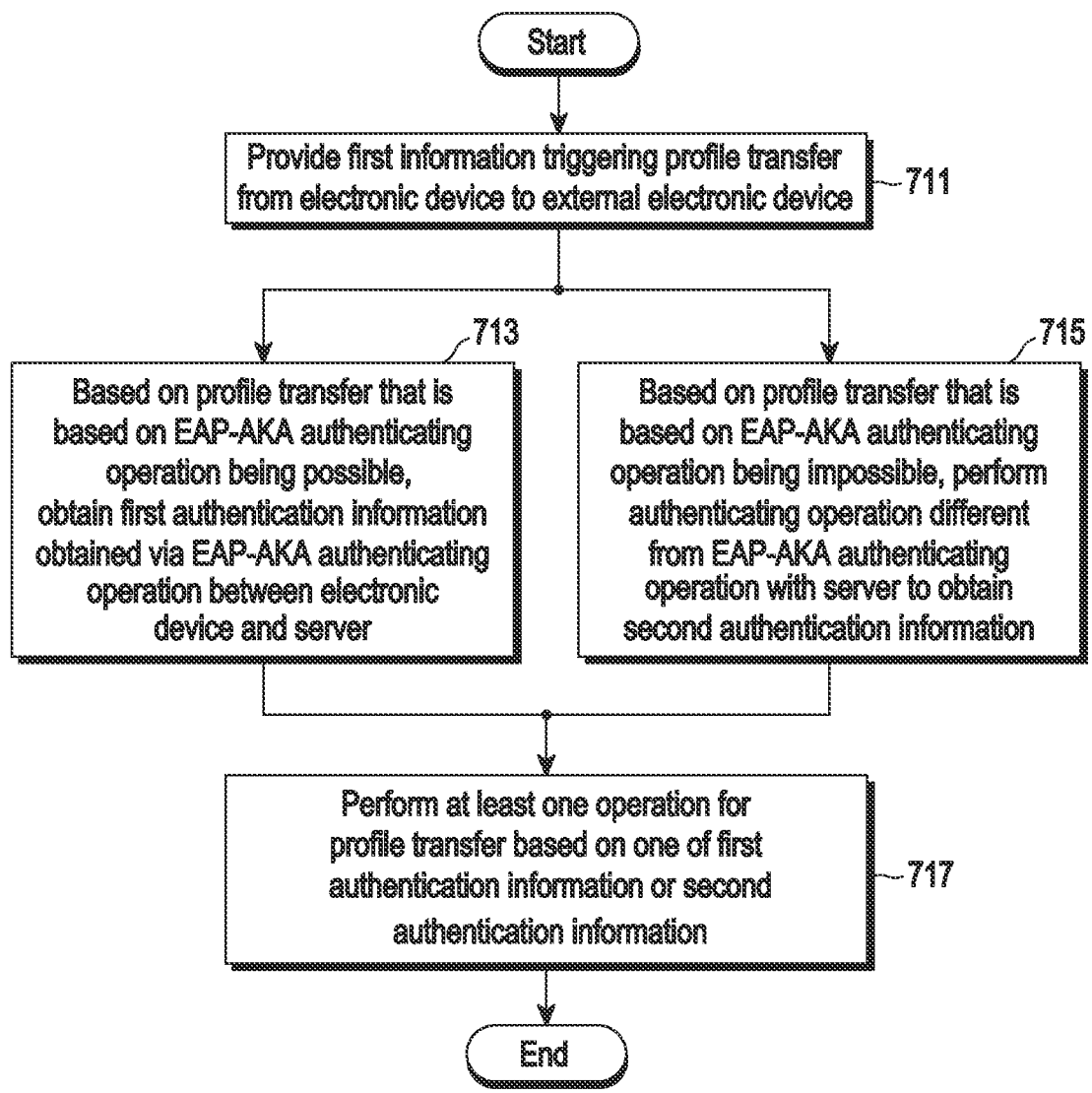
FIG. 7 is a flowchart illustrating an operating process of an external electronic device according to an embodiment of the disclosure.

FIG. 7 is a flowchart illustrating an operating process of an external electronic device according to an embodiment of the disclosure.

Referring to FIG. 7, an external electronic device (e.g., an electronic device 102 and/or an electronic device 104 in FIG. 1A) (e.g., a processor of the external electronic device, and the processor may be substantially the same as a processor 120), in operation 711, may provide first information triggering profile trigger from an electronic device (e.g., at least one of an electronic device 101 in FIG. 1A, 1B, 2, 3, or 5) (e.g., a processor (e.g., at least one of a processor 120 in FIG. 1A or 3)) to the external electronic device.

In operation 713, the external electronic device may obtain first authentication information obtained via an EAP-AKA authenticating operation between a server and the electronic device based on profile transfer being possible based on an EAP-AKA authenticating operation by the electronic device. In an embodiment, if the profile transfer based on the EAP-AKA authenticating operation is possible, the electronic device may perform an EAP-AKA authenticating operation with the server to obtain and provide the first authentication information. The external electronic device may obtain the first authentication information, which is provided by the electronic device, obtained via the EAP-AKA authenticating operation between the server and the electronic device.

In operation 715, the external electronic device may perform an authenticating operation different from the EAP-AKA authenticating operation with the server to obtain second authentication information based on the profile transfer being impossible based on the EAP-AKA authenticating operation by the electronic device. For example, the different authenticating operation may be an SMS-OTP authenticating operation, and the external electronic device may perform the SMS-OTP authenticating operation with the server to obtain the second authentication information.

In operation 717, the external electronic device may perform at least one operation for profile transfer based on one of the first authentication information or the second authentication information.

For example, the at least one operation may include at least one of an operation of performing an eligibility check operation with the server, an operation of requesting profile transfer from the server if a result of the eligibility check operation indicates success, an operation of receiving, from the server, address information used for the external electronic device to access the server in response to a request, an operation of accessing the server based on address information to identify a user input indicating profile transfer, an operation of receiving download information to be used for downloading a profile associated with the profile transfer from the server based on the user input being identified, or an operation of downloading a profile from another server (e.g., an SM-DP+ server 530 in FIG. 5) associated with the profile based on the download information.

Figure 8A:
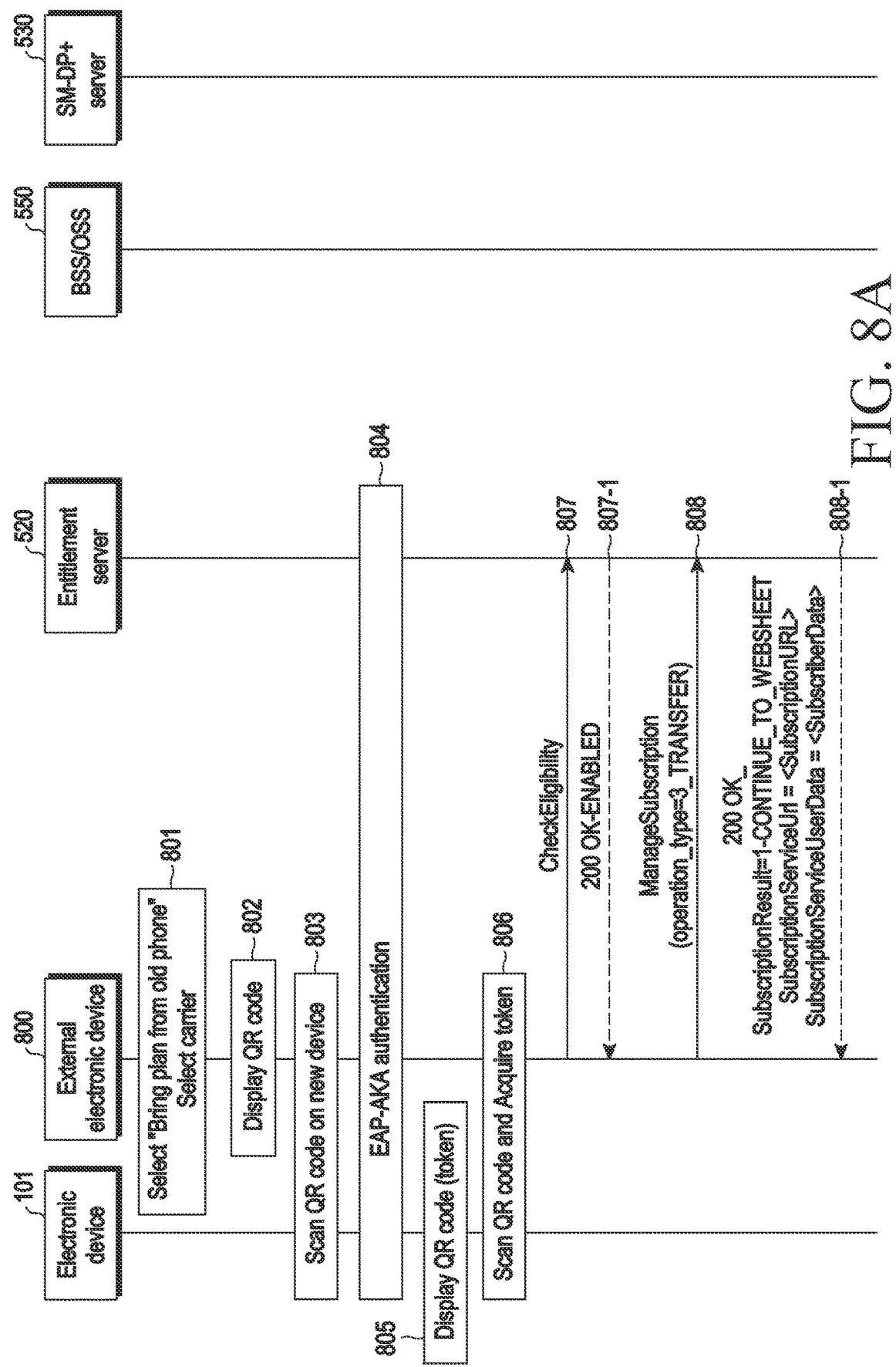
FIGS. 8A and 8B are signal flowcharts illustrating a profile transferring process between electronic devices in a wireless communication network according to an embodiment of the disclosure.
Figure 8B:
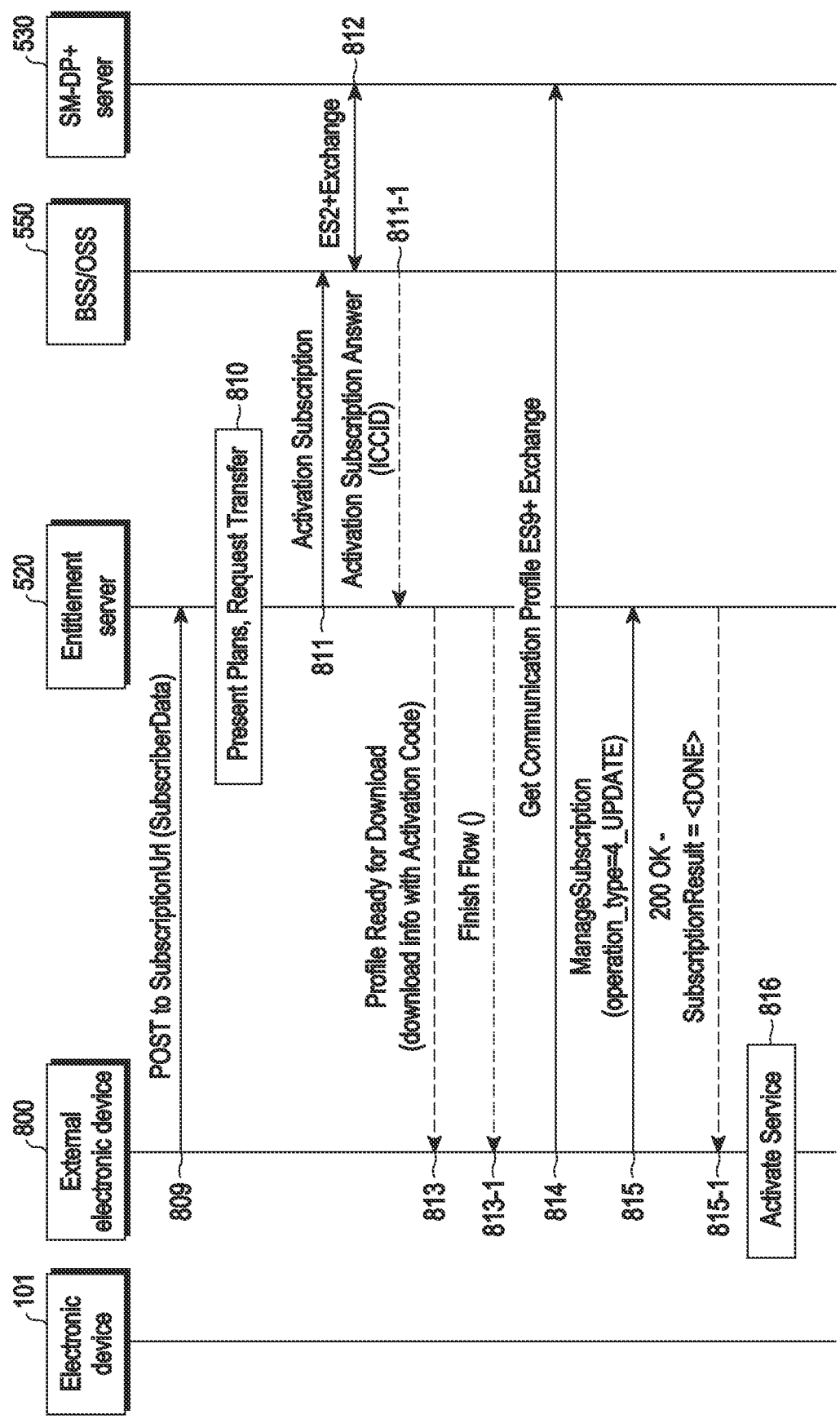

FIGS. 8A and 8B are signal flowcharts illustrating a profile transferring process between electronic devices in a wireless communication network according to an embodiment of the disclosure.

A profile transfer process between electronic devices illustrated in FIGS. 8A and 8B may be a profile transfer process between electronic devices in a case that an electronic device 101 (e.g., an electronic device in 101 FIG. 1A, 1B, 2, 3, or 5), which is an existing electronic device, supports an application which supports the transfer process between electronic devices. Hereinafter, for convenience of a description, the application supporting the profile transfer between electronic devices will be referred to as a "profile transfer application". In an embodiment, the profile transfer application may be a profile transfer application which supports an authenticating process (or an authenticating operation) based on an EAP-AKA scheme. Hereinafter, for convenience of a description, the authenticating process based on the EAP-AKA scheme will be referred to as an "EAP-AKA authenticating process", and a profile transfer application supporting the EAP-AKA authenticating process will be referred to as "EAP-AKA-based profile transfer application".

Referring to FIGS. 8A and 8B, in operation 801, an external electronic device 800 (e.g., an electronic device 102 or an electronic device 104 in FIG. 1A) may identify a user input (e.g., a user input for selecting profile transfer between electronic devices) associated with profile transfer between electronic devices. For example, the external electronic device 800 may output (e.g., display) a UI (e.g., a profile transfer menu between electronic devices) for selecting the profile transfer between electronic devices, and identify the user input via the UI. The UI may include information for selecting to transfer a profile of the electronic device 101 to the external electronic device 800, or may include information for selecting to transfer a profile (or subscription or a line) from the electronic device 101 to the external electronic device 800 for intuitive recognition by the user. In operation 801, the external electronic device 800 may identify a user input for selecting a carrier as well as the user input for the profile transfer. Operation 801 may be expressed as "Select "Bring plan from old phone" & Select carrier" in FIG. 8A.

Based on the user input for selecting the profile transfer between electronic devices, in operation 802, the external electronic device 800 may display a QR code. The display for the QR code may be an example of providing first information which is information associated with trigger for transferring subscription of the electronic device 101 to the external electronic device 800.

In an embodiment, the first information may be information which triggers transfer of a profile stored in the electronic device 101 to the external electronic device 800. In an embodiment, the profile may be stored in an eSIM (e.g., a subscriber identification module 196 in FIG. 1A, an eSIM 201 in FIG. 1B, 2, or 3, or an eUICC 401 in FIG. 4) of the electronic device 101, or may be stored in a physical SIM of the electronic device 101. For example, transfer of the subscription of the electronic device 101 to the external electronic device 800 may mean transfer of the profile stored in the electronic device 101 to the external electronic device 800. In an embodiment, the first information may be information for entering a trigger point which causes the profile stored in the electronic device 101 to start being transferred to the external electronic device 800.

In an embodiment, the first information may include a web link, and the web link may be connected to the EAP-AKA-based profile transfer application.

In an embodiment, the first information may further include device information of the external electronic device 800 or encryption information to be used for the electronic device 101 to encrypt authentication information to be obtained via an EAP-AKA authenticating process between the electronic device 101 and the entitlement server 520.

In an embodiment, the device information of the external electronic device 800 may include at least one of an international mobile equipment identity (IMEI) or an eUICC ID (EID) of the external electronic device 800.

In an embodiment, if an authenticating process between the electronic device 101 and the entitlement server 520 is the EAP-AKA authenticating process, the authentication information obtained via the EAP-AKA authenticating process between the electronic device 101 and the entitlement server 520 may be a token.

In an embodiment, the encryption information to be used for encrypting the authentication information may include at least one of a public key and account information (e.g., user account information) of the external electronic device 800. According to an embodiment, the authentication information may be encrypted based on at least one of various encryption schemes as well as an encryption scheme which is based on the public key.

In an embodiment, the external electronic device 800 may provide the first information in a form of a quick response (QR) code. For example, the external electronic device 800 may output (e.g., display) the first information in the form of the QR code, and the electronic device 101 may start transferring the profile of the electronic device 101 to the external electronic device 800 by scanning the QR code outputted on the external electronic device 800.

In an embodiment, if a near field communication (NFC) is activated, the external electronic device 800 may provide the first information via the NFC. As the first information is obtained, the electronic device 101 may start transferring the profile of the electronic device 101 to the external electronic device 800. Operation 802 may be expressed as "Display QR code" in FIG. 8A.

In operation 803, the electronic device 101 may obtain the first information. For example, if the external electronic device 800 outputs the first information in the form of the QR code, the electronic device 101 may obtain the first information by scanning the QR code outputted from the external electronic device 800. For another example, if the external electronic device 800 transmits the first information via the NFC, the electronic device 101 may obtain, via an NFC, the first information transmitted by the external electronic device 800. Upon obtaining the first information, the electronic device 101 may identify whether the electronic device 101 may support the profile transfer between electronic devices using the EAP-AKA authenticating process. In an embodiment, the electronic device 101 may obtain the first information transmitted by the external electronic device 800 via a wireless connection between the electronic device 101 and the external electronic device 800 even if the external electronic device 800 does not display separately the first information, such as outputting the first information in the form of the QR code.

In an embodiment, the first information may include the web link, and the web link may be connected to the EAP-AKA-based profile transfer application. If the electronic device 101 accesses the web link included in the first information and the EAP-AKA-based profile transfer application connected to the accessed web link is run, the electronic device 101 may identify that the electronic device 101 may support the profile transfer between electronic devices using the EAP-AKA authenticating process. For example, the web link may include a code connected to the EAP-AKA-based profile transfer application, and thus, if the EAP-AKA-based profile transfer application exists, the EAP-AKA-based profile transfer application may be run in the electronic device 101.

Alternatively, if the electronic device 101 is not connected to the web link included in the first information, that is, if the EAP-AKA-based profile transfer application does not exist, the electronic device 101 may identify that the electronic device 101 may not support the profile transfer between electronic devices using the EAP-AKA authenticating process. For example, the web link may include the code connected to the EAP-AKA-based profile transfer application, and thus, if the EAP-AKA-based profile transfer application does not exist, the EAP-AKA-based profile transfer application may not be run in the electronic device 101 and the electronic device 101 may be connected to the web link.

If the EAP-AKA-based profile transfer application does not exist, the electronic device 101 may perform an access to a web server based on the web link included in the first information. Referring to FIGS. 8A and 8B, it will be assumed that the electronic device 101 may support the profile transfer between electronic devices using the EAP-AKA authenticating process. If it is impossible for the electronic device 101 to support the profile transfer between electronic devices using the EAP-AKA authenticating process, no further operations may be performed. Operation 803 may be expressed as "Scan QR code on new device" in FIG. 8A.

Based on identification that the profile transfer between electronic devices using the EAP-AKA authenticating process may be supported, the electronic device 101 may perform the EAP-AKA authenticating process with the entitlement server 520 in operation 804. In an embodiment, the electronic device 101 may transmit the device information of the external electronic device 800 to the entitlement server 520 when performing the EAP-AKA authenticating process. For example, the device information of the external electronic device 800 may include at least one of an IMEI or an EID of the external electronic device 800. The device information of the external electronic device 800 transmitted to the entitlement server 520 when performing the EAP-AKA authenticating process may be the same as the device information of the external electronic device 800 included in the first information obtained in operation 803.

If a result of the EAP-AKA authenticating process indicates success, the electronic device 101 may obtain authentication information (e.g., a token). Referring to FIGS. 8A and 8B, it will be assumed that the result of the EAP-AKA authenticating process indicates the success, and if the result of the EAP-AKA authenticating process indicates failure, the electronic device 101 may not perform further operations.

In an embodiment, as the electronic device 101 transmits the device information of the external electronic device 800 to the entitlement server 520 when performing the EAP-AKA authenticating process, the entitlement server 520 may identify the external electronic device 800 which will actually use the authentication information obtained via the EAP-AKA authenticating process with the electronic device 101. The entitlement server 520 may map and manage the authentication information obtained via the EAP-AKA authenticating process with the electronic device 101 with the device information of the external electronic device 800. For example, the entitlement server 520 may identify that the authentication information will be used not only by the electronic device 101 but also by the external electronic device 800, so the entitlement server 520 may map and manage the authentication information with the device information of the external electronic device 800. Operation 804 may be expressed as "EAP-AKA authentication" in FIG. 8A.

In operation 805, the electronic device 101 may provide authentication-related information including the authentication information obtained via the EAP-AKA authenticating process.

In an embodiment, the authentication-related information may further include device information of the electronic device 101. In an embodiment, the device information of the electronic device 101 may include at least one of an IMEI, an EID, or a mobile station international subscriber directory number (MSISDN) of the electronic device 101.

In an embodiment, the authentication-related information may further include the device information of the external electronic device 800. The device information of the external electronic device 800 included in the authentication-related information may be the same as the device information of the external electronic device 800 included in the first information obtained in operation 803.

In an embodiment, the electronic device 101 may provide the authentication-related information in a form of a QR code. For example, the electronic device 101 may output (e.g., display) the authentication-related information in the form of the QR code, and the external electronic device 800 may obtain the authentication-related information by scanning the QR code outputted from the electronic device 101. Upon obtaining the authentication-related information, the external electronic device 800 may perform an eligibility check with the entitlement server 520 in order to transfer the profile of the electronic device 101 to the external electronic device 800.

In an embodiment, the authentication-related information may be encrypted based on encryption information. In an embodiment, the encryption information used for encrypting the authentication-related information may be the same as the encryption information included in the first information obtained in operation 803. For example, the electronic device 101 may encrypt encryption-related information based on a public key, but may not be limited thereto.

In an embodiment, if the NFC is activated in the electronic device 101, the electronic device 101 may provide the authentication-related information via the NFC. For example, the electronic device 101 may transmit the authentication-related information via the NFC, and the external electronic device 800 may obtain the authentication-related information transmitted from the electronic device 101 via an NFC tag. Upon obtaining the authentication-related information, the external electronic device 800 may perform an eligibility check with the entitlement server 520 in order to transfer the profile of the electronic device 101 to the external electronic device 800. Operation 805 may be expressed as "Display QR code (token)" in FIG. 8A.

In operation 806, the external electronic device 800 may obtain the authentication-related information including the authentication information obtained via the EAP-AKA authenticating process. For example, if the authentication-related information is outputted in the form of the QR code, the external electronic device 800 may obtain the authentication-related information by scanning the QR code outputted from the electronic device 101. For another example, if the authentication-related information is transmitted via the NFC, the external electronic device 800 may obtain the authentication-related information transmitted from the electronic device 101 via the NFC tag. Operation 806 may be expressed as "Scan QR code and Acquire token" in FIG. 8A. In an embodiment, the external electronic device 800 may obtain the authentication-related information transmitted from the electronic device 101 via the wireless connection between the external electronic device 800 and the electronic device 101 even if the external electronic device 800 displays the authentication-related information separately, such as outputting the authentication-related information in the form of the QR code in the electronic device 101.

Upon obtaining the authentication-related information, the external electronic device 800 may perform an eligibility check with the entitlement server 520 in order to transfer the profile of the electronic device 101 to the external electronic device 800 in operation 807. The external electronic device 800 may request the eligibility check from the entitlement server 520 based on a hypertext transfer protocol (HTTP) GET scheme or an HTTP POST scheme. For example, the external electronic device 800 may request the eligibility check by transmitting a first request message requesting the eligibility check to the entitlement server 520. According to an embodiment, the first request message may be a request message requesting the eligibility check.

The external electronic device 800 may transmit, to the entitlement server 520, the first request message including one of pieces of on-device service activation (OSDA) operation information as shown in Table 1 below, according to an ODSA process specified in standard document TS. 43.

TABLE 1

| ODSA operation | Description |
|---|---|
| CheckEligibility | To verify if end-user is allowed to invoke the ODSA application |
| ManageSubscription | To request for subscription-related action on a primary or companion device. |
| ManageService | To activate/deactivate the service on the primary or companion device. |
| AcquireConfiguration | To provide service-related data about a primary or companion device |
| AcquirePlan | To request available plans to be offered by the MNO to an specific user or MDM |

Referring to Table 1, in operation 807, the external electronic device 800 may request the eligibility check by transmitting the first request message including "CheckEligibility" as the ODSA operation information according to the ODSA process specified in standard document TS. 43. According to an embodiment, the first request message including CheckEligibility as the operation information may include the authentication-related information and the device information (e.g., the IMEI or the EID) of the external electronic device 800. According to an embodiment, the authentication-related information may include the authentication information (e.g., the token). Operation 807 may be expressed as "CheckEligibility" in FIG. 8A.

Although not separately shown in FIGS. 8A and 8B, the entitlement server 520 may transmit a profile query to the BSS/OSS 550. The profile query may include subscription identity information (e.g., "SubscriptionID"). The BSS/OSS 550 may transmit a profile answer corresponding to the profile query to the entitlement server 520.

Upon receiving the first request message including CheckEligibility as the operation information from the external electronic device 800, the entitlement server 520 may perform the eligibility check for the external electronic device 800 based on the authentication-related information and/or the device information of the external electronic device 800 included in the first request message including CheckEligibility as the operation information in operation 807-1. For example, the entitlement server 520 may perform the eligibility check for a device and a user of the external electronic device 800 based on the authentication-related information and/or the device information of the external electronic device 800.

If a result of the eligibility check for the external electronic device 800 indicates success, the entitlement server 520 may transmit, to the external electronic device 800, a 200 OK-ENABLED message as an answer message to the first request message including CheckEligibility as the operation information. Referring to FIGS. 8A and 8B, it will be assumed that result of the eligibility check for the external electronic device 800 indicates the success, and if the result of the eligibility check for the external electronic device 800 indicates failure, further operations may not be performed. In an embodiment, if the result of the eligibility check indicates the success, the 200 OK message may include information of "ENABLED". Operation 807-1 may be expressed as "200 OK-ENABLED" in FIG. 8A.

Upon receiving the 200 OK-ENABLED message from the entitlement server 520, the external electronic device 800 may transmit a second request message related to a subscription managing operation to the entitlement server 520 in operation 808. According to an embodiment, the second request message may be a request message requesting the subscription managing operation. In an embodiment, the subscription managing operation may include various operations related to a subscription.

In an embodiment, the second request message may include the ODSA operation information of "ManageSubscription" as shown in Table 1. "ManageSubscription" may be the ODSA operation information used to request a subscription-related operation. According to an embodiment, the second request message may further include the authentication-related information and/or the device information (e.g., the IMEI or the EID) of the external electronic device 800. According to an embodiment, the second request message may further include operation type information in Table 2 below as parameter information.

TABLE 2

| Parameter | Type | Values | Description |
| --- | --- | --- | --- |
| Operation type | Integer | 0-SUBSCRIBE | to activate a subscription for the eSIM device. |
| | | 1-UNSUBSCRIBE | to cancel a subscription for the eSIM device. |
| | | 2-CHANGE SUBSCRIPTION | to manage an existing subscription on the eSIM device. |
| | | 3-TRANSFER SUBSCRIPTION | to transfer a subscription from an existing device (with physical SIM or eSIM) to the eSIM device. |

TABLE 2-continued

| Parameter | Type | Values | Description |
| --- | --- | --- | --- |
| | | 4-UPDATE SUBSCRIPTION | to inform the network of a subscription update on the eSIM device |

Referring to Table 2, the second request message including "ManageSubscription" in Table 1 as the ODSA operation information may include at least one operation type among "SUBSCRIBE", "UNSUBSCRIBE", "CHANGE SUBSCRIPTION", "TRANSFER SUBSCRIPTION", or "UPDATE SUBSCRIPTION". The external electronic device 800 may transmit, to the entitlement server 520, the second request message including an operation type having a value of "3-TRANSFER SUBSCRIPTION" in Table 2. "TRANSFER SUBSCRIPTION" may be an operation type for transferring a profile of an existing electronic device (e.g., the electronic device 101) having an eSIM to another electronic device (e.g., the external electronic device 800) having an eSIM. Operation 808 may be expressed as "ManageSubscription(operation_type=3_TRANSFER)" in FIG. 8A.

Although not separately shown in FIGS. 8A and 8B, the entitlement server 520 may transmit a subscription query to the BSS/OSS 550. The subscription query may include subscription identity information (e.g., "SubscriptionID") or an IMEI. The BSS/OSS 550 may transmit a subscription answer message to the entitlement server 520 in response to receiving the subscription query. According to an embodiment, the subscription answer message may include address information (e.g., uniform resource locator (URL) information) capable of accessing a web server.

In response to receiving the subscription answer message, the entitlement server 520 may transmit, to the external electronic device 800, a 200 OK message as an answer message to the second request message including "ManageSubscription" as the ODSA operation information in operation 808-1.

According to an embodiment, the answer message (e.g., the 200 OK message) to the second request message may include subscription result ("SubscriptionResult") information in Table 3 below as parameter information.

TABLE 3

| Parameter | Type | Values | Description |
| --- | --- | --- | --- |
| Subscription Result | Integer | 1-CONTINUE TO WEBSHEET | Indicates that end-user must go through the subscription web view procedure, using information included below. |
| | | 2-DONWLOAD PROFILE | Indicates that a eSIM profile must be downloaded by the device, with further information included in response |
| | | 3-DONE | Indicates that subscription flow has ended and the end-user has already downloaded the eSIM profile so there is no need to perform any other action. |
| | | 4-DELAYED DOWNLOAD | Indicates that an eSIM profile is not ready to be downloaded when a user requests to transfer subscription or to add the new subscription through native UX on the eSIM device. |
| | | 5-DISMISS | Indicates that subscription flow has ended without completing the ODSA procedure. An eSIM profile is not available. |

The answer message (e.g., the 200 OK message) to the second request message related to the subscription managing operation may include at least one subscription result ("SubscriptionResult") information among "CONTINUE TO WEBSHEET", "DOWNLOAD PROFILE", "DONE", "DELAYED DOWNLOAD", or "DISMISS" as shown in Table 3. For example, the 200 OK message, which is the answer message to the second request message, may include "CONTINUE TO WEBSHEET", and may further include the address information (e.g., SubscriptionURL) capable of accessing the web server and/or user-related data (e.g., SubscriberData). According to an embodiment, the 200 OK message, which is the answer message to the second request message, may include download information which may be used to directly download the transferred profile instead of the address information of accessing the web server.

According to an embodiment, the 200 OK message, which is the answer message to the second request message, may include download information ("Download Info") in Table 4 below as the download information which may be used to download the transferred profile.

TABLE 4

| "Download Info" parameters | Type | Values | Description |
|---|---|---|---|
| ProfileIccid (Conditional) | String | ICCID of the eSIM profile to download from SM-DP+ | The ICCID shall be included in the case where ProfileSmdpAddress is used to trigger the profile download. Can be a new ICCID or the re-usable ICCID that was provided in the request parameter companion_terminal_iccid or target_terminal_iccid |
| ProfileSmdpAddress (Conditional) | String | URL to SM-DP+ platform of MNO | Address(es) of SM-DP+ to obtain eSIM profile. If more than one, they must be comma-separated. It is not needed if ProfileActivationCode is present. Note: for this download method to be used, the client must provide the EID of the eSIM in the request, as either terminal_eid, companion_terminal_eid or target_terminal_eid as defined in Table 25. |
| ProfileActivationCode (Conditional) | String | Encoded in Base64. Must follow the activation code format from GSMA SGP.22 | Activation code as defined in SGP.22 to permit the download of an eSIM profile from an SM-DP+. It is not needed if ProfileSmdpAddress is present. | terminal_eid, companion_terminal_eid, an target_terminal_eid in "terminal_eid, companion_terminal_eid or target_ terminal_eid as defined in Table 25" in Table 4 may be defined as in Table 5 below.

TABLE 5

| Parameters | Type | Values | Description |
|---|---|---|---|
| terminal_eid | String | | Used by the ManageSubscription and AcquireConfiguration operations for Primary ODSA, in case a primary SIM is not accessible (or not present). Terminal_id is associated with the device or eSIM being managed. |
| | | Value following eUICC format | eUICC identifier (EID) of the primary eSIM being managed |
| companion_terminal_eid | String | | Used by all the Companion ODSA operations. |
| | | Any string value | This value shall be a unique and persistent identifier of the device. This identifier may be an IMEI (preferred) or a UUID. |
| Target_terminal_eid | String | | Used by the ManageSubscription and AcquireConfiguration operations for Primary ODSA, in case of a multi-SIM device and terminal_id is associated with the device's other SIM. This parameter provides the identity of the eSIM being managed. |
| | | Any string value | This value shall be a unique and persistent identifier of the eUICC being managed. This identifier may be an IMEI associated with the eUICC. |

Operation 808-1 may be expressed as "200 OK/SubscriptionResult=1–CONTIUE_TO_WEBSHEET/SubscriptionServiceUrl=<SubscriptionURL>/SubscriptionServiceData=<SubscriberData>" in FIG. 8A.

The external electronic device 800 may perform an accessing operation to the entitlement server 520 including a web server (e.g., the web server 510 in FIG. 5) based on the accessible address information and/or the user-related data in operation 809. If the web server is implemented as a separate entity different from the entitlement server 520, the external electronic device 800 may perform the accessing operation to the entitlement server 520.

By performing the accessing operation to the entitlement server 520 including the web server, the external electronic device 800 may obtain a web page of the communication carrier and provide (for example, display) the obtained web page of the communication carrier. After providing (for example, after displaying) a UI (e.g., the web page of the communication carrier), the external electronic device 800 may identify a user input indicating profile transfer (or subscription transfer or line transfer). For example, the UI may include an object for causing confirmation of the profile transfer (or the subscription transfer or the line transfer), but may not be limited thereof. Operation 809 may be expressed as "POST to SubscriptionUrl (SubscriberData)" in FIG. 8B.

Based on the user input indicating the profile transfer being identified, the external electronic device 800 may request the profile transfer (or the subscription transfer or the line transfer) from the entitlement server 520 including the web server in operation 810. If the web server is implemented as a separate entity different from the entitlement server 520, the external electronic device 800 may request the profile request from the web server. Operation 810 may be expressed as "Presents Plans, Request Transfer" in FIG. 8B.

Upon identifying the request for the profile transfer from the external electronic device 800, the entitlement server 520 (or the web server) may transmit an Activation Subscription message to the BSS/OSS 550 in operation 811. For example, the Activation Subscription message may be referred to as "new subscription request". According to an embodiment, the Activation Subscription message may include information indicating that the external electronic device 800 requests the profile transfer. Operation 811 may be expressed as "Activation Subscription" in FIG. 8B.

Upon receiving the Activation Subscription message from the entitlement server 520 (or the web server), the BSS/OSS 550 may perform a new profile generating process, which generates a new profile, with the SM-DP+ server 530 via an ES2+ interface in operation 812. For example, the ES2+ interface may include at least one of DownloadOrder, ConfirmOrder, or ReleaseProfile. The new profile generating process performed in operation 812 may be described as follows.

The BSS/OSS 550 may request a new profile from the SM-DP+ server 530. In an embodiment, the request for the new profile may include an ICCID (e.g., an ICCID being used in the external electronic device 800), but there may be no limitation to an identifier of a profile. Upon receiving the request for the new profile from the BSS/OSS 550, the SM-DP+ server 530 may generate a profile mapped to the corresponding ICCID based on the request for the new profile. After the profile mapped to the corresponding ICCID is generated, the SM-DP+ server 530 may transmit the ICCID mapped to the generated profile to the BSS/OSS 550 via the ES2+ interface. Operation 812 may be expressed as "ES2+ Exchange" in FIG. 8B.

Upon performing the new profile generating process, the BSS/OSS 550 may transmit, to the entitlement server 520 (or the web server), an Activation Subscription Answer message, which is an answer message to the Activation Subscription message in operation 811-1. In an embodiment, the Activation Subscription Answer message may include an ICCID. The ICCID included in the Activation Subscription Answer message may be the same as the ICCID received from the SM-DP+ server 530 and mapped to the generated profile. Operation 811-1 may be expressed as "Activation Subscription Answer (ICCID)" in FIG. 8B.

Upon receiving the Activation Subscription Answer message from the BSS/OSS 550, the entitlement server 520 (or the web server) may transmit, to the external electronic device 800, a message including download information (e.g., an activation code) which is used to download the generated new profile in operation 813. For example, the message including the download information used to download the new profile may be transmitted using a JavaScript call back function. In an embodiment, the activation code may be used for the external electronic device 800 to request download and installation of the new profile from the SM-DP+ server 530. Operation 813 may be expressed as "Profile Ready for Download(download info with Activation Code)" in FIG. 8B.

Upon transmitting, to the external electronic device 800, the message including the download information used to download the generated new profile, the entitlement server 520 (or the web server) may dismiss a web service flow provided to the external electronic device 800 by calling Finish Flow( ) using the JavaScript callback function and refresh service status in operation 813-1. Operation 813-1 may be expressed as "Finish Flow( )" in FIG. 8B.

Upon receiving the message including the download information used to download the generated new profile from the entitlement server 520 (or the web server), the external electronic device 800 may perform an operation of downloading the generated new profile from the SM-DP+ server 530 in operation 814. In an embodiment, the external electronic device 800 may download the generated new profile from the SM-DP+ server 530 via an ES9+ interface.

In an embodiment, the external electronic device 800 may download the generated new profile from the SM-DP+ server 530 based on the message which is received from the entitlement server 520 (or the web server) and includes the download information used to download the generated new profile. For example, the external electronic device 800 may download the generated new profile from the SM-DP+ server 530 using the download information (e.g., the activation code). Operation 814 may be expressed as "Get Communication Profile ES+ Exchange" in FIG. 8B.

Upon performing the operation of downloading the generated new profile from the SM-DP+ server 530, the external electronic device 800 may transmit a third request message related to the subscription managing operation to the entitlement server 520 in operation 815. According to an embodiment, the third request message may be a request message requesting the subscription managing operation. In an embodiment, the third request message may include ODSA operation information of "ManageSubscription" as shown in Table 1. The third request message may further include the operation type information in Table 2 as parameter information, and may include at least one of "SUBSCRIBE", "UNSUBSCRIBE", "CHANGE SUBSCRIPTION", "TRANSFER SUBSCRIPTION", or "UPDATE SUBSCRIPTION". The external electronic device 800 may transmit, to the entitlement server 520, the third request message including a value of "4-UPDATE SUBSCRIPTION" among the types in Table 2. In an embodiment, "UPDATE SUBSCRIPTION" may be a request for informing a network (e.g., the entitlement server 520) of a subscription update in an eSIM device (e.g., the external electronic device 800). Operation 815 may be expressed as "ManageSubscription(operation_type=4_UPDATE)" in FIG. 8B.

Upon receiving the third request message related to the subscription managing operation from the external electronic device 800, the entitlement server 520 may transmit, to the external electronic device 800, a 200 OK message as an answer message to the third request message related to the subscription managing operation in operation 815-1. According to an embodiment, the 200 OK message, which is the answer message to the third request message related to the subscription managing operation, may include subscription result ("SubscriptionResult") information in Table 3 as parameter information. The answer message (e.g., the 200 OK message) to the third request message may include at least one of "CONTINUE TO WEBSHEET", "DOWNLOAD PROFILE", "DONE", "DELAYED DOWNLOAD", or "DISMISS" as shown in Table 3. For example, the 200 OK message may include "DONE" as the subscription result ("SubscriptionResult") information, and "DONE" may indicate that a subscription flow is terminated and an end-user (e.g., the external electronic device 800) has already downloaded the profile, so there is no need for performing any action any more. Operation 815-1 may be expressed as "200 OK-SubscriptionResult=<DONE>" in FIG. 8B.

Upon receiving the answer message (e.g., the 200 OK message) to the third request message from the entitlement server 520, the external electronic device 800 may activate the obtained profile in operation 816. Accordingly, it may be possible to transfer the profile of the electronic device 101 which uses the EAP-AKA authenticating process to the external electronic device 800 (for example, it may be possible to transfer the eSIM of the electronic device 101 which uses the EAP-AKA authenticating process to the eSIM of the external electronic device 800). Operation 816 may be expressed as "Activate Service" in FIG. 8B.

Figure 9:
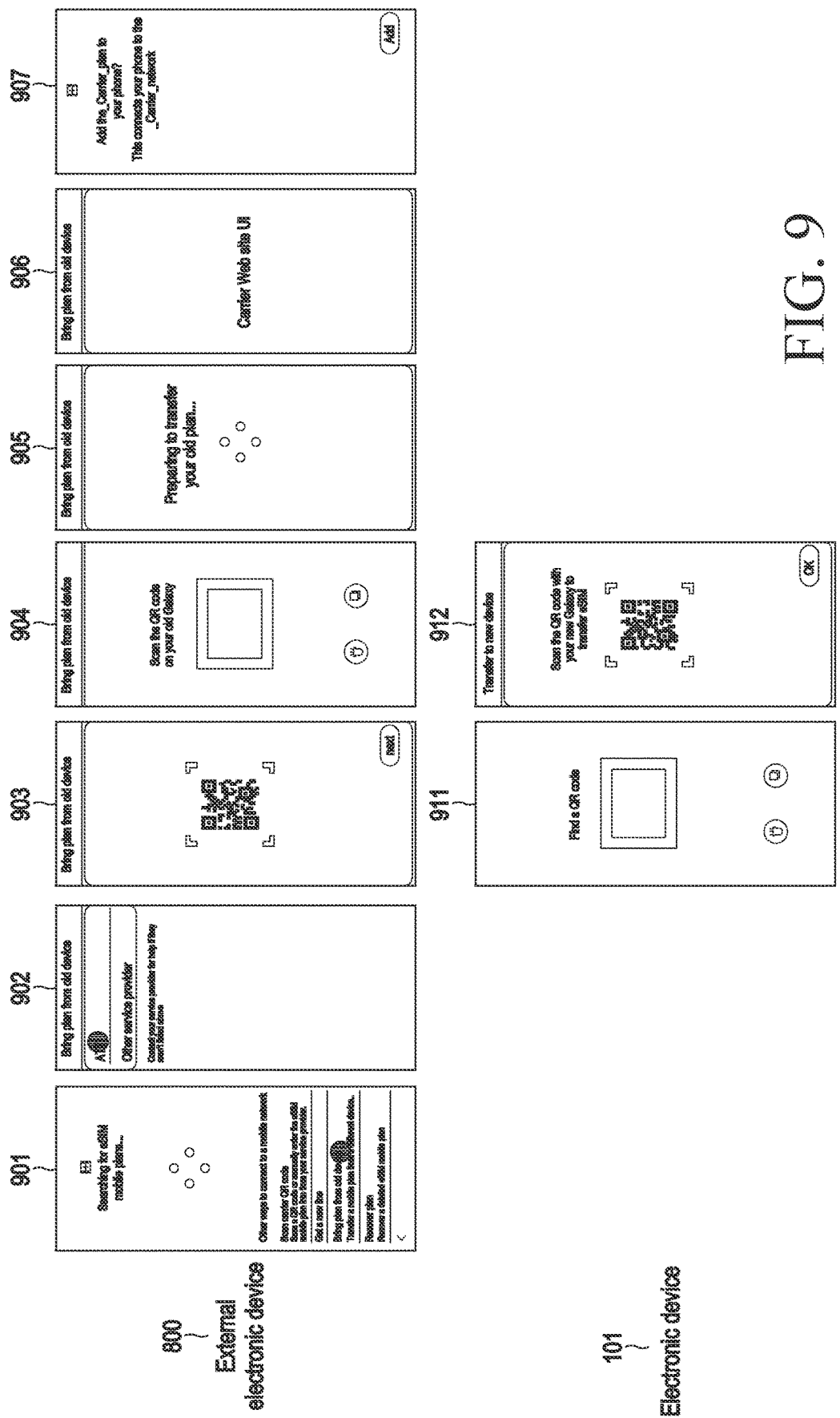
FIG. 9 is a diagram illustrating screens displayed on an electronic device according to an embodiment of the disclosure.

FIG. 9 is a diagram illustrating screens displayed on an electronic device according to an embodiment of the disclosure.

Screens 901 to 907, 911, and 912 shown in FIG. 9 may be screens according to a profile transfer process between electronic devices if an EAP-AKA-based profile transfer application is supported.

Referring to FIG. 9, an external electronic device 800 (e.g., an electronic device 102 or an electronic device 104 in FIG. 1A), which is a new electronic device, may output (for example, may display) screens 901 and 902 for selecting to transfer, to the external electronic device 800, a profile of an electronic device 101 (e.g., an electronic device 101 in FIG. 1A, 1B, 2, 3, or 5), which is an existing electronic device, and for selecting a carrier. The screens 901 and 902 may be associated with operation 801 in FIG. 8A.

Upon identifying a user input to select the profile transfer between electronic devices and to select the carrier via the screens 901 and 902, the external electronic device 800 may output a screen 903 providing first information triggering transfer of subscription of the electronic device 101 to the external electronic device 800 in a form of a QR code. The screen 903 may be associated with operation 802 in FIG. 8A.

The electronic device 101 may obtain the first information by scanning the QR code outputted on the screen 903, and this may correspond to the screen 911. The screen 911 may be associated with operation 803 in FIG. 8A.

If the electronic device 101 accesses a web link included in the first information and the EAP-AKA-based profile transfer application is run, the electronic device 101 may perform an EAP-AKA authenticating process with an entitlement server (e.g., an entitlement server 520 in FIG. 5) and output authentication information (e.g., a token) obtained via the EAP-AKA authenticating process in a form of a QR code on the screen 912. The screen 912 may be associated with operation 805 in FIG. 8A.

The external electronic device 800 may obtain the authentication information by scanning the QR code outputted on the screen 912 and this may correspond to the screen 904. The screen 904 may be associated with operation 806 in FIG. 8A.

Upon obtaining the authentication information of the electronic device 101 obtained via the EAP-AKA authenticating process, the external electronic device 800 may perform at least one operation for profile transfer with an entitlement server and an SM-DP+ server (e.g., an SM-DP+ server 220 in FIG. 2 or an SM-DP+ server 530 in FIG. 5) to transfer a profile of the electronic device 101 to the external electronic device 800, and this may correspond to the screens 905, 906, and 907. The screens 905, 906, and 907 may be associated with operation 807 in FIG. 8A to operation 814 in FIG. 8B.

Figure 10A:
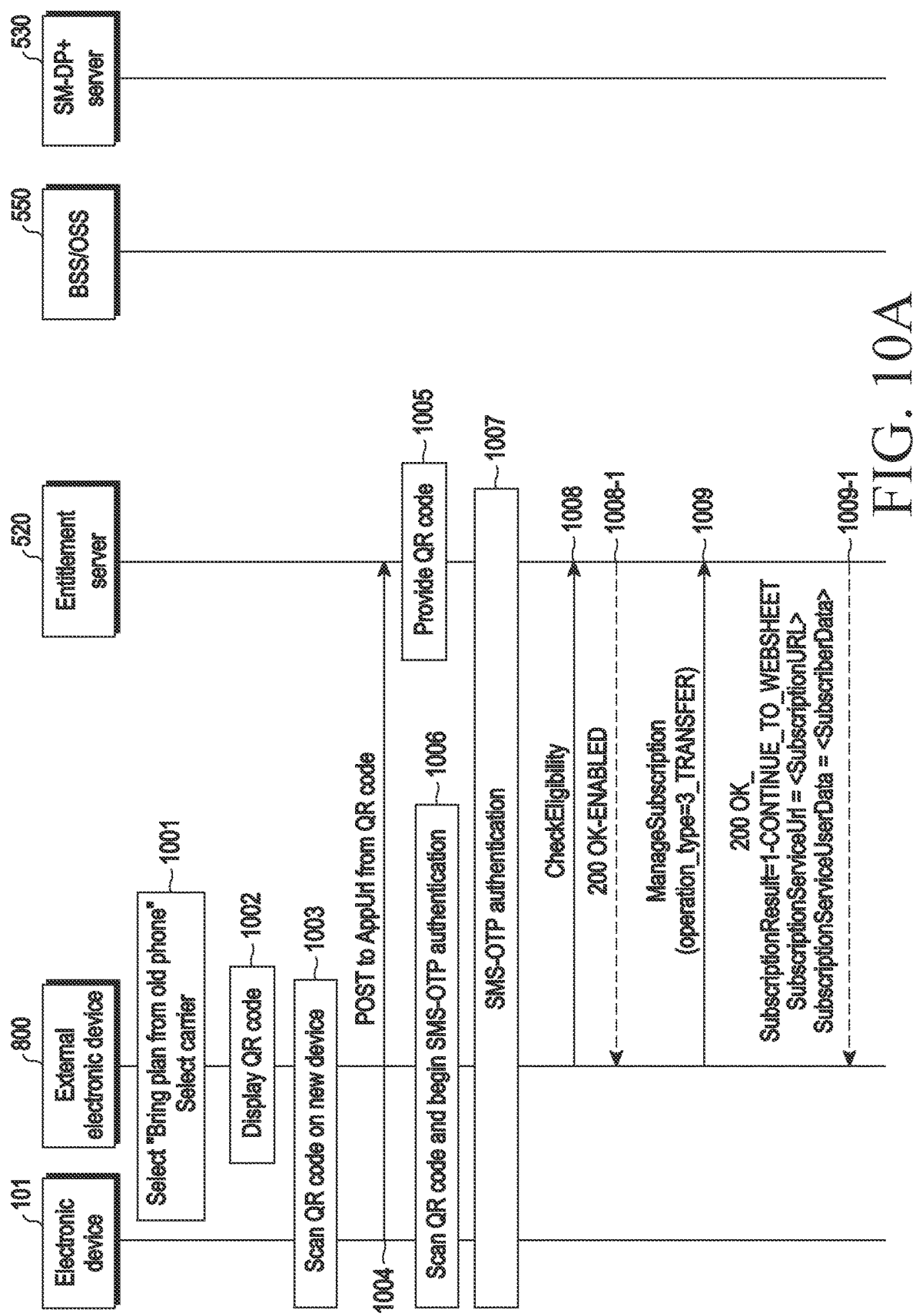
FIGS. 10A and 10B are signal flowcharts illustrating a profile transferring process between electronic devices in a wireless communication network according to an embodiment of the disclosure.
Figure 10B:
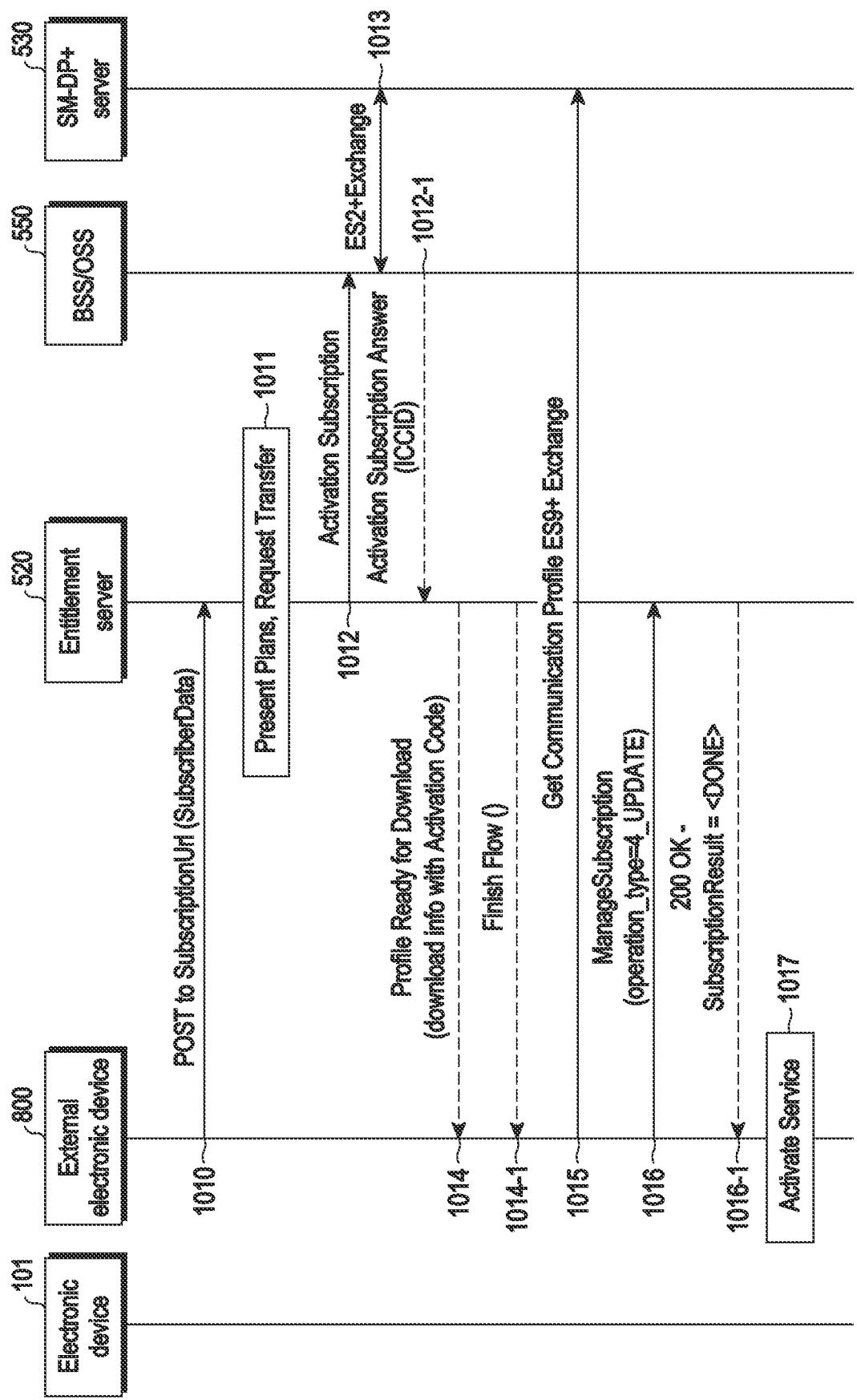

FIGS. 10A and 10B are signal flowcharts illustrating a profile transferring process between electronic devices in a wireless communication network according to an embodiment of the disclosure.

A profile transfer process between electronic devices illustrated in FIGS. 10A and 10B may be a profile transfer process between electronic devices in a case that an electronic device 101 (e.g., an electronic device 101 in FIG. 1A, 1B, 2, 3, or 5) does not support an EAP-AKA-based profile transfer application which is a profile transfer application supporting an EAP-AKA authenticating process. Because the electronic device 101 does not support the EAP-AKA-based profile transfer application, the profile transfer process between electronic devices may be performed using another authenticating process other than the EAP-AKA authenticating process. For example, the other authenticating process may be an authenticating process based on an SMS-OTP scheme. Hereinafter, for convenience of a description, the authenticating process based on the SMS-OTP scheme will be referred to as an "SMS-OTP authenticating process".

Referring to FIGS. 10A and 10B, in operation 1001, an external electronic device 800 (e.g., an electronic device 102 or an electronic device 104 in FIG. 1A) may identify a user input (e.g., a user input for selecting profile transfer between electronic devices) associated with profile transfer between electronic devices. In operation 1001, the external electronic device 800 may identify a user input for selecting a carrier as well as the user input for the profile transfer. Operation 1001 in which the external electronic device 800 identifies the user input associated with the profile transfer between electronic devices may be implemented similarly to or substantially the same as operation 801 described in FIG. 8A, so a detailed description thereof will be omitted. Operation 1001 may be expressed as "Select "Bring plan from old phone" & Select carrier" in FIG. 10A.

Based on the user input for selecting the profile transfer between electronic devices, in operation 1002, the external electronic device 800 may display a QR code. The display for the QR code may be an example of providing first information which is information associated with triggering of subscription transfer from the electronic device 101 to the external electronic device 800. Operation 1002 in which the external electronic device 800 provides the first information may be implemented similarly to or substantially the same as operation 802 described in FIG. 8A, so a detailed description thereof will be omitted. Operation 1002 may be expressed as "Display QR code" in FIG. 10A.

In operation 1003, the electronic device 101 may obtain the first information and identify whether the electronic device 101 may support the profile transfer between electronic devices using the EAP-AKA authenticating process based on the first information. Operation 1003 in which the external electronic device 800 obtains the first information and identifies whether the external electronic device 800 may support the profile transfer between electronic devices using the EAP-AKA authenticating process based on the first information may be implemented similarly to or substantially the same as operation 803 described in FIG. 8A, so a detailed description thereof will be omitted. However, in FIG. 10A, it will be assumed that the electronic device 101 may not support the profile transfer between electronic devices using the EAP-AKA authenticating process. Operation 1003 may be expressed as "Scan QR code on new device" in FIG. 10A.

Based on identification that the profile transfer between electronic devices may not be supported using the EAP-AKA authenticating process, the electronic device 101 may output (for example, may display) a web link included in the first information in operation 1004. After outputting the web link, the electronic device 101 may identify a user input for accessing the web link. Based on the user input for accessing the web link being identified, the electronic device 101 may perform an accessing operation to a web link provided by the entitlement server 520 including the web server (e.g., the web server 510 in FIG. 5). If the web server is implemented as a separate entity different from the entitlement server 520, the external electronic device 800 may perform an access operation to a web link provided by the web server. Operation 1004 may be expressed as "POST to AppUrl from QR code" in FIG. 10A.

In operation 1005, the entitlement server 520 including the web server may provide, via a web page, second information which is information associated with trigger for a performance of an authenticating process (e.g., an SMS-OTP authenticating process) other than the EAP-AKA authenticating process of the external electronic device 800.

In an embodiment, if the electronic device 101 does not support the EAP-AKA-based profile transfer application, the second information may be a trigger point to cause the external electronic device 800 to start performing another authenticating process other than the EAP-AKA authenticating process.

In an embodiment, the entitlement server 520 including the web server may provide the second information in a form of a QR code. For example, the entitlement server 520 including the web server may provide the second information in the form of the QR code via the web page.

In an embodiment, the second information may be provided in a form of a QR code having a format which is promised between a server (e.g., a manufacturer server of the external electronic device 800 or a server of a communication carrier) and the external electronic device 800 in advance. For example, the second information may be provided in a form of a QR code having a string, such as "33$SAMSUNG$ODSA$SMSOTP$START". Operation 1005 may be expressed as "Display QR code" in FIG. 10A.

As the entitlement server 520 including the web server provides, in the form of the QR code, the second information which is the information associated with the trigger for the performance of the SMS-OTP authenticating process of the external electronic device 800 via the web page, the electronic device 101 may provide the second information provided via the web page from the entitlement server 520 including the web server in the form of the QR code in operation 1006. For example, the electronic device 101 may output (e.g., may display) the second information in the form of the QR code, and the external electronic device 800 may start performing the SMS-OTP authenticating process by scanning the QR code outputted in the electronic device 101.

In operation 1006, the external electronic device 800 may obtain the second information. For example, if the electronic device 101 outputs the second information in the form of the QR code, the external electronic device 800 may obtain the second information by scanning the QR code outputted in the electronic device 101. Upon obtaining the second information, the external electronic device 800 may start performing the SMS-OTP authenticating process based on the second information. Operation 1006 may be expressed as "Scan QR code and begin SMS-OTP authentication" in FIG. 10A.

Upon obtaining the second information, the external electronic device 800 may perform the SMS-OTP authenticating process with the entitlement server 520 in operation 1007. If a result of the SMS-OTP authenticating process indicates success, the external electronic device 800 may obtain authentication information (e.g., a token). Referring to FIG. 10A, it will be assumed that the result of the SMS-OTP authenticating process indicates the success, and if the result of the SMS-OTP authenticating process indicates failure, the external electronic device 800 may not perform any further operations. Operation 1007 may be expressed as "SMS-OTP authentication" in FIG. 10A.

Upon obtaining the authentication information, the external electronic device 800 may perform an eligibility check with the entitlement server 520 in order to transfer the profile of the electronic device 101 to the external electronic device 800 in operation 1008. Operation 1008 in which the external electronic device 800 performs the eligibility check with the entitlement server 520 in order to transfer the profile of the electronic device 101 to the external electronic device 800 may be implemented similarly to or substantially the same as operation 807 described in FIG. 8A, so a detailed description thereof will be omitted. However, there may be a difference in terms of which authentication-related information including authentication information obtained by the electronic device 101 via the EAP-AKA authenticating process is used in operation 807, whereas the authentication information obtained by the electronic device 101 via the SMS-OTP authenticating process is used in operation 1008. Operation 1008 may be expressed as "CheckEligibility" in FIG. 10A.

Upon receiving the first request message including CheckEligibility as the operation information from the external electronic device 800, the entitlement server 520 may perform the eligibility check for the external electronic device 800 based on the authentication information and/or the device information of the external electronic device 800 included in the first request message including CheckEligibility as the operation information in operation 1008-1. For example, the entitlement server 520 may perform the eligibility check for a device and a user of the external electronic device 800 based on the authentication information and/or the device information of the external electronic device 800.

If a result of the eligibility check for the external electronic device 800 indicates success, the entitlement server 520 may transmit, to the external electronic device 800, a 200 OK-ENABLED message as an answer message to the first request message including CheckEligibility as the operation information. Referring to FIG. 10A, it will be assumed that result of the eligibility check for the external electronic device 800 indicates the success, and if the result of the eligibility check for the external electronic device 800 indicates failure, further operations may not be performed. In an embodiment, if the result of the eligibility check indicates the success, the 200 OK message may include information of "ENABLED". Operation 1008-1 may be expressed as "200 OK-ENABLED" in FIG. 10A.

Upon receiving the 200 OK-ENABLED message from the entitlement server 520, the external electronic device 800 may transmit a second request message related to a subscription managing operation to the entitlement server 520 in operation 1009. Operation 1009 in which the external electronic device 800 transmits the second request message related to the subscription managing operation to the entitlement server 520 may be implemented similarly to or substantially the same as operation 808 described in FIG. 8A, so a detailed description thereof will be omitted. However, there may be a difference in terms of which authentication-related information including authentication information obtained by the electronic device 101 via the EAP-AKA authenticating process is used in operation 808, whereas the authentication information obtained by the electronic device 101 via the SMS-OTP authenticating process is used in operation 1009. Operation 1009 may be expressed as "ManageSubscription(operation_type=3_TRANSFER)" in FIG. 10A.

In response to receiving the subscription answer message, the entitlement server 520 may transmit, to the external electronic device 800, a 200 OK message as an answer message to the second request message including "ManageSubscription" as the ODSA operation information in operation 1009-1. Operation 1009-1 in which the entitlement server 520 transmits the answer message to the second request message to the external electronic device 800 may be implemented similarly to or substantially the same as operation 808-1 described in FIG. 8A, so a detailed description thereof will be omitted. Operation 1009-1 may be expressed as "200 OK/SubscriptionResult=1-CONTIUE_ TO_WEBSHEET/SubscriptionServiceUrl=<Sub- scription-URL>/SubscriptionServiceData=<SubscriberData>" in FIG. 10A.

The external electronic device 800 may perform an accessing operation to the entitlement server 520 including a web server (e.g., the web server 510 in FIG. 5) based on the accessible address information and/or the user-related data in operation 1010. If the web server is implemented as a separate entity different from the entitlement server 520, the external electronic device 800 may perform the accessing operation to the entitlement server 520. Operation 1010 in which the external electronic device 800 performs an accessing operation to the entitlement server 520 may be implemented similarly to or substantially the same as operation 809 described in FIG. 8B, so a detailed description thereof will be omitted. Operation 1010 may be expressed as "POST to SubscriptionUrl(SubscriberData)" in FIG. 10B.

Based on the user input indicating the profile transfer being identified, the external electronic device 800 may request the profile transfer (or the subscription transfer or the line transfer) from the entitlement server 520 including the web server in operation 1011. If the web server is implemented as a separate entity different from the entitlement server 520, the external electronic device 800 may request the profile request from the web server. Operation 1011 in which the external electronic device 800 requests the profile transfer (or the subscription transfer or the line transfer) from the entitlement server 520 may be implemented similarly to or substantially the same as operation 810 described in FIG. 8B, so a detailed description thereof will be omitted. Operation 1011 may be expressed as "Presents Plans, Request Transfer" in FIG. 10B.

Upon identifying the request for the profile transfer from the external electronic device 800, the entitlement server 520 (or the web server) may transmit an Activation Subscription message to the BSS/OSS 550 in operation 1012. According to an embodiment, the Activation Subscription message may include information indicating that the external electronic device 800 requests the profile transfer. Operation 1012 may be expressed as "Activation Subscription" in FIG. 10B.

Upon receiving the Activation Subscription message from the entitlement server 520 (or the web server), the BSS/OSS 550 may perform a new profile generating process, which generates a new profile, with the SM-DP+ server 530 via an ES2+ interface in operation 1013. Operation 1013 in which the BSS/OSS 550 performs the new profile generating process with the SM-DP+ server 530 may be implemented similarly to or substantially the same as operation 812 described in FIG. 8B, so a detailed description thereof will be omitted. Operation 1013 may be expressed as "ES2+ Exchange" in FIG. 10B.

Upon performing the new profile generating process, the BSS/OSS 550 may transmit, to the entitlement server 520 (or the web server), an Activation Subscription Answer message, which is an answer message to the Activation Subscription message in operation 1012-1. In an embodiment, the Activation Subscription Answer message may include an ICCID. The ICCID included in the Activation Subscription Answer message may be the same as the ICCID received from the SM-DP+ server 530 and mapped to the generated profile. Operation 1012-1 may be expressed as "Activation Subscription Answer (ICCID)" in FIG. 10B.

Upon receiving the Activation Subscription Answer message from the BSS/OSS 550, the entitlement server 520 (or the web server) may transmit, to the external electronic device 800, a message including download information (e.g., an activation code) which is used to download the generated new profile in operation 1014. Operation 1014 in which the entitlement server 520 (or the web server) transmits the message including the download information used to download the new profile may be implemented similarly to or substantially the same as operation 813 described in FIG. 8B, so a detailed description thereof will be omitted. Operation 1014 may be expressed as "Profile Ready for Download(download info with Activation Code)" in FIG. 10B.

Upon transmitting, to the external electronic device 800, the message including the download information used to download the generated new profile, the entitlement server 520 (or the web server) may dismiss a web service flow provided to the external electronic device 800 by calling Finish Flowo using the JavaScript callback function and refresh service status in operation 1014-1. Operation 1014-1 may be expressed as "Finish Flowo" in FIG. 10B.

Upon receiving the message including the download information used to download the generated new profile from the entitlement server 520 (or the web server), the external electronic device 800 may perform an operation of downloading the generated new profile from the SM-DP+ server 530 in operation 1015. Operation 1015 in which the external electronic device 800 performs the operation of downloading the generated new profile from the SM-DP+ server 530 may be implemented similarly to or substantially the same as operation 814 described in FIG. 8B, so a detailed description thereof will be omitted. Operation 1015 may be expressed as "Get Communication Profile ES+ Exchange" in FIG. 10B.

Upon performing the operation of downloading the generated new profile from the SM-DP+ server 530, the external electronic device 800 may transmit a third request message related to the subscription managing operation to the entitlement server 520 in operation 1016. Operation 1016 in which the external electronic device 800 transmits the third request message to the entitlement server 520 may be implemented similarly to or substantially the same as operation 815 described in FIG. 8B, so a detailed description thereof will be omitted. Operation 1016 may be expressed as "ManageSubscription(operation_type=4_UPDATE)" in FIG. 10B.

Upon receiving the third request message related to the subscription managing operation from the external electronic device 800, the entitlement server 520 may transmit, to the external electronic device 800, a 200 OK message as an answer message to the third request message related to the subscription managing operation in operation 1016-1. Operation 1016-1 in which the entitlement server 520 transmits the answer message to the third request message to the external electronic device 800 may be implemented similarly to or substantially the same as operation 815-1 described in FIG. 8B, so a detailed description thereof will be omitted. Operation 1016-1 may be expressed as "200 OK-SubscriptionResult=<DONE>" in FIG. 10B.

Upon receiving the answer message (e.g., the 200 OK message) to the third request message from the entitlement server 520, the external electronic device 800 may activate the obtained profile in operation 1017. Accordingly, it may be possible to transfer the profile of the electronic device 101 which uses the SMS-OTP authenticating process to the external electronic device 800 (for example, it may be possible to transfer the eSIM of the electronic device 101 which uses the SMS-OTP authenticating process to the eSIM of the external electronic device 800). Operation 1017 may be expressed as "Activate Service" in FIG. 10B.

Figure 11:
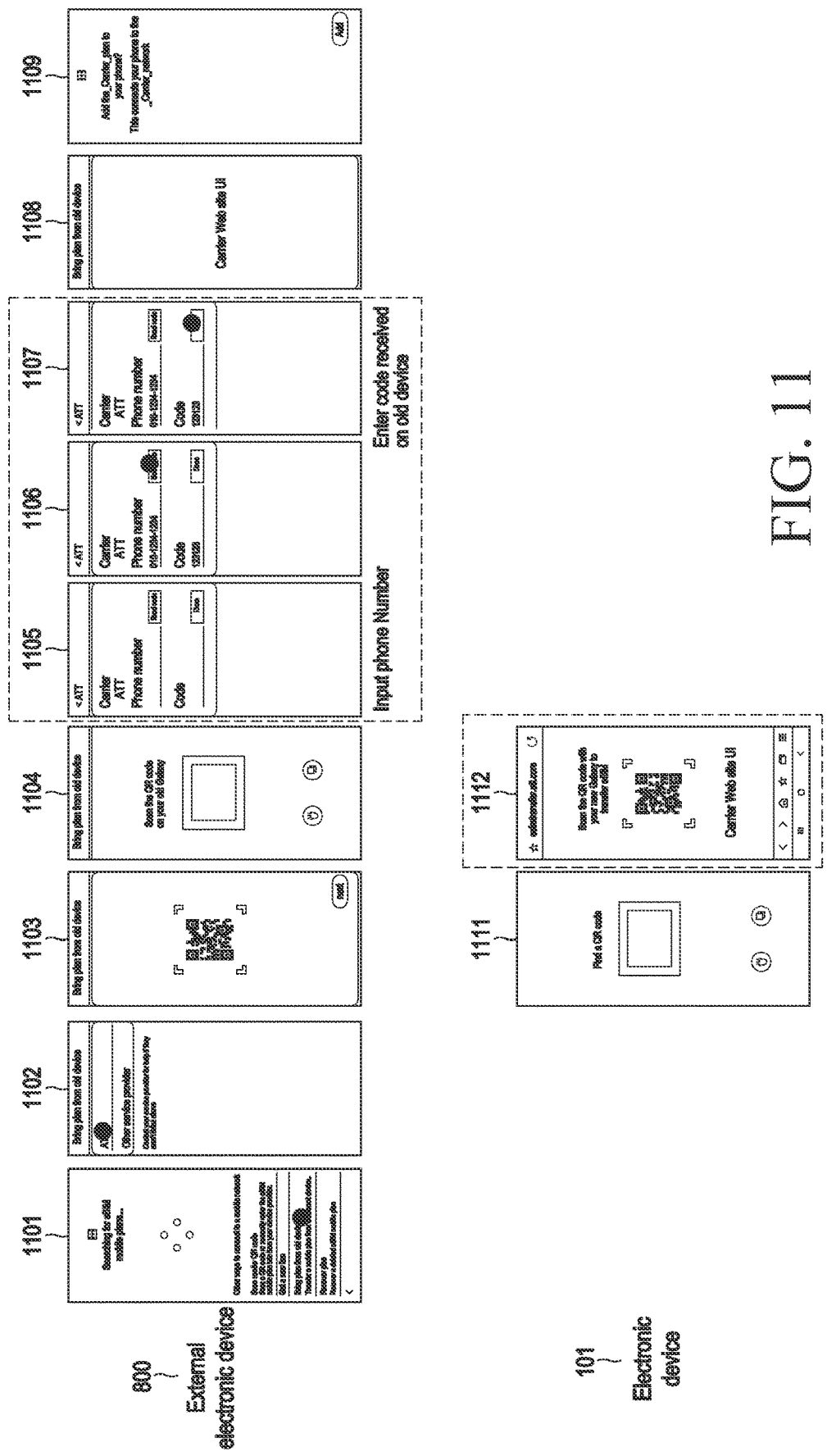
FIG. 11 is a diagram illustrating screens displayed on an electronic device according to an embodiment of the disclosure.

FIG. 11 is a diagram illustrating screens displayed on an electronic device according to an embodiment of the disclosure.

Screens 1101 to 1109, 1111, and 1112 shown in FIG. 11 may be screens according to a profile transfer process between electronic devices if an EAP-AKA-based profile transfer application is not supported.

Referring to FIG. 11, an external electronic device 800 (e.g., an electronic device 102 or an electronic device 104 in FIG. 1A), which is a new electronic device, may output (for example, may display) screens 1101 and 1102 for selecting to transfer, to the external electronic device 800, a profile of an electronic device 101 (e.g., an electronic device 101 in FIG. 1A, 1B, 2, 3, or 5), which is an existing electronic device, and for selecting a carrier. The screens 1101 and 1102 may be associated with operation 1001 in FIG. 10A.

Upon identifying a user input to select the profile transfer between electronic devices and to select the carrier via the screens 1101 and 1102, the external electronic device 800 may output a screen 1103 providing first information triggering transfer of subscription of the electronic device 101 to the external electronic device 800 in a form of a QR code. The screen 1103 may be associated with operation 1002 in FIG. 10A.

The electronic device 101 may obtain the first information by scanning the QR code outputted on the screen 1103, and this may correspond to the screen 1111. The screen 1111 may be associated with operation 1003 in FIG. 10A.

If the EAP-AKA-based profile transfer application does not exist in the electronic device 101, the electronic device 101 may be connected to a web page including a QR code capable of triggering the SMS-OTP authenticating process, and the QR code may be outputted via the screen 1112. The screen 1112 may be associated with operation 1005 in FIG. 10A.

The external electronic device 800 may start performing the SMS-OTP authenticating process by scanning the QR code outputted on the screen 1112 and this may correspond to the screen 1104. The screen 1104 may be associated with operation 1006 in FIG. 10A.

Thereafter, the external electronic device 800 may perform the SMS-OTP authenticating process with an entitlement server (e.g., an entitlement server 520 in FIG. 5), and obtain authentication information (e.g., a token) obtained via the SMS-OTP authenticating process, and this may correspond to the screens 1105, 1106, and 1107. The screens 1105, 1106, and 1107 may be associated with operation 1007 in FIG. 10A.

Upon obtaining the authentication information of the electronic device 101 obtained via the SMS-OTP authenticating process, the external electronic device 800 may perform at least one operation for profile transfer with an entitlement server and an SM-DP+ server (e.g., an SM-DP+ server 220 in FIG. 2 or an SM-DP+ server 530 in FIG. 5) to transfer a profile of the electronic device 101 to the external electronic device 800, and this may correspond to the screens 1108 and 1109. The screen 1108 may be associated with operations 1010 and 1011 in FIG. 10A, and the screen 1109 may be associated with operation 1015 in FIG. 10B. In an embodiment, operation 1016 in FIG. 10B may be performed in a background without UX.

Figure 12A:
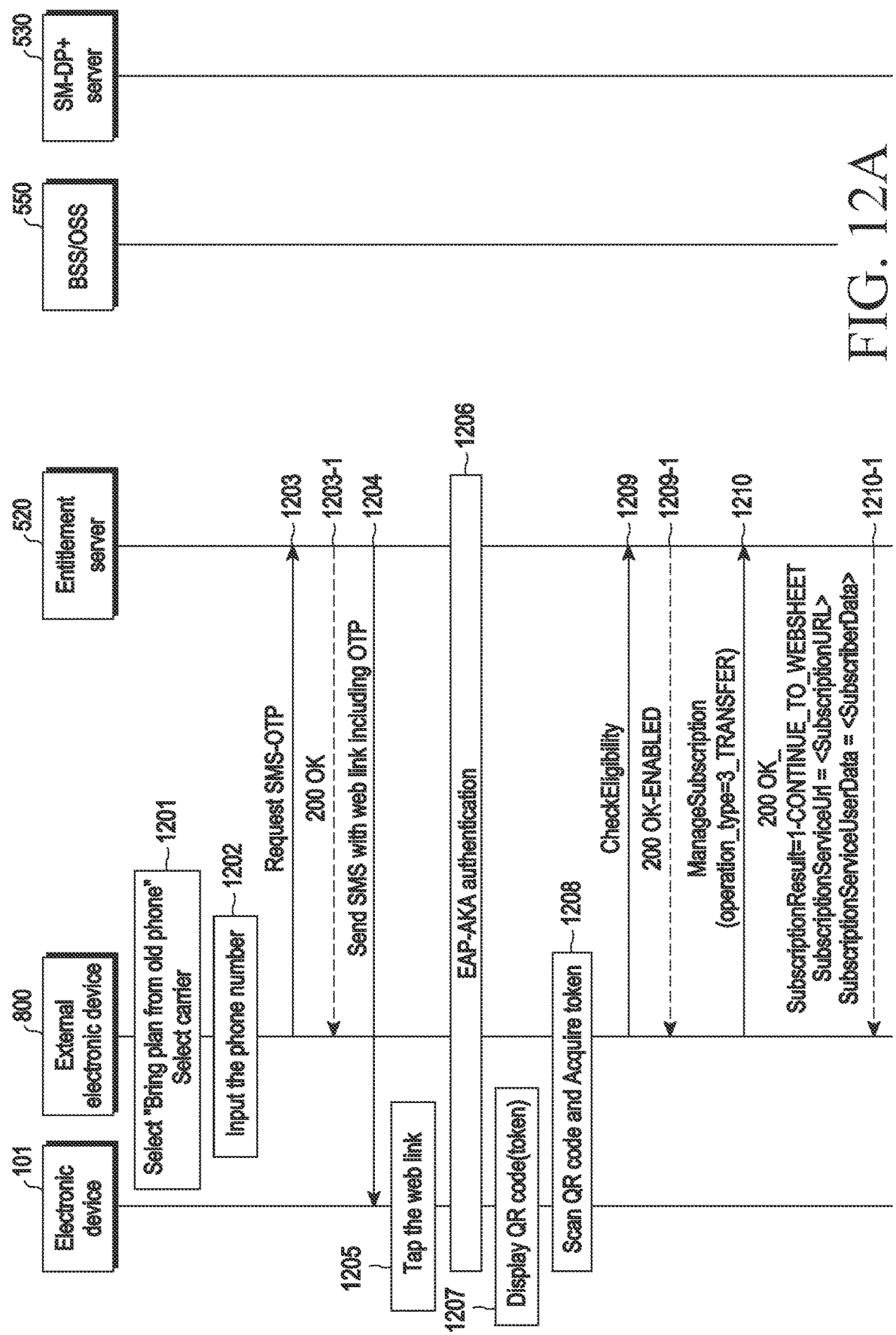
FIGS. 12A and 12B are signal flowcharts illustrating a profile transferring process between electronic devices in a wireless communication network according to an embodiment of the disclosure.
Figure 12B:
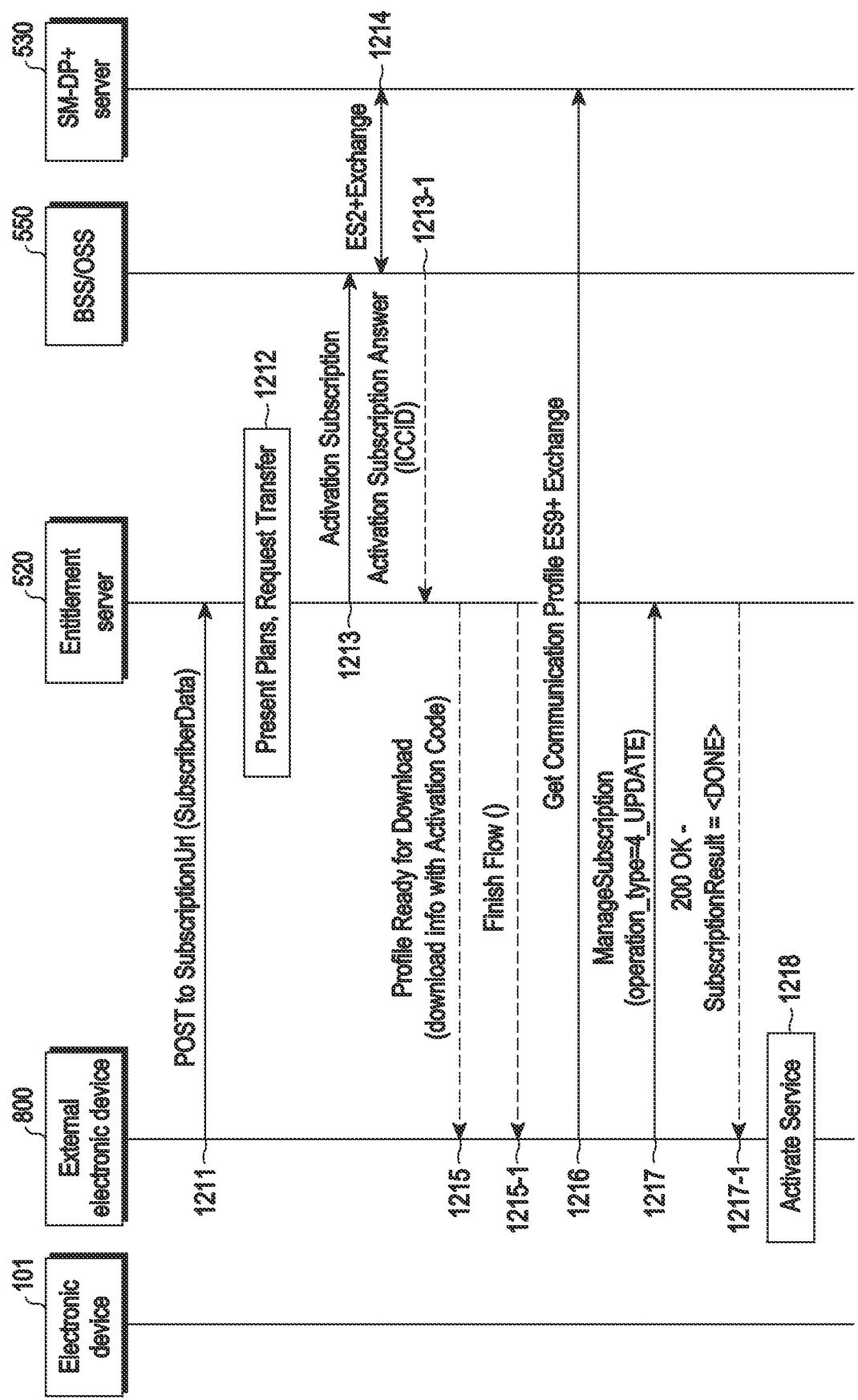

FIGS. 12A and 12B are signal flowcharts illustrating a profile transferring process between electronic devices in a wireless communication network according to an embodiment of the disclosure.

A profile transfer process between electronic devices illustrated in FIGS. 12A and 12B may be a profile transfer process between electronic devices in a case that an electronic device 101 (e.g., an electronic device in 101 FIG. 1A, 1B, 2, 3, or 5), which is an existing electronic device, supports an EAP-AKA-based profile transfer application which is a profile transfer application supporting an EAP-AKA authenticating process. A profile transfer process between electronic devices shown in FIGS. 8A and 8B may also be the profile transfer process between electronic devices in a case of supporting an EAP-AKA-based profile transfer application. However, there may be a difference in terms of which the first information, which is information associated with trigger for transfer of subscription of the electronic device 101 to an external electronic device 800 (e.g., an electronic device 102 or an electronic device 104 in FIG. 1A), is provided in the external electronic device 800 in a form of a QR code or is transmitted via an NFC in FIGS. 8A and 8B, whereas the first information is provided in a form of outputting (for example, displaying) a window in the external electronic device 800 in FIGS. 12A and 12B. In addition, information included in first information described in FIGS. 8A and 8B may be different from information included in the first information described in FIGS. 12A and 12B.

Referring to FIGS. 12A and 12B, in operation 1201, an external electronic device 800 may identify a user input (e.g., a user input for selecting profile transfer between electronic devices) associated with profile transfer between electronic devices. In operation 1201, the external electronic device 800 may identify a user input for selecting a carrier as well as the user input for the profile transfer. Operation 1201 in which the external electronic device 800 identifies the user input associated with the profile transfer between electronic devices may be implemented similarly to or substantially the same as operation 801 described in FIG. 8A, so a detailed description thereof will be omitted. Operation 1201 may be expressed as "Select "Bring plan from old phone" & Select carrier" in FIG. 12A.

Based on the user input selecting the profile transfer between electronic devices, in operation 1202, the external electronic device 800 may provide first information which is information associated with trigger for transferring subscription of the electronic device 101 to the external electronic device 800. In an embodiment, the first information may be information which triggers transfer of a profile stored in the electronic device 101 to the external electronic device 800. In an embodiment, the profile may be stored in an eSIM (e.g., a subscriber identification module 196 in FIG. 1, an eSIM 201 in FIG. 1B, 2, or 3, or an eUICC 401 in FIG. 4) of the electronic device 101, or may be stored in a physical SIM of the electronic device 101. For example, transfer of the subscription (or a line) of the electronic device 101 to the external electronic device 800 may mean transfer of the profile stored in the electronic device 101 to the external electronic device 800. In an embodiment, the first information may be a trigger point which causes the profile stored in the electronic device 101 to start being transferred to the external electronic device 800.

In an embodiment, the first information may include information requesting to input a phone number which corresponds to a subscription (or line) in use. In an embodiment, the phone number corresponding to the subscription (or the line) in use may be a phone number of the electronic device 101. For example, the phone number corresponding to the subscription (or the line) in use may be an MSISDN of the electronic device 101.

In an embodiment, the first information may be provided in a form of outputting (for example, displaying) a window in the external electronic device 800. The external electronic device 800 may output (for example, display) the first information in the form of the window, and if a phone number corresponding to subscription in use is inputted via the window, it may cause the external electronic device 800 to start transferring the profile of the electronic device 101 to the external electronic device 800. Operation 1202 may be expressed as "Input the phone number" in FIG. 12A.

If the phone number corresponding to the subscription in use is inputted via the window, the external electronic device 800 may transmit, to an entitlement server 520, a fourth request message requesting to perform an SMS-OTP authenticating process in operation 1203. In an embodiment, the fourth request message may include the phone number, which is inputted via the window, corresponding to the subscription in use. In an embodiment, the third request message may include device information of the external electronic device 800. Operation 1203 may be expressed as "Request SMS-OTP" in FIG. 12A.

Upon receiving, from the external electronic device 800, the fourth request message requesting to perform the SMS-OTP authenticating process, the entitlement server 520 may transmit a 200 OK as an answer message to the fourth request message in operation 1203-1. Operation 1203-1 may be expressed as "200 OK" in FIG. 12A.

In operation 1204, the entitlement server 520 may transmit an SMS to the electronic device 101 corresponding to the phone number, which corresponds to the subscription in use, included in the fourth request message. In an embodiment, the SMS may include a web link, and the web link may be connected to the EAP-AKA-based profile transfer application. In an embodiment, the web link may include an OTP and the device information of the external electronic device 800. Operation 1204 may be expressed as "Send SMS with web link including OTP" in FIG. 12A.

Upon receiving the SMS including the web link which may be connected to the EAP-AKA-based profile transfer application from the entitlement server 520, the electronic device 101 may provide (for example, may output) the received SMS in operation 1205. After providing the SMS, the electronic device 101 may identify a user input selecting the web link included in the SMS (for example, selecting the web link connected to the EAP-AKA-based profile transfer application). For example, if a tap for the web link is inputted, the electronic device 101 may identify the user input selecting the web link. Upon identifying the user input selecting the web link, the electronic device 101 may identify whether the electronic device 101 may support the profile transfer between electronic devices using the EAP-AKA authenticating process. In an embodiment, if the EAP-AKA-based profile transfer application connected to the web link is run based on the user input selecting the web link included in the SMS, the electronic device 101 may be identify that the electronic device 101 may support the profile transfer between electronic devices using the EAP-AKA authenticating process.

Alternatively, if the EAP-AKA-based profile transfer application does not exist in the electronic device 101, the electronic device 101 may identify that the electronic device 101 may not support the profile transfer between electronic devices using the EAP-AKA authenticating process. If the EAP-AKA-based profile transfer application does not exist, the electronic device 101 may output (for example, may display) the web link included in the SMS. Referring to FIGS. 12A and 12B, it will be assumed that the electronic device 101 may support the profile transfer between electronic devices using the EAP-AKA authenticating process. If it is impossible for the electronic device 101 to support the profile transfer between electronic devices using the EAP-AKA authenticating process, no further operations may be performed. Operation 1205 may be expressed as "Tap the web link" in FIG. 12A.

Based on identification that the profile transfer between electronic devices using the EAP-AKA authenticating process may be supported, the electronic device 101 may perform the EAP-AKA authenticating process with the entitlement server 520 in operation 1206. Operation 1206 in which the electronic device 101 performs the EAP-AKA authenticating process with the entitlement server 520 may be implemented similarly to or substantially the same as operation 804 described in FIG. 8A, so a detailed description thereof will be omitted. However, there may be a difference in terms of which the electronic device 101 may transmit the device information of the external electronic device 800 to the entitlement server 520 when performing the EAP-AKA authenticating process in operation 804, whereas the electronic device 101 does not transmit the device information of the external electronic device 800 to the entitlement server 520 when performing the EAP-AKA authenticating process in operation 1206. However, in FIG. 12A, the device information of the external electronic device 800 may be transmitted to the entitlement server 520 via the third request message in operation 1203, and the device information of the external electronic device 800 may be included in the SMS provided by the entitlement server 520 in operation 1204.

If a result of the EAP-AKA authenticating process indicates success, the electronic device 101 may obtain authentication information (e.g., a token). Referring to FIG. 12A, it will be assumed that the result of the EAP-AKA authenticating process indicates the success, and if the result of the EAP-AKA authenticating process indicates failure, the electronic device 101 may not perform further operations. Operation 1206 may be expressed as "EAP-AKA authentication" in FIG. 12A.

In operation 1207, the electronic device 101 may provide authentication-related information including authentication information obtained via the EAP-AKA authenticating process. Operation 1207 in which the electronic device 101 provides the authentication-related information may be implemented similarly to or substantially the same as operation 805 described in FIG. 8A, so a detailed description thereof will be omitted. Operation 1207 may be expressed as "Display QR code (token)" in FIG. 12A.

In operation 1208, the external electronic device 800 may obtain the authentication-related information including the authentication information obtained via the EAP-AKA authenticating process. For example, if the authentication-related information is outputted in the form of the QR code, the external electronic device 800 may obtain the authentication-related information by scanning the QR code outputted from the electronic device 101. For another example, if the authentication-related information is transmitted via the NFC, the external electronic device 800 may obtain the authentication-related information transmitted from the electronic device 101 via the NFC tag. Operation 1208 may be expressed as "Scan QR code and Acquire token" in FIG. 12A.

Upon obtaining the authentication-related information, the external electronic device 800 may perform an eligibility check with the entitlement server 520 in order to transfer the profile of the electronic device 101 to the external electronic device 800 in operation 1209. Operation 1209 in which the external electronic device 800 performs the eligibility check with the entitlement server 520 in order to transfer the profile of the electronic device 101 to the external electronic device 800 may be implemented similarly to or substantially the same as operation 807 described in FIG. 8A, so a detailed description thereof will be omitted. Operation 1209 may be expressed as "CheckEligibility" in FIG. 12A.

Upon receiving the first request message including CheckEligibility as the operation information from the external electronic device 800, the entitlement server 520 may perform the eligibility check for the external electronic device 800 based on the authentication-related information and/or the device information of the external electronic device 800 included in the first request message including CheckEligibility as the operation information in operation 1209-1. For example, the entitlement server 520 may perform the eligibility check for a device and a user of the external electronic device 800 based on the authentication-related information and/or the device information of the external electronic device 800.

If a result of the eligibility check for the external electronic device 800 indicates success, the entitlement server 520 may transmit, to the external electronic device 800, a 200 OK message as an answer message to the first request message including CheckEligibility as the operation information. Referring to FIG. 12A, it will be assumed that result of the eligibility check for the external electronic device 800 indicates the success, and if the result of the eligibility check for the external electronic device 800 indicates failure, further operations may not be performed. In an embodiment, if the result of the eligibility check indicates the success, the 200 OK message may include information of "enabled". Operation 1209-1 may be expressed as "200 OK" in FIG. 12A.

Upon receiving the 200 OK message from the entitlement server 520, the external electronic device 800 may transmit a second request message related to a subscription managing operation to the entitlement server 520 in operation 1210. Operation 1210 in which the external electronic device 800 transmits the second request message related to the subscription managing operation to the entitlement server 520 may be implemented similarly to or substantially the same as operation 808 described in FIG. 8A, so a detailed description thereof will be omitted. Operation 1210 may be expressed as "ManageSubscription(operation_type=3_TRANSFER)" in FIG. 12A.

In response to receiving the subscription answer message, the entitlement server 520 may transmit, to the external electronic device 800, a 200 OK message as an answer message to the second request message including "ManageSubscription" as the ODSA operation information in operation 1210-1. Operation 1210-1 in which the entitlement server 520 transmits the answer message to the second request message to the external electronic device 800 may be implemented similarly to or substantially the same as operation 808-1 described in FIG. 8A, so a detailed description thereof will be omitted. Operation 1210-1 may be expressed as "200 OK/SubscriptionResult=1-CONTIUE_TO_WEBSHEET/SubscriptionServiceUrl= <Subscription-URL>/SubscriptionServiceData=<SubscriberData>" in FIG. 12A.

The external electronic device 800 may perform an accessing operation to the entitlement server 520 including a web server (e.g., the web server 510 in FIG. 5) based on the accessible address information and/or the user-related data in operation 1211. If the web server is implemented as a separate entity different from the entitlement server 520, the external electronic device 800 may perform the accessing operation to the entitlement server 520. Operation 1211 in which the external electronic device 800 performs the accessing operation to the entitlement server 520 may be implemented similarly to or substantially the same as operation 809 described in FIG. 8B, so a detailed description thereof will be omitted. Operation 1211 may be expressed as "POST to SubscriptionUrl(SubscriberData)" in FIG. 12B.

Based on the user input indicating the profile transfer being identified, the external electronic device 800 may request the profile transfer (or the subscription transfer or the line transfer) from the entitlement server 520 including the web server in operation 1212. If the web server is implemented as a separate entity different from the entitlement server 520, the external electronic device 800 may request the profile request from the web server. Operation 1212 in which the external electronic device 800 requests the profile transfer (or the subscription transfer or the line transfer) from the entitlement server 520 may be implemented similarly to or substantially the same as operation 810 described in FIG. 8B, so a detailed description thereof will be omitted. Operation 1212 may be expressed as "Presents Plans, Request Transfer" in FIG. 12B.

Upon identifying the request for the profile transfer from the external electronic device 800, the entitlement server 520 (or the web server) may transmit an Activation Subscription message to the BSS/OSS 550 in operation 1213. According to an embodiment, the Activation Subscription message may include information indicating that the external electronic device 800 requests the profile transfer. Operation 1213 may be expressed as "Activation Subscription" in FIG. 12B.

Upon receiving the Activation Subscription message from the entitlement server 520 (or the web server), the BSS/OSS 550 may perform a new profile generating process, which generates a new profile, with the SM-DP+ server 530 via an ES2+ interface in operation 1214. Operation 1214 in which the BSS/OSS 550 performs the new profile generating process with the SM-DP+ server 530 may be implemented similarly to or substantially the same as operation 812 described in FIG. 8B, so a detailed description thereof will be omitted. Operation 1214 may be expressed as "ES2+ Exchange" in FIG. 12B.

Upon performing the new profile generating process, the BSS/OSS 550 may transmit, to the entitlement server 520 (or the web server), an Activation Subscription Answer message, which is an answer message to the Activation Subscription message in operation 1213-1. In an embodiment, the Activation Subscription Answer message may include an ICCID. The ICCID included in the Activation Subscription Answer message may be the same as the ICCID received from the SM-DP+ server 530 and mapped to the generated profile. Operation 1213-1 may be expressed as "Activation Subscription Answer" in FIG. 12B.

Upon receiving the Activation Subscription Answer message from the BSS/OSS 550, the entitlement server 520 (or the web server) may transmit, to the external electronic device 800, a message including download information (e.g., an activation code) which is used to download the generated new profile in operation 1215. Operation 1215 in which the entitlement server 520 (or the web server) transmits the message including the download information used to download the new profile may be implemented similarly to or substantially the same as operation 813 described in FIG. 8B, so a detailed description thereof will be omitted. Operation 1215 may be expressed as "Profile Ready for Download(download info with Activation Code)" in FIG. 12B.

Upon transmitting, to the external electronic device 800, the message including the download information used to download the generated new profile, the entitlement server 520 (or the web server) may dismiss a web service flow provided to the external electronic device 800 by calling Finish Flowo using the JavaScript callback function and refresh service status in operation 1215-1. Operation 1215-1 may be expressed as "Finish Flowo" in FIG. 12B.

Upon receiving the message including the download information used to download the generated new profile from the entitlement server 520 (or the web server), the external electronic device 800 may perform an operation of downloading the generated new profile from the SM-DP+ server 530 in operation 1216. Operation 1216 in which the external electronic device 800 performs the operation of downloading the generated new profile from the SM-DP+ server 530 may be implemented similarly to or substantially the same as operation 814 described in FIG. 8B, so a detailed description thereof will omitted. Operation 1216 may be expressed as "Get Communication Profile ES+ Exchange" in FIG. 12B.

Upon performing the operation of downloading the generated new profile from the SM-DP+ server 530, the external electronic device 800 may transmit a third request message related to the subscription managing operation to the entitlement server 520 in operation 1217. Operation 1217 in which the external electronic device 800 transmits the third request message to the entitlement server 520 may be implemented similarly to or substantially the same as operation 815 described in FIG. 8B, so a detailed description thereof will be omitted. Operation 1217 may be expressed as "ManageSubscription(operation_type=4_UPDATE)" in FIG. 12B.

Upon receiving the third request message related to the subscription managing operation from the external electronic device 800, the entitlement server 520 may transmit, to the external electronic device 800, a 200 OK message as an answer message to the third request message related to the subscription managing operation in operation 1217-1. Operation 1217-1 in which the entitlement server 520 transmits the answer message to the third request message to the external electronic device 800 may be implemented similarly to or substantially the same as operation 815-1 described in FIG. 8B, so a detailed description thereof will be omitted. Operation 1217-1 may be expressed as "200 OK-SubscriptionResult=<DONE>" in FIG. 12B.

Upon receiving the answer message (e.g., the 200 OK message) to the third request message from the entitlement server 520, the external electronic device 800 may activate the obtained profile in operation 1218. Accordingly, it may be possible to transfer the profile of the electronic device 101 which uses the EAP-AKA authenticating process to the external electronic device 800 (for example, it may be possible to transfer the eSIM of the electronic device 101 which uses the EAP-AKA authenticating process to the eSIM of the external electronic device 800). Operation 1218 may be expressed as "Activate Service" in FIG. 12B.

Figure 13:
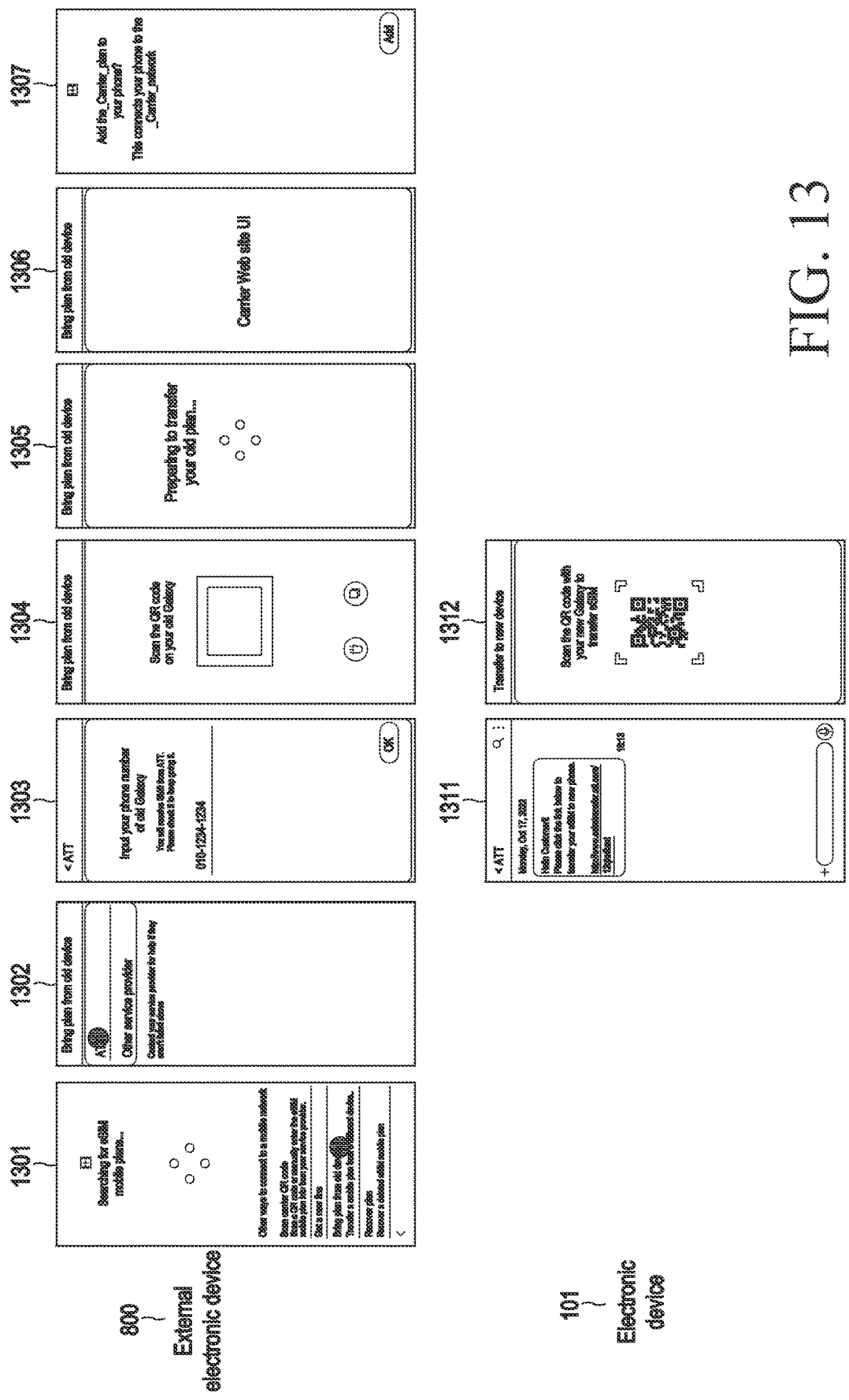
FIG. 13 is a diagram illustrating screens displayed on an electronic device according to an embodiment of the disclosure.

FIG. 13 is a diagram illustrating screens displayed on an electronic device according to an embodiment of the disclosure.

Screens 1301 to 1307, 1311, and 1312 shown in FIG. 13 may be screens according to a profile transfer process between electronic devices if an EAP-AKA-based profile transfer application is supported.

Referring to FIG. 13, an external electronic device 800 (e.g., an electronic device 102 or an electronic device 104 in FIG. 1A), which is a new electronic device, may output (for example, may display) screens 1301 and 1302 for selecting to transfer, to the external electronic device 800, a profile of an electronic device 101 (e.g., an electronic device 101 in FIG. 1A, 1B, 2, 3, or 5), which is an existing electronic device, and for selecting a carrier. The screens 1301 and 1302 may be associated with operation 1201 in FIG. 12A.

Upon identifying a user input to select the profile transfer between electronic devices and to select the carrier via the screens 1301 and 1302, the external electronic device 800 may output a screen 1303 providing first information triggering transfer of subscription of the electronic device 101 to the external electronic device 800 in a form of a window. The screen 1303 may be associated with operation 1202 in FIG. 12A.

The external electronic device 800 may input a phone number corresponding to subscription (or a line) in use via the window outputted on the screen 1303, and this may correspond to the screen 1303. The screen 1303 may be associated with operation 1202 in FIG. 12A.

If the phone number is inputted, the external electronic device 800 may perform an SMS-OTP authenticating process with an entitlement server (e.g., an entitlement server 520 in FIG. 5), and the entitlement server may transmit an SMS including a web link including an OTP to the electronic device 101 which corresponds to the phone number as the entitlement server performs the SMS-OTP authenticating process. Upon receiving the SMS including the web link from the entitlement server, the electronic device 101 may output the web link via the screen 1311. The screen 1311 may be associated with operation 1205 in FIG. 12A.

If a user input selecting the web link is identified via the screen 1311, the electronic device 101 may perform an EAP-AKA authenticating process with the entitlement server, and output authentication information (e.g., a token) obtained via the EAP-AKA authenticating process in a form of a QR code. The screen 1312 may be associated with operation 1207 in FIG. 12A.

The external electronic device 800 may obtain the authentication information by scanning the QR code outputted on the screen 1312, and this may correspond to the screen 1304. The screen 1304 may be associated with operation 1208 in FIG. 12A.

Upon obtaining the authentication information of the electronic device 101 obtained via the EAP-AKA authenticating process, the external electronic device 800 may perform at least one operation for profile transfer with an entitlement server and an SM-DP+ server (e.g., an SM-DP+ server 220 in FIG. 2 or an SM-DP+ server 530 in FIG. 5) to transfer a profile of the electronic device 101 to the external electronic device 800, and this may correspond to the screens 1305, 1306, and 1307. The screen 1305 may be associated with operations 1209 and 1210 in FIG. 12A, the screen 1306 may be associated with operations 1211 and 1215 in FIG. 12B, and the screen 1307 may be associated with operation 1216 in FIG. 12B.

Figure 14A:
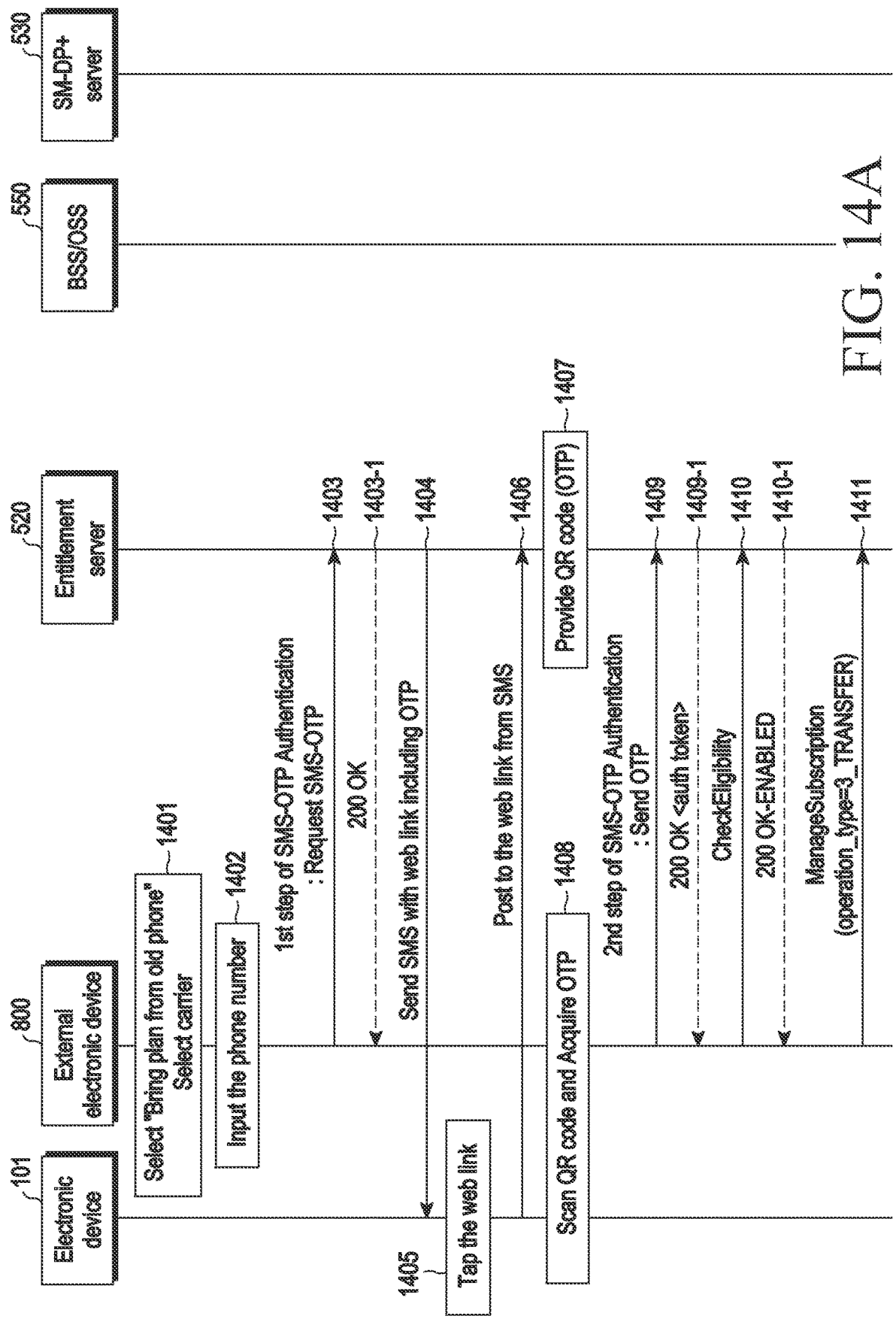
FIGS. 14A and 14B are signal flowcharts illustrating a profile transferring process between electronic devices in a wireless communication network according to an embodiment of the disclosure.
Figure 14B:
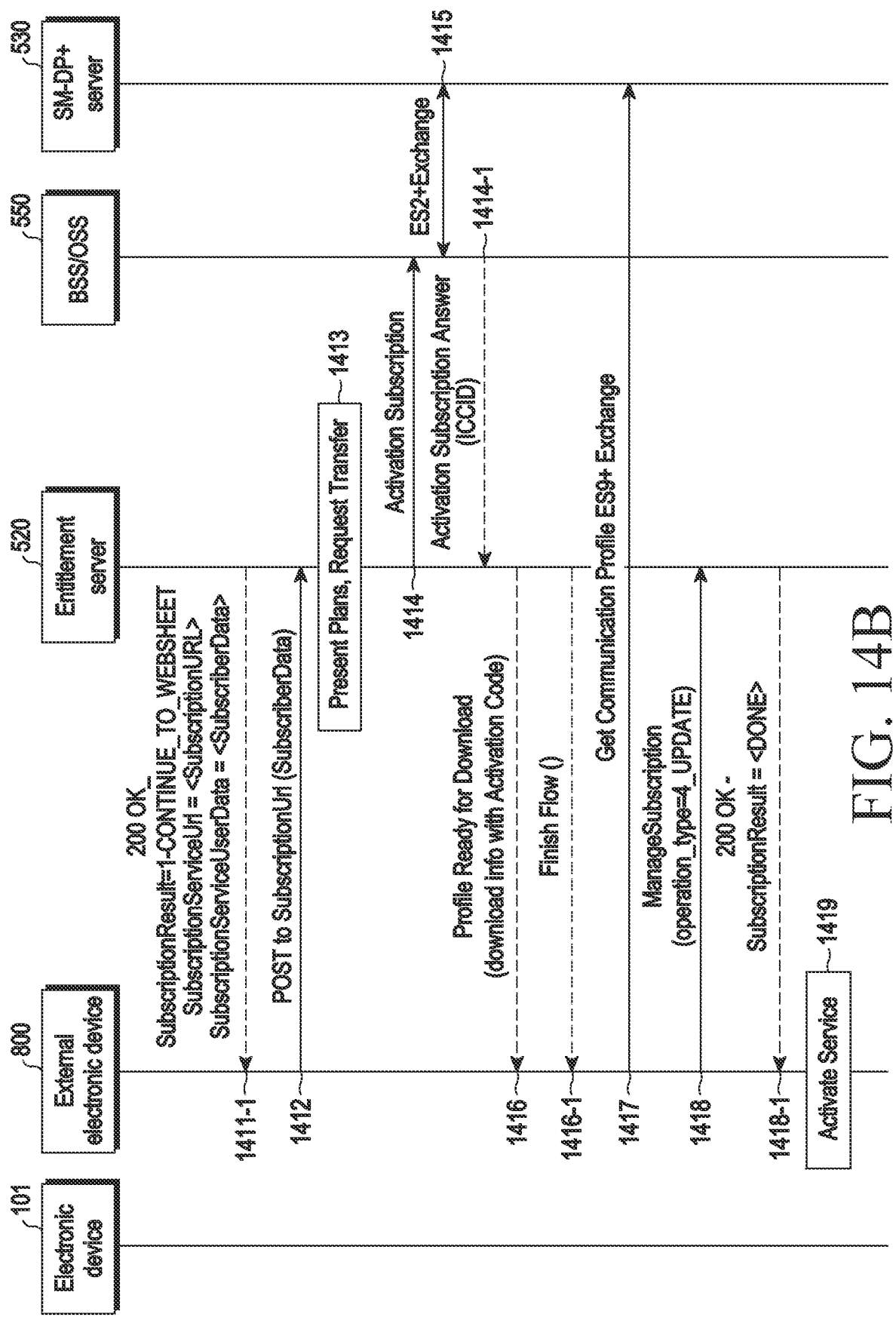

FIGS. 14A and 14B are signal flowcharts illustrating a profile transferring process between electronic devices in a wireless communication network according to an embodiment of the disclosure.

A profile transfer process between electronic devices illustrated in FIGS. 14A and 14B may be a profile transfer process between electronic devices in a case that an electronic device 101 (e.g., an electronic device in 101 FIG. 1A, 1B, 2, 3, or 5), which is an existing electronic device, does not support an EAP-AKA-based profile transfer application which is a profile transfer application supporting an EAP-AKA authenticating process. A profile transfer process between electronic devices shown in FIGS. 10A and 10B may also be the profile transfer process between electronic devices in a case that the EAP-AKA-based profile transfer application is not supported. However, there may be a difference in terms of which the first information, which is information associated with trigger for transfer of subscription of the electronic device 101 to an external electronic device 800 (e.g., an electronic device 102 or an electronic device 104 in FIG. 1A), is provided in the external electronic device 800 in a form of a QR code or is transmitted via an NFC in FIGS. 10A and 10B, whereas the first information is provided in a form of outputting (for example, displaying) a window in the external electronic device 800 in FIGS. 14A and 14B. In addition, information included in first information described in FIGS. 10A and 10B may be different from information included in the first information described in FIGS. 14A and 14B. In FIGS. 14A and 14B, the electronic device 101 does not support the EAP-AKA-based profile transfer application, so the profile transfer process between electronic devices may be performed using another authenticating process other than the EAP-AKA authenticating process. For example, the other authenticating process may be an SMS-OTP authenticating process.

Referring to FIGS. 14A and 14B, in operation 1401, an external electronic device 800 which is a new electronic device may identify a user input (e.g., a user input for selecting profile transfer between electronic devices) associated with profile transfer between electronic devices. In operation 1401, the external electronic device 800 may identify a user input for selecting a carrier as well as the user input for the profile transfer. Operation 1401 in which the external electronic device 800 identifies the user input associated with the profile transfer between electronic devices may be implemented similarly to or substantially the same as operation 801 described in FIG. 8A, so a detailed description thereof will be omitted. Operation 1401 may be expressed as "Select "Bring plan from old phone" & Select carrier" in FIG. 14A.

Based on the user input selecting the profile transfer between electronic devices, in operation 1402, the external electronic device 800 may provide first information which is information associated with trigger for transferring subscription of the electronic device 101 to the external electronic device 800. Operation 1402 in which the external electronic device 800 provides the first information may be implemented similarly to or substantially the same as operation 1202 described in FIG. 12A, so a detailed description thereof will be omitted. Operation 1402 may be expressed as "Input the phone number" in FIG. 14A.

If the phone number corresponding to the subscription in use is inputted via the window, the external electronic device 800 may transmit, to an entitlement server 520, a fourth request message requesting to perform the SMS-OTP authenticating process in operation 1403. In an embodiment, the fourth request message may include the phone number, which is inputted via the window, corresponding to the subscription in use. Operation 1403 may be expressed as "1st step of SMS-OTP Authentication: Request SMS-OTP" in FIG. 14A.

Upon receiving, from the external electronic device 800, the fourth request message requesting to perform the SMS-OTP authenticating process, the entitlement server 520 may transmit a 200 OK as an answer message to the fourth request message in operation 1403-1. Operation 1403-1 may be expressed as "200 OK" in FIG. 14A.

In operation 1404, the entitlement server 520 may transmit an SMS to the electronic device 101 corresponding to the phone number, which corresponds to the subscription in use, included in the fourth request message. In an embodiment, the SMS may include a web link, and the web link may be connected to the EAP-AKA-based profile transfer application. In an embodiment, the web link may include an OTP. Operation 1404 may be expressed as "Send SMS with web link including OTP" in FIG. 14A.

Upon receiving the SMS including the web link which may be connected to the EAP-AKA-based profile transfer application from the entitlement server 520, the electronic device 101 may provide (for example, may output) the received SMS in operation 1405. After providing the SMS, the electronic device 101 may identify a user input selecting the web link included in the SMS (for example, selecting the web link connected to the EAP-AKA-based profile transfer application). For example, if a tap for the web link is inputted, the electronic device 101 may identify the user input selecting the web link. Upon identifying the user input selecting the web link, the electronic device 101 may identify whether the electronic device 101 may support the profile transfer between electronic devices using the EAP-AKA authenticating process. Operation 1405 of identifying whether the electronic device 101 may support the profile transfer between electronic devices using the EAP-AKA authenticating process may be implemented similarly to or substantially the same as operation 1205 described in FIG. 12A, so a detailed description thereof will be omitted. However, in FIG. 14A, it will be assumed that the electronic device 101 may not support the profile transfer between electronic devices using the EAP-AKA authenticating process. Operation 1405 may be expressed as "Tap the web link" in FIG. 14A.

Based on identification that the profile transfer between electronic devices may not be supported using the EAP-AKA authenticating process, the electronic device 101 may output (for example, may display) a web link included in the SMS received from the entitlement server 520 in operation 1406. After outputting the web link, the electronic device 101 may identify a user input for accessing the web link. Based on the user input for accessing the web link being identified, the electronic device 101 may perform an accessing operation to a web link provided by the entitlement server 520 including the web server (e.g., the web server 510 in FIG. 5). If the web server is implemented as a separate entity different from the entitlement server 520, the external electronic device 800 may perform an access operation to a web link provided by the web server. Operation 1406 may be expressed as "Post to the web link from SMS" in FIG. 14A.

In operation 1407, the entitlement server 520 including the web server may provide, via a web page, second information which is information associated with trigger for a performance of an authenticating process (e.g., an SMS-OTP authenticating process) other than the EAP-AKA authenticating process of the external electronic device 800.

In an embodiment, if the electronic device 101 does not support the EAP-AKA-based profile transfer application, the second information may be a trigger point to cause the external electronic device 800 to start performing another authenticating process other than the EAP-AKA authenticating process.

In an embodiment, the entitlement server 520 including the web server may provide the second information in a form of a QR code. For example, the entitlement server 520 including the web server may provide the second information in the form of the QR code via the web page.

In an embodiment, the second information may further include the OTP included in the SMS received by the electronic device 101 from the entitlement server 520 in operation 1404.

In an embodiment, the second information may be provided in a form of a QR code having a format which is promised between a server (e.g., a manufacturer server of the external electronic device 800 or a server of a communication carrier) and the external electronic device 800 in advance. For example, the second information may be provided in a form of a QR code having a string, such as "33$SAMSUNG$ODSA$SMSOTP$OTP_VALUE".
Operation 1407 may be expressed as "Display QR code (OTP)" in FIG. 14A.

As the entitlement server 520 including the web server provides, in the form of the QR code, the second information which is the information associated with the trigger for the performance of the SMS-OTP authenticating process of the external electronic device 800 via the web page, the electronic device 101 may provide the second information provided via the web page from the entitlement server 520 including the web server in the form of the QR code in operation 1408. For example, the electronic device 101 may output (e.g., may display) the second information in the form of the QR code, and the external electronic device 800 may start performing the SMS-OTP authenticating process by scanning the QR code outputted in the electronic device 101.

In operation 1408, the external electronic device 800 may obtain the second information. For example, if the electronic device 101 outputs the second information in the form of the QR code, the external electronic device 800 may obtain the second information by scanning the QR code outputted in the electronic device 101. Upon obtaining the second information, the external electronic device 800 may obtain the OTP included in the SMS received by the electronic device 101 from the entitlement server 520. Operation 1408 may be expressed as "Scan QR code and Acquire OTP" in FIG. 14A.

Upon obtaining the OTP, the external electronic device may perform an SMS-OTP authenticating process with the entitlement server 520 based on the obtained OTP. An operation of performing the SMS-OTP authenticating process between the external electronic device 800 and the entitlement server 520 may be as follows.

In operation 1409, the external electronic device 800 may transmit, to the entitlement server 520, a fifth request message which includes the obtained OTP and requests a performance of the SMS-OTP authenticating process. Upon receiving the fifth request message from the external electronic device 800, the entitlement server 520 may perform the SMS-OTP authenticating process based on the OTP included in the fifth request message. Operation 1409 may be expressed as "2nd step of SMS-OTP Authentication: Send-OTP" in FIG. 14A.

If a result of the SMS-OTP authenticating process indicates success, the entitlement server 520 may include authentication information (e.g., token) into an answer message (e.g., a 200 OK message) to the fifth request message and transmit the answer message including the authentication information to the external electronic device 800 in operation 1409-1. In FIG. 14A, it will be assumed that the result of the SMS-OTP authenticating process indicates the success, and if the result of the SMS-OTP authenticating process indicates failure, the external electronic device 800 may not perform any further operations. Operation 1409-1 may be expressed as "200 OK<auth token>" in FIG. 14A.

Upon obtaining the authentication information, the external electronic device 800 may perform an eligibility check with the entitlement server 520 in order to transfer the profile of the electronic device 101 to the external electronic device 800 in operation 1410. Operation 1410 in which the external electronic device 800 performs the eligibility check with the entitlement server 520 in order to transfer the profile of the electronic device 101 to the external electronic device 800 may be implemented similarly to or substantially the same as operation 807 described in FIG. 8A, so a detailed description thereof will be omitted. However, there may be a difference in terms of which authentication-related information including authentication information obtained by the electronic device 101 via the EAP-AKA authenticating process is used in operation 807, whereas the authentication information obtained by the electronic device 101 via the SMS-OTP authenticating process is used in operation 1410. Operation 1410 may be expressed as "CheckEligibility" in FIG. 14A.

Upon receiving the first request message including CheckEligibility as the operation information from the external electronic device 800, the entitlement server 520 may perform the eligibility check for the external electronic device 800 based on the authentication information and/or the device information of the external electronic device 800 included in the first request message including CheckEligibility as the operation information in operation 1410-1. For example, the entitlement server 520 may perform the eligibility check for a device and a user of the external electronic device 800 based on the authentication information and/or the device information of the external electronic device 800.

If a result of the eligibility check for the external electronic device 800 indicates success, the entitlement server 520 may transmit, to the external electronic device 800, a 200 OK-ENABLED message as an answer message to the first request message including CheckEligibility as the operation information. In FIG. 14A, it will be assumed that result of the eligibility check for the external electronic device 800 indicates the success, and if the result of the eligibility check for the external electronic device 800 indicates failure, further operations may not be performed. In an embodiment, if the result of the eligibility check indicates the success, the 200 OK message may include information of "ENABLED". Operation 1410-1 may be expressed as "200 OK-ENABLED" in FIG. 14A.

Upon receiving the 200 OK-ENABLED message from the entitlement server 520, the external electronic device 800 may transmit a second request message related to a subscription managing operation to the entitlement server 520 in operation 1411. Operation 1411 in which the external electronic device 800 transmits the second request message related to the subscription managing operation to the entitlement server 520 may be implemented similarly to or substantially the same as operation 808 described in FIG. 8A, so a detailed description thereof will be omitted. However, there may be a difference in terms of which authentication-related information including authentication information obtained by the electronic device 101 via the EAP-AKA authenticating process is used in operation 808, whereas the authentication information obtained by the electronic device 101 via the SMS-OTP authenticating process is used in operation 1411. Operation 1411 may be expressed as "ManageSubscription(operation_type=3_TRANSFER)" in FIG. 14A.

In response to receiving the subscription answer message, the entitlement server 520 may transmit, to the external electronic device 800, a 200 OK message as an answer message to the second request message including "ManageSubscription" as the ODSA operation information in operation 1411-1. Operation 1411-1 in which the entitlement server 520 transmits the answer message to the second request message to the external electronic device 800 may be implemented similarly to or substantially the same as operation 808-1 described in FIG. 8A, so a detailed description thereof will be omitted. Operation 1411-1 may be expressed as "200 OK/SubscriptionResult=1-CONTIUE_TO_WEBSHEET/SubscriptionServiceUrl= <SubscriptionURL>/SubscriptionServiceData=<SubscriberData>" in FIG. 14B.

The external electronic device 800 may perform an accessing operation to the entitlement server 520 including a web server (e.g., the web server 510 in FIG. 5) based on the accessible address information and/or the user-related data in operation 1412. If the web server is implemented as a separate entity different from the entitlement server 520, the external electronic device 800 may perform the accessing operation to the entitlement server 520. Operation 1412 in which the external electronic device 800 performs the accessing operation to the entitlement server 520 may be implemented similarly to or substantially the same as operation 809 described in FIG. 8B, so a detailed description thereof will be omitted. Operation 1412 may be expressed as "POST to SubscriptionUrl(SubscriberData)" in FIG. 14B.

Based on the user input indicating the profile transfer being identified, the external electronic device 800 may request the profile transfer (or the subscription transfer or the line transfer) from the entitlement server 520 including the web server in operation 1413. If the web server is implemented as a separate entity different from the entitlement server 520, the external electronic device 800 may request the profile request from the web server. Operation 1413 in which the external electronic device 800 requests the profile transfer (or the subscription transfer or the line transfer) from the entitlement server 520 may be implemented similarly to or substantially the same as operation 810 described in FIG. 8B, so a detailed description thereof will be omitted. Operation 1413 may be expressed as "Presents Plans, Request Transfer" in FIG. 14B.

Upon identifying the request for the profile transfer from the external electronic device 800, the entitlement server 520 (or the web server) may transmit an Activation Subscription message to the BSS/OSS 550 in operation 1414. According to an embodiment, the Activation Subscription message may include information indicating that the external electronic device 800 requests the profile transfer. Operation 1414 may be expressed as "Activation Subscription" in FIG. 14B.

Upon receiving the Activation Subscription message from the entitlement server 520 (or the web server), the BSS/OSS 550 may perform a new profile generating process, which generates a new profile, with the SM-DP+ server 530 via an ES2+ interface in operation 1415. Operation 1415 in which the BSS/OSS 550 performs the new profile generating process with the SM-DP+ server 530 may be implemented similarly to or substantially the same as operation 812 described in FIG. 8B, so a detailed description thereof will be omitted. Operation 1415 may be expressed as "ES2+ Exchange" in FIG. 14B.

Upon performing the new profile generating process, the BSS/OSS 550 may transmit, to the entitlement server 520 (or the web server), an Activation Subscription Answer message, which is an answer message to the Activation Subscription message in operation 1414-1. In an embodiment, the Activation Subscription Answer message may include an ICCID. The ICCID included in the Activation Subscription Answer message may be the same as the ICCID received from the SM-DP+ server 530 and mapped to the generated profile. Operation 1414-1 may be expressed as "Activation Subscription Answer" in FIG. 14B.

Upon receiving the Activation Subscription Answer message from the BSS/OSS 550, the entitlement server 520 (or the web server) may transmit, to the external electronic device 800, a message including download information (e.g., an activation code) which is used to download the generated new profile in operation 1416. Operation 1416 in which the entitlement server 520 (or the web server) transmits the message including the download information used to download the new profile may be implemented similarly to or substantially the same as operation 813 described in FIG. 8B, so a detailed description thereof will be omitted. Operation 1416 may be expressed as "Profile Ready for Download(download info with Activation Code)" in FIG. 14B.

Upon transmitting, to the external electronic device 800, the message including the download information used to download the generated new profile, the entitlement server 520 (or the web server) may dismiss a web service flow provided to the external electronic device 800 by calling Finish Flowo using the JavaScript callback function and refresh service status in operation 1416-1. Operation 1416-1 may be expressed as "Finish Flowo" in FIG. 14B.

Upon receiving the message including the download information used to download the generated new profile from the entitlement server 520 (or the web server), the external electronic device 800 may perform an operation of downloading the generated new profile from the SM-DP+ server 530 in operation 1417. Operation 1417 in which the external electronic device 800 performs the operation of downloading the generated new profile from the SM-DP+ server 530 may be implemented similarly to or substantially the same as operation 814 described in FIG. 8B, so a detailed description thereof will omitted. Operation 1417 may be expressed as "Get Communication Profile ES+ Exchange" in FIG. 14B.

Upon performing the operation of downloading the generated new profile from the SM-DP+ server 530, the external electronic device 800 may transmit a third request message related to the subscription managing operation to the entitlement server 520 in operation 1418. Operation 1418 in which the external electronic device 800 transmits the third request message to the entitlement server 520 may be implemented similarly to or substantially the same as operation 815 described in FIG. 8B, so a detailed description thereof will be omitted. Operation 1418 may be expressed as "Manage-Subscription(operation_type=4_UPDATE)" in FIG. 14B.

Upon receiving the third request message related to the subscription managing operation from the external electronic device 800, the entitlement server 520 may transmit, to the external electronic device 800, a 200 OK message as an answer message to the third request message related to the subscription managing operation in operation 1418-1. Operation 1418-1 in which the entitlement server 520 transmits the answer message to the third request message to the external electronic device 800 may be implemented similarly to or substantially the same as operation 815-1 described in FIG. 8B, so a detailed description thereof will be omitted. Operation 1418-1 may be expressed as "200 OK-SubscriptionResult=<DONE>" in FIG. 14B.

Upon receiving the answer message (e.g., the 200 OK message) to the third request message from the entitlement server 520, the external electronic device 800 may activate the obtained profile in operation 1419. Accordingly, it may be possible to transfer the profile of the electronic device 101 which uses the SMS-OTP authenticating process to the external electronic device 800 (for example, it may be possible to transfer the eSIM of the electronic device 101 which uses the SMS-OTP authenticating process to the eSIM of the external electronic device 800). Operation 1419 may be expressed as "Activate Service" in FIG. 14B.

Figure 15:
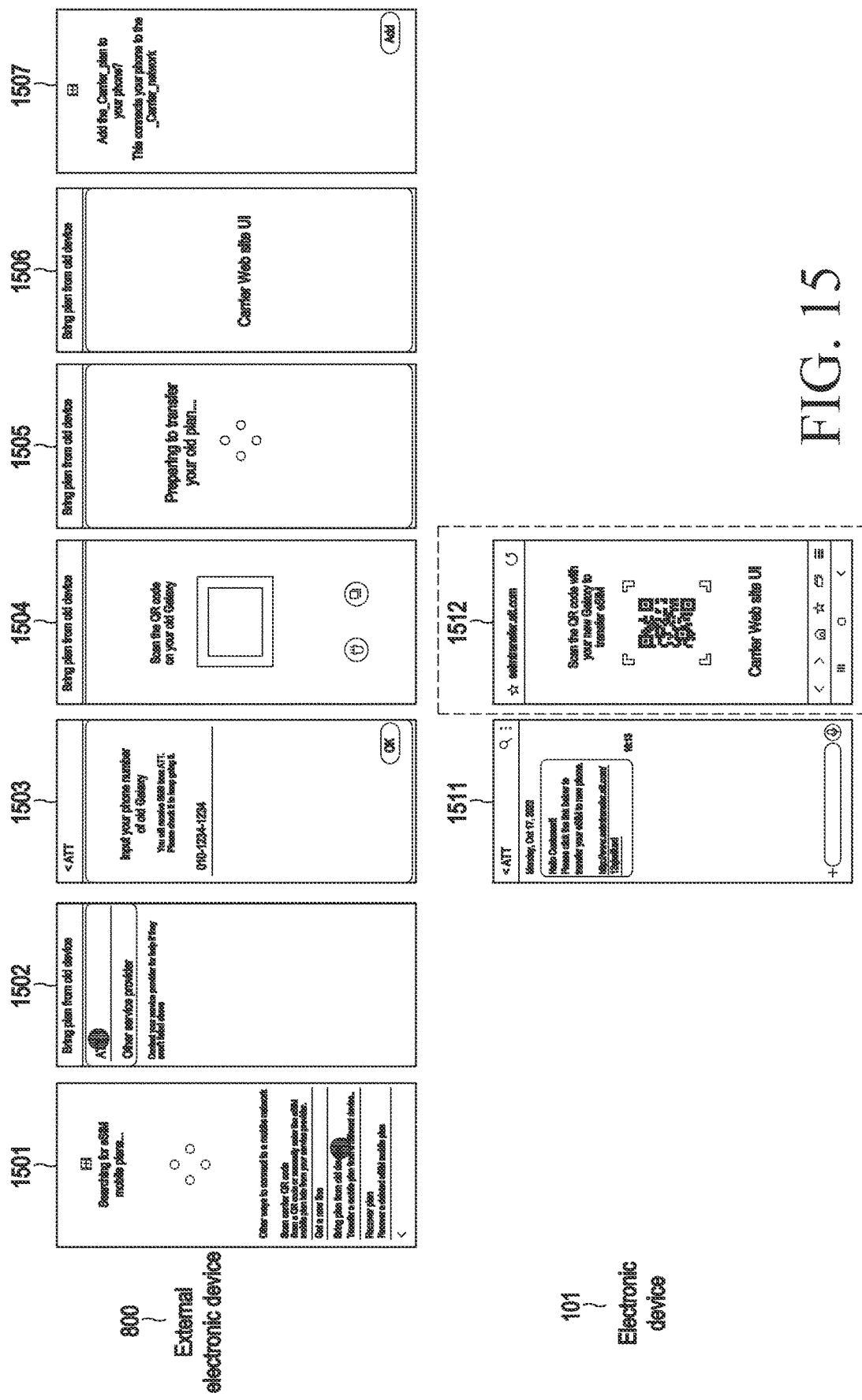
FIG. 15 is a diagram illustrating screens displayed on an electronic device according to an embodiment of the disclosure.

FIG. 15 is a diagram illustrating screens displayed on an electronic device according to an embodiment of the disclosure.

Screens 1501 to 1507, 1511, and 1512 shown in FIG. 15 may be screens according to a profile transfer process between electronic devices if an EAP-AKA-based profile transfer application is not supported.

Referring to FIG. 15, an external electronic device 800 (e.g., an electronic device 102 or an electronic device 104 in FIG. 1A), which is a new electronic device, may output (for example, may display) screens 1501 and 1502 for selecting to transfer, to the external electronic device 800, a profile of an electronic device 101 (e.g., an electronic device 101 in FIG. 1A, 1B, 2, 3, or 5), which is an existing electronic device, and for selecting a carrier. The screens 1501 and 1502 may be associated with operation 1401 in FIG. 14A.

Upon identifying a user input to select the profile transfer between electronic devices and to select the carrier via the screens 1501 and 1502, the external electronic device 800 may output a screen 1503 providing first information triggering transfer of subscription of the electronic device 101 to the external electronic device 800 in a form of a window. The screen 1503 may be associated with operation 1402 in FIG. 14A.

The external electronic device 800 may input a phone number corresponding to subscription (or a line) in use via the window outputted on the screen 1503, and this may correspond to the screen 1503. The screen 1503 may be associated with operation 1402 in FIG. 14A.

If the phone number is inputted, the external electronic device 800 may perform an SMS-OTP authenticating process with an entitlement server (e.g., an entitlement server 520 in FIG. 5), and the entitlement server may transmit an SMS including a web link including an OTP to the electronic device 101 which corresponds to the phone number as the entitlement server performs the SMS-OTP authenticating process. Upon receiving the SMS including the web link from the entitlement server, the electronic device 101 may output the web link via the screen 1511. The screen 1511 may be associated with operation 1405 in FIG. 14A.

If the EAP-AKA-based profile transfer application does not exist in the electronic device 101 even though the user input selecting the web link is identified via the screen 1511, a QR code providing second information (e.g., an OTP) capable of triggering the SMS-OTP authenticating process may be provided via the screen 1512. The screen 1512 may be associated with operation 1407 in FIG. 14A.

The external electronic device 800 may obtain the second information (e.g., the OTP) capable of triggering the SMS-OTP authenticating process by scanning the QR code outputted on the screen 1512, and this may correspond to the screen 1504. The screen 1504 may be associated with operation 1408 in FIG. 14A.

Thereafter, the external electronic device 800 may perform the SMS-OTP authenticating process with an entitlement server (e.g., an entitlement server 520 in FIG. 5), and obtain authentication information (e.g., a token) obtained via the SMS-OTP authenticating process, and this may correspond to the screen 1505. The screen 1505 may be associated with operations 1409 to 1411 in FIG. 14A.

Upon obtaining the authentication information of the electronic device 101 obtained via the SMS-OTP authenticating process, the external electronic device 800 may perform at least one operation for profile transfer with an entitlement server and an SM-DP+ server (e.g., an SM-DP+ server 220 in FIG. 2 or an SM-DP+ server 530 in FIG. 5) to transfer a profile of the electronic device 101 to the external electronic device 800, and this may correspond to the screens 1506 and 1507. The screen 1506 may be associated with operations 1412 and 1413 in FIG. 14B, and the screen 1507 may be associated with operation 1417 in FIG. 14B. Operation 1417 in FIG. 14B may include an operation of outputting information about a profile to be downloaded and receiving a user input, and operations 1418 and 1419 may be performed in a background without UX.

According to an embodiment, an method of operating an electronic device (e.g., an electronic device 102 or 104 in FIG. 1A) may comprise providing first information which triggers profile transfer from an external electronic device (e.g., an electronic device 101 in FIG. 1A, 1B, 2, 3, or 5) to the electronic device (e.g., the electronic device 102 or 104 in FIG. 1A).

According to an embodiment, the method may further comprise, based on the profile transfer which is based on an extensible authentication protocol authentication and key agreement (EAP-AKA) authenticating operation being possible, obtaining first authentication information which is obtained via the EAP-AKA authenticating operation between the external electronic device (e.g., the electronic device 101 in FIG. 1A, 1B, 2, 3, or 5) and a server (e.g., an entitlement server 520 in FIG. 5) associated with the profile transfer.

According to an embodiment, the method may further comprise, based on the profile transfer which is based on the EAP-AKA authenticating operation being impossible, performing an authenticating operation different from the EAP-AKA authenticating operation with the server (e.g., the entitlement server 520 in FIG. 5) to obtain second authentication information.

According to an embodiment, the method may further comprise, based on one of the first authentication information or the second authentication information, performing at least one operation for the profile transfer.

According to an embodiment, the first information may include a web link, and the web link may be connected to an application supporting the profile transfer which is based on the EAP-AKA authenticating operation.

According to an embodiment, if the application is run via the web link in the external electronic device (e.g., the electronic device 101 in FIG. 1A, 1B, 2, 3, or 5), the profile transfer which is based on the EAP-AKA authenticating operation may be possible.

According to an embodiment, the different authenticating operation may include a short message service one time password (SMS-OTP) authenticating operation.

According to an embodiment, obtaining the authenticating operation different from the EAP-AKA authenticating operation with the server (e.g., the entitlement server 520 in FIG. 5) may comprise, obtaining second information which triggers performance of the different authenticating operation between the electronic device (e.g., the electronic device 102 or 104 in FIG. 1A) and the server (e.g., the entitlement server 520 in FIG. 5), and based on the second information being obtained, performing the different authenticating operation with the server (e.g., the entitlement server 520 in FIG. 5) to obtain second authentication information.

According to an embodiment, the first information may further include at least one of device information of the electronic device (e.g., the electronic device 102 or 104 in FIG. 1A), or encryption information to be used for the external electronic device (e.g., the electronic device 101 in FIG. 1A, 1B, 2, 3, or 5) to encrypt one of the first authentication information or the second authentication information.

According to an embodiment, the at least one operation may comprise, an operation of requesting the profile transfer from the server (e.g., the entitlement server 520 in FIG. 5), an operation of receiving address information used for the electronic device (e.g., the electronic device 102 or 104 in FIG. 1A) to access the server (e.g., the entitlement server 520 in FIG. 5) from the server (e.g., the entitlement server 520 in FIG. 5) in response to the request, an operation of accessing the server (e.g., the entitlement server 520 in FIG. 5) based on the address information to identify a user input indicating the profile transfer, an operation of receiving download information to be used for downloading a profile from the server (e.g., the entitlement server 520 in FIG. 5), based on the user input being identified, and an operation of downloading the profile from another server (e.g., an SM-DP+ server 530) associated with the profile based on the download information.

According to an embodiment, the at least one operation may further comprise, an operation of performing an eligibility check operation with the server (e.g., the entitlement server 520 in FIG. 5) before requesting the profile transfer from the server (e.g., the entitlement server 520 in FIG. 5), and the profile transfer may be requested based on a result of eligibility check operation indicating success.

According to an embodiment, an method of operating an electronic device (e.g., an electronic device 101 in FIG. 1A, 1B, 2, 3, or 5) may comprise obtaining first information which triggers profile transfer from the electronic device (e.g., the electronic device 101 in FIG. 1A, 1B, 2, 3, or 5) to an external electronic device (e.g., an electronic device 102 or 104 in FIG. 1A).

According to an embodiment, the method may further comprise, based on the profile transfer which is based on an extensible authentication protocol authentication and key agreement (EAP-AKA) authenticating operation being possible, performing the EAP-AKA authenticating operation with a server (e.g., an entitlement server 520 in FIG. 5) associated with the profile transfer to obtain and provide first authentication information.

According to an embodiment, the method may further comprise, based on the profile transfer which is based on the EAP-AKA authenticating operation being impossible, providing second information which triggers performance of an authenticating operation different from the EAP-AKA authenticating operation between the external electronic device (e.g., the electronic device 102 or 104 in FIG. 1A) and the server (e.g., the entitlement server 520 in FIG. 5).

According to an embodiment, the first information may include a web link, and the web link may be connected to an application supporting the profile transfer which is based on the EAP-AKA authenticating operation.

According to an embodiment, identifying that the profile transfer is possible may comprise identifying that the profile transfer which is based on the EAP-AKA authenticating operation is possible when the application is run via the web link. According to an embodiment, profile transfer between electronic devices may be supported.

According to an embodiment, profile transfer between electronic devices which is based on an EAP-AKA authenticating operation.

While the disclosure has been shown and described with reference to an embodiment thereof, it will be understood by those skilled in the art that various changes in form and details may be made therein without departing from the spirit and scope of the disclosure as defined by the appended claims and their equivalents.

What is claimed is:

1. An electronic device comprising:
   at least one communication circuit; and
   at least one processor electrically connected to the at least one communication circuit, wherein the at least one processor is configured to:
   provide first information which triggers profile transfer from an external electronic device to the electronic device,
   based on the profile transfer which is based on an extensible authentication protocol authentication and key agreement (EAP-AKA) authenticating operation being possible, obtain first authentication information which is obtained via the EAP-AKA authenticating operation between the external electronic device and a server associated with the profile transfer,
   based on the profile transfer which is based on the EAP-AKA authenticating operation being impossible, perform, via the at least one communication circuit, an authenticating operation different from the EAP-AKA authenticating operation with the server to obtain second authentication information, and based on one of the first authentication information or the second authentication information, perform at least one operation for the profile transfer.

2. The electronic device of claim 1, wherein the first information includes a web link, and wherein the web link is connected to an application supporting the profile transfer which is based on the EAP-AKA authenticating operation.

3. The electronic device of claim 2, wherein, if the application is run via the web link in the external electronic device, the profile transfer which is based on the EAP-AKA authenticating operation is possible.

4. The electronic device of claim 2, wherein the first information further includes at least one of device information of the electronic device, or encryption information to be used for the external electronic device to encrypt one of the first authentication information or the second authentication information.

5. The electronic device of claim 1, wherein the at least one processor is configured to:

obtain second information which triggers performance of the different authenticating operation between the electronic device and the server; and based on the second information being obtained, perform, via the at least one communication circuit, the different authenticating operation with the server to obtain second authentication information.

6. The electronic device of claim 1, wherein the first information is outputted in a form of a quick response (QR) code, or transmitted based on a short-range wireless communication scheme.

7. The electronic device of claim 1, wherein the different authenticating operation includes a short message service one time password (SMS-OTP) authenticating operation.

8. The electronic device of claim 1, wherein the at least one operation comprises:

an operation of requesting the profile transfer from the server;

an operation of receiving address information used for the electronic device to access the server from the server in response to the request;

an operation of accessing the server based on the address information to identify a user input indicating the profile transfer;

an operation of receiving download information to be used for downloading a profile from the server, based on the user input being identified; and an operation of downloading the profile from another server associated with the profile based on the download information.

9. The electronic device of claim 8, wherein the at least one operation further comprises:

an operation of performing an eligibility check operation with the server before requesting the profile transfer from the server, and wherein the profile transfer is requested based on a result of eligibility check operation indicating success.

10. An electronic device comprising:

at least one communication circuit; and at least one processor electrically connected to the at least one communication circuit, wherein the at least one processor is configured to:

obtain first information which triggers profile transfer from the electronic device to an external electronic device, based on the profile transfer which is based on an extensible authentication protocol authentication and key agreement (EAP-AKA) authenticating operation being possible, perform, via the at least one communication circuit, the EAP-AKA authenticating operation with a server associated with the profile transfer to obtain and provide first authentication information, and based on the profile transfer which is based on the EAP-AKA authenticating operation being impossible, provide second information which triggers performance of an authenticating operation different from the EAP-AKA authenticating operation between the external electronic device and the server.

11. The electronic device of claim 10, wherein the first information includes a web link, and wherein the web link is connected to an application supporting the profile transfer which is based on the EAP-AKA authenticating operation.

12. The electronic device of claim 11, wherein the at least one processor is configured to:

identify that the profile transfer which is based on the EAP-AKA authenticating operation is possible when the application is run via the web link.

13. A method of operating an electronic device, the method comprising:

providing first information which triggers profile transfer from an external electronic device to the electronic device;

based on the profile transfer which is based on an extensible authentication protocol authentication and key agreement (EAP-AKA) authenticating operation being possible, obtaining first authentication information which is obtained via the EAP-AKA authenticating operation between the external electronic device and a server associated with the profile transfer;

based on the profile transfer which is based on the EAP-AKA authenticating operation being impossible, performing an authenticating operation different from the EAP-AKA authenticating operation with the server to obtain second authentication information; and based on one of the first authentication information or the second authentication information, performing at least one operation for the profile transfer.

14. The method of claim 13, wherein the first information includes a web link, and wherein the web link is connected to an application supporting the profile transfer which is based on the EAP-AKA authenticating operation.

15. The method of claim 14, wherein, if the application is run via the web link in the external electronic device, the profile transfer which is based on the EAP-AKA authenticating operation is possible.

16. The method of claim 13, wherein the different authenticating operation includes a short message service one time password (SMS-OTP) authenticating operation.

17. The method of claim 13, wherein performing the authenticating operation different from the EAP-AKA authenticating operation with the server to obtain the second authentication information comprises:

obtaining second information which triggers performance of the different authenticating operation between the electronic device and the server; and based on the second information being identified, performing the different authenticating operation with the service to obtain second authentication information.

18. The method of claim 14, wherein the first information further includes at least one of device information of the electronic device, or encryption information to be used for the external electronic device to encrypt one of the first authentication information or the second authentication information.

19. The method of claim 13, wherein the at least one operation comprises:
- an operation of requesting the profile transfer from the server;
- an operation of receiving address information used for the electronic device to access the server from the server in response to the request;
- an operation of accessing the server based on the address information to identify a user input indicating the profile transfer;
- an operation of receiving download information to be used for downloading a profile from the server, based on the user input being identified; and
- an operation of downloading the profile from another server associated with the profile based on the download information.

20. The method of claim 19,
wherein the at least one operation further comprises:
- an operation of performing an eligibility check operation with the server before requesting the profile transfer from the server, and wherein the profile transfer is requested based on a result of eligibility check operation indicating success.

* * * * *